(12) United States Patent
Gilde et al.

(10) Patent No.: US 8,520,512 B2
(45) Date of Patent: Aug. 27, 2013

(54) NETWORK APPLIANCE FOR CUSTOMIZABLE QUARANTINING OF A NODE ON A NETWORK

(75) Inventors: Robert G. Gilde, Issaquah, WA (US); Christopher Daniel Boscolo, Bellevue, WA (US)

(73) Assignee: McAfee, Inc., Santa Clara, CA (US)

( * ) Notice: Subject to any disclaimer, the term of this patent is extended or adjusted under 35 U.S.C. 154(b) by 567 days.

(21) Appl. No.: 11/461,321

(22) Filed: Jul. 31, 2006

(65) Prior Publication Data

US 2013/0091534 A1    Apr. 11, 2013

Related U.S. Application Data

(63) Continuation-in-part of application No. 11/336,692, filed on Jan. 19, 2006.

(60) Provisional application No. 60/647,646, filed on Jan. 26, 2005.

(51) Int. Cl.
   *H04L 12/28* (2006.01)

(52) U.S. Cl.
   USPC ............................................. 370/230; 726/22

(58) Field of Classification Search
   None
   See application file for complete search history.

(56) References Cited

U.S. PATENT DOCUMENTS

| | | |
|---|---|---|
| 5,577,209 A | 11/1996 | Boyle et al. |
| 5,583,848 A | 12/1996 | Glitho et al. |
| 5,987,610 A | 11/1999 | Franczek et al. |
| 6,035,405 A | 3/2000 | Gage et al. |
| 6,073,142 A | 6/2000 | Geiger et al. |
| 6,460,050 B1 | 10/2002 | Pace et al. |
| 6,487,600 B1 | 11/2002 | Lynch |
| 7,174,517 B2 | 2/2007 | Barnett et al. |
| 7,174,566 B2 | 2/2007 | Yadav |
| 7,284,062 B2 | 10/2007 | Krantz et al. |

(Continued)

FOREIGN PATENT DOCUMENTS

| | | |
|---|---|---|
| WO | 2005/069823 A2 | 8/2005 |
| WO | WO 2006/078729 | 7/2006 |
| WO | WO 2006/081237 | 8/2006 |
| WO | WO 2006/081302 | 8/2006 |

OTHER PUBLICATIONS

Lars Strand, "802.1X Port-Based Authentication HOWTO", Aug. 18, 2004, Linux Online, Chapter 1.*

(Continued)

*Primary Examiner* — Gregory Sefcheck
*Assistant Examiner* — Steve Young
(74) *Attorney, Agent, or Firm* — Patent Capital Group

(57) ABSTRACT

A system, method, and apparatus are directed to managing access to a network. An agent may intercept a network packet transmitted by an enforcement point in response to a request from a device to join the network. The agent identifies, based on the network packet, a port number on the enforcement point at which the request is received. The agent may transmit the port number to a NACA to enable security enforcement operations to be performed on the device. Another device may reside outside the quarantined network and be enabled by the NACA to direct a remediation measure to be performed on the device using at least the port number. The NACA may spoof an ARP response with an address of the NACA to restrict access to resources. The NACA may also place the device into one of a plurality of quarantined networks.

11 Claims, 34 Drawing Sheets

(56) References Cited

U.S. PATENT DOCUMENTS

| | | | |
|---|---|---|---|
| 7,310,669 B2 | 12/2007 | Webb et al. | |
| 7,467,405 B2 | 12/2008 | Cheng | |
| 7,469,139 B2* | 12/2008 | van de Groenendaal | 455/411 |
| 7,505,596 B2 | 3/2009 | Duplessis et al. | |
| 7,506,155 B1 | 3/2009 | Stewart et al. | |
| 7,617,533 B1 | 11/2009 | Hernacki | |
| 7,810,138 B2 | 10/2010 | Vank et al. | |
| 2001/0023486 A1 | 9/2001 | Kayashima et al. | |
| 2002/0066035 A1 | 5/2002 | Dapp | |
| 2002/0154178 A1* | 10/2002 | Barnett et al. | 345/853 |
| 2002/0162026 A1 | 10/2002 | Neuman et al. | |
| 2003/0101355 A1 | 5/2003 | Mattson | |
| 2003/0149888 A1 | 8/2003 | Yadav | |
| 2003/0217148 A1 | 11/2003 | Mullen et al. | |
| 2004/0006546 A1 | 1/2004 | Wedlake et al. | |
| 2004/0117624 A1 | 6/2004 | Brandt et al. | |
| 2004/0158735 A1 | 8/2004 | Roese | |
| 2004/0255154 A1 | 12/2004 | Kwan et al. | |
| 2004/0260760 A1 | 12/2004 | Curnyn | |
| 2005/0050336 A1* | 3/2005 | Liang et al. | 713/188 |
| 2005/0097357 A1 | 5/2005 | Smith | |
| 2005/0152305 A1* | 7/2005 | Ji et al. | 370/328 |
| 2005/0257267 A1 | 11/2005 | Williams et al. | |
| 2005/0273853 A1* | 12/2005 | Oba et al. | 726/22 |
| 2006/0028996 A1* | 2/2006 | Huegen et al. | 370/252 |
| 2006/0161653 A1 | 7/2006 | Webb et al. | |
| 2006/0164199 A1 | 7/2006 | Gilde et al. | |
| 2006/0168648 A1 | 7/2006 | Vank et al. | |
| 2007/0192862 A1* | 8/2007 | Vermeulen et al. | 726/23 |
| 2008/0060076 A1 | 3/2008 | Webb et al. | |
| 2010/0333176 A1 | 12/2010 | Vank et al. | |

OTHER PUBLICATIONS

International Search Report, dated Apr. 25, 2007, for corresponding PCT Application No. PCT/US06/02663, filed Jan. 25, 2006.
U.S. Appl. No. 11/331,776, Official Communication mailed Mar. 13, 2007.
International Search Report and Written Opinion mailed Sep. 20, 2007, which issued during the prosecution of International Patent Application No. PCT/US 06/01753.
International Search Report and Written Opinion mailed Sep. 24, 2007 which issued during the prosecution of International Patent Application No. PCT/US 06/02466.
IEEE 802.1X, http://en.wikipedia.org/wiki/802.1x, last modified Nov. 2, 2006.
PPP Extensible Authentication Protocol (EAP), http://tool.ietf.org/html/rfc2284, last modified Mar. 1998.
Extensible Authentication Protocol (EAP), http://tools.ietf.org/html/rfc3748, last modified Jun. 2004.
Vermeulen, Vincent, MAC Address Search and Containment Automation, U.S. Appl. No. 60/570,962, filed May 2004.
Non-Final Office Action in U.S. Appl. No. 11/336,692 mailed on Apr. 1, 2009.
Response to Non-Final Office Action dated Apr. 1, 2009 in U.S. Appl. No. 11/336,692, filed Jun. 29, 2009.
Final Office Action in U.S. Appl. No. 11/336,692 mailed on Nov. 19, 2009.
Request for Continued Examination and Amendment in U.S. Appl. No. 11/336,692, filed Jan. 19, 2010.
Non-Final Office Action in U.S. Appl. No. 11/336,692 mailed on Mar. 5, 2010.
Response to Non-Final Office Action dated Mar. 5, 2010 in U.S. Appl. No. 11/336,692, filed Jun. 7, 2010.
Final Office Action in U.S. Appl. No. 11/336,692 mailed on Aug. 19, 2010.
Notice of Appeal and Appeal Brief in U.S. Appl. No. 11/336,692, filed Oct. 19, 2010.
Examiner's Answer in U.S. Appl. No. 11/336,692 mailed on Apr. 15, 2011.
Reply Brief in U.S. Appl. No. 11/336,692, filed Jun. 13, 2011.
Non-Final Office Action in U.S. Appl. No. 11/337,408 mailed on Dec. 10, 2009.
Response to Non-Final Office Action dated Dec. 10, 2009 in U.S. Appl. No. 11/337,408, filed Mar. 9, 2010.
Applicant Summary of Interview with Examiner in U.S. Appl. No. 11/337,408, filed May 5, 2010.
Notice of Allowance in U.S. Appl. No. 11/337,408 mailed on May 18, 2010.
Request for Continued Examination in U.S. Appl. No. 11/337,408, filed May 19, 2010.
Notice of Allowance in U.S. Appl. No. 11/337,408, mailed on May 26, 2010.
Non-Final Office Action in U.S. Appl. No. 12/879,319 mailed on Feb. 3, 2012.
Response to Non-Final Office Action dated Feb. 3, 2012 in U.S. Appl. No. 12/879,319, filed May 3, 2012.
Final Office Action in U.S. Appl. No. 12/879,319 mailed on Jun. 6, 2012.
Response to Final Office Action in U.S. Appl. No. 12/879,319, filed Aug. 6, 2012.
Notice of Allowance in U.S. Appl. No. 12/879,319 mailed on Aug. 29, 2012.
Request for Continued Examination in U.S. Appl. No. 12/879,319, filed Nov. 26, 2012.
Notice of Allowance in U.S. Appl. No. 12/879,319 mailed on Dec. 4, 2012.
Non-Final Office Action in U.S. Appl. No. 11/331,776 mailed on Mar. 13, 2007.
Response to Non-Final Office Action dated Mar. 13, 2007 in in U.S. Appl. No. 11/331,776, filed Apr. 27, 2007.
Notice of Allowance in U.S. Appl. No. 11/331,776 mailed on Jul. 10, 2007.
Request for Continued Examination in in U.S. Appl. No. 11/331,776 filed May 10, 2007.
Notice of Allowance in U.S. Appl. No. 11/331,776 mailed on Oct. 28, 2007.
Non-Final Office Action in U.S. Appl. No. 11/877,496 mailed on Oct. 28, 2008.
Response to Non-Final Office Action dated Oct. 28, 2008 in U.S. Appl. No. 11/877,496 filed Apr. 8, 2009.
Final Office Action in U.S. Appl. No. 11/877,496 mailed on Jul. 20, 2009.
Request for Continued Examination and Amendment in U.S. Appl. No. 11/877,496, filed Oct. 20, 2009.
Non-Final Office Action in U.S. Appl. No. 11/877,496 mailed on Dec. 18, 2009.
Response to Non-Final Office Action dated Dec. 18, 2009 in U.S. Appl. No. 11/877,496, filed Mar. 12, 2010.
Final Office Action in U.S. Appl. No. 11/877,496 mailed on May 17, 2010.
Pre-Brief Conference Request in U.S. Appl. No. 11/877,496, filed Jul. 14, 2010.
Pre-Brief Conference Decision in U.S. Appl. No. 11/877,496 mailed on Aug. 10, 2010.
Notice of Appeal in U.S. Appl. No. 11/877,496 filed Jul. 14, 2010.
Appeal Brief in U.S. Appl. No. 11/877,496, filed Sep. 8, 2010.
Examiner's Answer to Appeal Brief in U.S. Appl. No. 11/877,496 mailed on Nov. 4, 2010.
Appellants Reply Brief in U.S. Appl. No. 11/877,496 filed Jan. 3, 2011.
Notice of Allowance in U.S. Appl. No. 12/879,319 mailed on Apr. 26, 2013.
Board of Patent Appeals Decision in U.S. Appl. No. 11/877,496 mailed on Apr. 30, 2013.
Notice of Allowance in U.S. Appl. No. 11/877,496 mailed on May 28, 2013.

* cited by examiner

NETWORK APPLIANCE FOR CUSTOMIZABLE QUARANTINING OF A NODE ON A NETWORK

CROSS-REFERENCE TO RELATED APPLICATIONS

The present application is a Continuation In Part of patent application Ser. No. 11/336,692, entitled "Network Appliance for Securely Quarantining a Node on a Network," filed on Jan. 19, 2006 which claims priority from provisional application Ser. No. 60/647,646 entitled "Network Appliance for Securely Quarantining a Node on a Network," filed on Jan. 26, 2005, the benefit of the earlier filing dates of which are hereby claimed under 35 U.S.C. §§119 (e) and 120 and 37 C.F.R. 1.78, and which are each further incorporated by reference.

FIELD OF THE INVENTION

The present invention relates to network security, and more particularly, but not exclusively, to enabling enforcement of access control on a network.

BACKGROUND OF THE INVENTION

Businesses are deriving tremendous financial benefits from using the internet to strengthen relationships and improve connectivity with customers, suppliers, partners, and employees. Progressive organizations are integrating critical information systems including customer service, financial, distribution, and procurement from their private networks with the Internet. The business benefits are significant, but not without risk. Unfortunately, the risks are growing.

In response to the growing business risks of attacks, potentials for legal suits, federal compliance requirements, and so forth, companies have spent millions to protect the digital assets supporting their critical information systems. In particular, many companies have recognized that the first security barrier to their business's information systems is their access control system.

Access control pertains to an infrastructure that is directed towards enforcing access rights for network resources. Access control may grant or deny permission to a given device user, device or node, for accessing a resource and may protect resources by limiting access to only authenticated and authorized users and/or devices. Therefore, there is a need in the industry for improved access control solutions. Thus, it is with respect to these considerations, and others, that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE INVENTION

Figure 1:
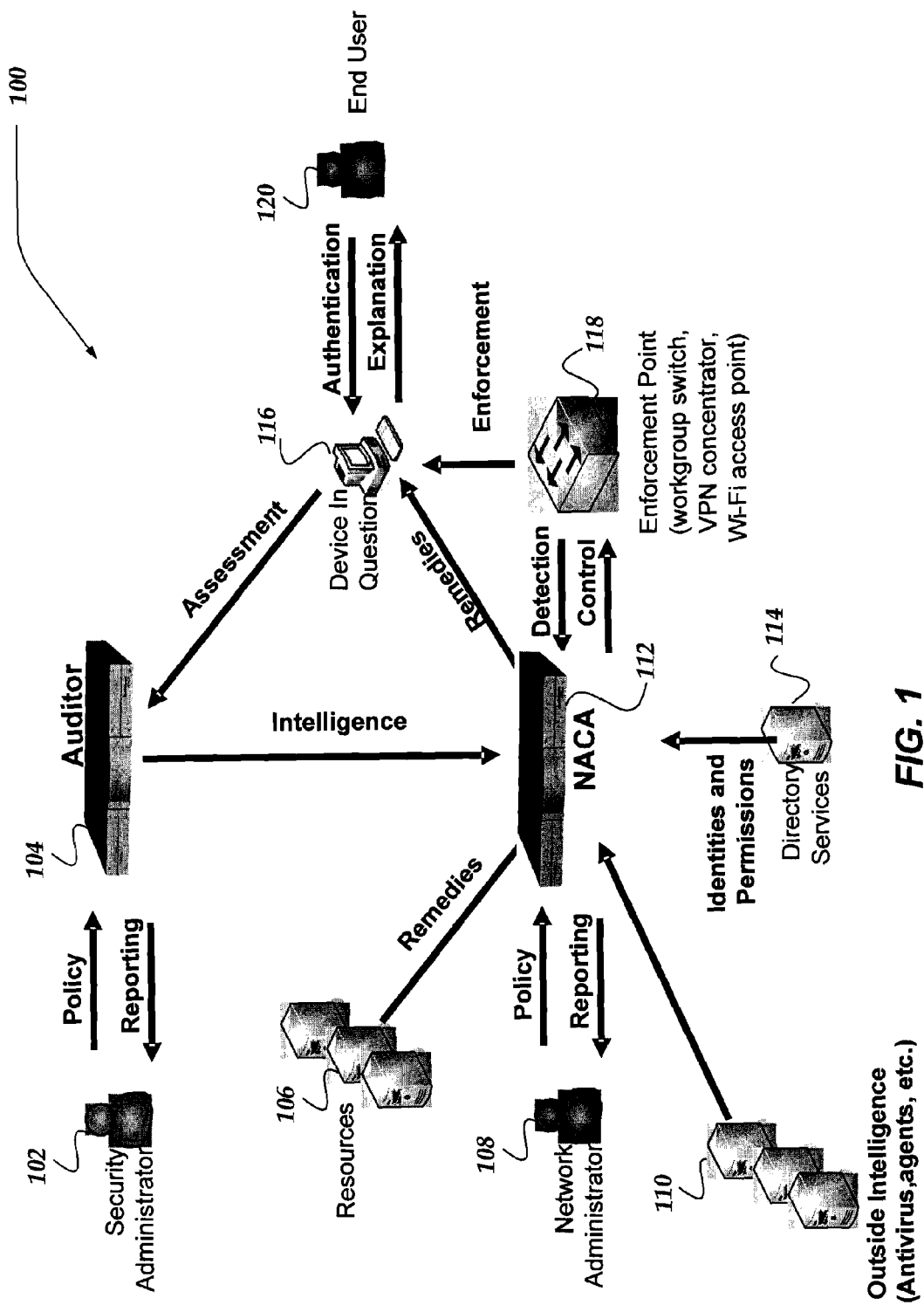
FIG. 1 illustrates one embodiment of an overview information flow employing a network access control appliance (NACA)

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term node refers to virtually any computing device that is capable of connecting to a network. Such devices include, but are not limited to, personal computers, desktop computers, multiprocessor systems, mobile computing devices, microprocessor-based or programmable consumer electronics, network PCs, servers, network appliances, cellular phones, PDAs, or the like. Such devices may employ a wired and/or a wireless mechanism to connect to the network.

As used herein, the term Virtual Local Area Network (VLAN) Assignment Protocol (VLAP) refers to various mechanisms useable by a network device, such as a switch, router, bridge, client, server, or the like, to request that a particular VLAN be employed for use in sending and/or receiving a network packet. In one embodiment, the network packet may be a request to a server. The server may use a policy, look-up, or the like, to determine the VLAN with which to respond. Thus, in one embodiment, a VLAP client includes client devices that are configured to employ VLAP, while a VLAP server includes server devices that are configured to employ VLAP. The various mechanisms may include, but are not limited to, RADIUS MAC authentication, VLAN Membership Policy servers (VMPS), or the like.

As used herein "spoof" and/or "spoof/poisoning" refers to the process of modifying information used by one device to send network packets to a second device by replacing the original destination address of the second device with the address of a spoofing device (or any other network device) to cause the device to send all or substantially all traffic to the address of the spoofing device instead of the intended second device.

As used herein, "802.1x protocol" or "802.1x" refers to the standard IEEE 802.1X authentication protocol. The IEEE 802.1X authentication standard uses an existing protocol, Extensible Authentication Protocol (EAP), for message exchange during an authentication process. Thus, 802.1X may employ a variety of EAP authentication mechanisms, including, but not limited to MD5, Transport Layer Security (TLS), Tunneled Transport Layer Security (TTLS), Lightweight EAP (LEAP), PEAP, or the like. 802.1X is configured to work over Ethernet, Token rings, and other wired, as well as wireless networks. Typically, in a wireless network with 802.1X, a client device requests access to a resource through an 802.1X enabled switch, access point, or the like, sometimes called an authenticator. The client device may then provide an EAP message to the switch. In one embodiment, the message may be an EAP start message. In turn, the switch may provide an EAP message to the client device requesting its identity. When the client provides its identity, the switch may repackage the identity and forward it to an authentication server. The authentication server may then authenticate the client device, and return an accept or reject message to the switch. In one embodiment, the authentication server may employ a Remote Authentication Dial-In User Service (RADIUS), however, the invention is not so limited, and virtually any authentication service may be employed, including an X.509 Certification Authority server, or the like. As used throughout this application, including the claims, 802.1X refers to the IEEE 802.1X protocol and all authentication protocols derived therefrom.

Briefly stated, the present invention is directed towards an apparatus, system, and method for managing dynamic network access control. In one embodiment, the invention enables management of network access control at a network switch port level. The invention provides services and controlled network access that includes quarantining nodes so that they may be identified, audited, and provided an opportunity to be brought into compliance with a security policy, or the like. The invention is configured to detect a device seeking to join or otherwise access the network, identify a switch port that the device is attempting to connect to, and determine if the device is authentic and authorized to join the network. In one embodiment, the network may be an intranet, such as an enterprise's intranet, or the like. If it is determined that the device is unauthorized and/or unauthentic, the device may be quarantined. In one embodiment, the suspect device is quarantined using, for example, a Virtual Local Area Network (VLAN). The act of quarantining the suspect device may also be explained to a user of the suspect device, allowing the user and/or device to be identified and registered. The suspect device may then be audited to determine if there are vulnerabilities that might further prevent the device from connecting to the network. If vulnerabilities are determined, in one embodiment, remediation action may be employed to guide the suspect device, user, and/or administrator of the suspect device towards a resolution of the vulnerabilities, such that the device may be reconfigured for acceptance onto the network.

An alternate embodiment of the present invention is directed towards a system, method, and apparatus for managing access to a network. An agent may intercept an network packet transmitted by an enforcement point in response to a request from a device to join the network. The agent identifies, based on the network packet, a port number on the enforcement point at which the request is received. The agent may transmit the port number to a NACA to enable security enforcement operations to be performed on the device. Another device may reside outside the quarantined network and be enabled by the NACA to direct a remediation measure to be performed on the device. The NACA may spoof an ARP response with an address of the NACA to restrict access to resources. The NACA may also place the device into one of a plurality of quarantined networks.

Moreover, the network includes any computing communication infrastructure that may be configured to couple one computing device to another computing device to enable them to communicate. Such networks are enabled to employ any form of computer readable media for communicating data from one electronic device to another. Generally, such networks can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs can include, for example, twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices can be remotely connected to either LANs or WANs via a modem and temporary telephone link.

Networks may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for mobile devices, such as a mobile device with various degrees of mobility. For example, such networks may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, such networks may include virtually any wireless and/or wired communication mechanism by which data may travel between one computing device and another computing device.

The media used to transmit data in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave or other transport mechanism and includes any data delivery media. The terms "modulated data signal," and "carrier-wave signal" includes a signal that has one or more of its characteristics set or changed in such a manner as to encode data, instructions, data, or the like, in the signal. By way of example, communication media includes wired media such as twisted pair, coaxial cable, fiber optics, wave guides, and other wired media and wireless media such as acoustic, RF, infrared, and other wireless media.

In one embodiment, the invention is directed towards providing protection for substantially every node from substantially every other node on an internal network (e.g., intranets), in part, by preventing unauthorized or vulnerable nodes from fully connecting to the internal network. The invention may employ an apparatus, such as a network appliance, to perform network access enforcement.

FIG. 1 illustrates one embodiment of an overview information flow employing a network access control appliance (NACA). It is important to note, however, that while NACA is configured as a network appliance, the invention is not so limited, and the invention may employ virtually any implementation, including a server, or the like. However, for ease of illustration, the invention is shown using a network appliance.

As shown in the figure, system 100 includes security administrator 102, auditor 104, resources 106, network administrator 108, outside intelligence 110, NACA 112, directory services 114, enforcement point 118, device in question 116, and end user 120.

Security administrator 102 is in communication with auditor 104. Auditor 104 is in communication with NACA 112 and device in question 116. NACA 112 is also in communication with resources 106, network administrator 108, outside intelligence 110, directory services 114, enforcement point 118, and device in question 116. End user 120 is in communication with device in question 116. Device in question 116 is in further communication with enforcement point 118.

Device in question 116 may include virtually any computing device that is configured to receive and to send information over a network. Such devices may include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, or the like. Device in question 116 may also include other computing devices, such as personal computers, multiprocessor systems, microprocessor-based or programmable consumer electronics, network PCs, or the like. As such, device in question 116 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, or the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), Voice XML, or the like, to display and send a message.

Device in question 116 also may include at least one client application that is configured to receive content from another computing device. The client application may include a capability to provide and receive textual content, graphical content, audio content, alerts, messages, notifications, or the like. Moreover, device in question 116 may be further configured to communicate a message, such as through a Short Message Service (SMS), Multimedia Message Service (MMS), instant messaging (IM), interne relay chat (IRC), mIRC, Jabber, Enhanced Messaging Service (EMS), text messaging, Smart Messaging, Over the Air (OTA) messaging, or the like, between another computing device, or the like.

Enforcement point 118 may include virtually any computing device that is configured to control the flow of network traffic. As shown, enforcement point 118 may include a network switch, an enterprise switch, a workgroup switch, a Virtual Private Network (VPN) concentrator, a Wi-Fi access point, or the like. Enforcement point 118 may accept Simple Network Management Protocol (SNMP) requests to enable the control of the flow of network traffic. Enforcement point 118 may also provide detection of the flow of network traffic. As shown, NACA 112 provides controls to enforcement point 118, and enforcement point 118 provides detection information to NACA 112. Also as shown, enforcement point 118 provides network traffic enforcement information, such as Dynamic Host Configuration Protocol (DHCP) information to device in question 116. The enforcement information may enable device in question 116 to route its network traffic appropriately.

End user 120 may include virtually any computing device that is configured to receive and to send information over a network. End user 120 may also include a user in control of the computing device, wherein the user may be enabled to direct the resources and operations of another computing device. As shown, end user 120 may provide such directions and operations to device in question 116. In one embodiment, end user 120 may be a computing device enabled by user to provide directions and operations to device in question 116.

Resources 106 represent virtually any computing device that is configured to provide remediation information over a network. Resources 106 may include a database server, a file server, or the like. As shown, resources 106 may provide remediation information to NACA 112. However, resources 106 are not limited to merely providing remediation information. For example, resources 106 may also be configured to operate as website servers. However, resources 106 are not limited to web servers, and may also operate a messaging server, a File Transfer Protocol (FTP) server, a database server, content server, or the like. Additionally, each of resources 106 may be configured to perform a different operation. Thus, for example, one of resources 106 may be configured as a messaging server, while another of resources 106 may be configured as a database server. Moreover, while s resources 106 may operate as other than a website, they may still be enabled to receive an HTTP communication. Devices that may operate as resources 106 include personal computers, desktop computers, multiprocessor systems, microprocessor-based or programmable consumer electronics, network PCs, servers, or the like.

Outside intelligence 110 represents virtually any computing device that is configured to provide network intelligence information over a network, including, but not limited to, antivirus information, security agents, security patches, updates, or the like. As shown, outside intelligence 110 may provide such information to NACA 112.

Directory services 114 represent virtually any computing device that are configured to provide identity and permission information about a device, network and/or user over a network. As shown, directory services 114 may provide such information to NACA 112.

Auditor 104 represents virtually any computing device that is configured to perform a security assessment (audit) of device in question 116, and provide intelligence about device in question 116. In one embodiment, the audit may be performed periodically, on demand, or based on a configuration and/or detection of an event, or the like. As shown, auditor 104 may provide such intelligence about device in question 116 to NACA 112.

Security administrator 102 may include virtually any computing device that is configured to receive and to send information over a network. System administrator 102 may also include a user in control of the computing device, wherein the user may have permissions to provide security information about a device, network, or the like. In one embodiment, security administrator 102 may be a computing device enabled by a user to provide such security information.

Network administrator 108 may include virtually any computing device that is configured to receive and to send information over a network. Network administrator 108 may also include a user in control of the computing device, wherein the user may have permissions to provide information about a network security, network topology, configuration, or the like. In one embodiment, network administrator 108 may be a computing device enabled by a user to provide such networking information.

NACA 112 may include virtually any computing device that is configured to determine whether a new device may gain access to a network. As shown, NACA 112 is configured to interface to directory services 114 to determine authorization of a user and/or device. NACA 112 may detect a new device attempting to connect to the network. As illustrated, the new device may be device in question 116. In one embodiment, NACA 112 detects access attempts and manages access control at enforcement point 118. In one embodiment, NACA 112 may detect access attempts and manage access control at the switch port level.

NACA 112 may quarantine the new device/suspect node that is not authorized to connect to the network. NACA 112 is not constrained to manage access control based solely on device authorization, however. For example, NACA 112 may determine to quarantine a new device/suspect node based on a user not being authorized, a device not having been audited, or audited within a defined time period, an audit result/intelligence that does not conform to a policy, and/or based on virtually any other intelligence about a device, and/or user that may indicate policy nonconformance. In one embodiment, NACA 112 may determine to quarantine a new device/suspect node based on end user 120 not being authorized to connect to the network, access a resource, or the like. In one embodiment, NACA 112 may receive the policy from auditor 104, security administrator 102, or the like. NACA 112 may also receive intelligence about a device, and/or user that may indicate policy nonconformance from outside intelligence 110.

NACA 112 may be configured to operate, in one embodiment, providing a policy that defines which sites/servers or the like, a quarantined device may access. NACA 112 may operate with virtually any of a variety of switches, routers, gateways, or the like, to securely quarantine the device. In one embodiment, NACA 112 may employ an enterprise switch to quarantine the suspect device. However, NACA 112 does not require most switches to have updated hardware or firmware. In another embodiment, NACA 112 may quarantine the suspect node by employing Enforcement Point 118.

NACA 112 may redirect quarantined devices, such as device in question 116, to a "friendly" web site, where a user, device, and/or the like, may register, schedule an audit, find audit results/intelligence, and/or receive remediation information. In one embodiment, NACA may redirect quarantined devices to resources 106, which may provide remediation information.

NACA 112 may also be configured to provide a single point of control and reporting for an entire enterprise, while remaining massively scalable. NACA 112 is further configured to be easy to deploy and manage, at least in part, because it does not require agents. NACA 112 recognizes that use of agents may result in decreased security for a variety of reasons, including, because they may require compatibility testing for critical systems, may be accidentally or intentionally disabled, may be cumbersome to deploy and maintain, unsuitable for guests, as well as potentially being unavailable for every type of device, operating system, or the like. However, NACA 112 is capable of receiving information from an agent when one is available.

Moreover, NACA 112 may operate with other protection initiatives. Additionally, because in one embodiment, it uses switches to enforce quarantine at OSI layer 2, rather than relying on DHCP, NACA 112 may increase security over more traditional initiatives.

NACA 112 may be further configured to provide intelligence to wireless products, thereby preventing rogue access points on a network. While a firewall may be directed towards blocking external threats to a network, NACA 112 further blocks internal as well as external threats. In one embodiment, NACA 112 may provide a VPN-like access control to virtually an internal port.

NACA 112 may be configured to verify that such applications as antivirus, firewalls, spyware detectors, or the like, are installed, running, properly configured, and kept up to date before letting a device on a network. In one embodiment, NACA 112 may receive such intelligence from outside intelligence 110.

NACA 112 may also ensure that a patch management product is operational and has successfully performed its actions upon a device. In one embodiment, NACA 112 can provide restricted access to quarantined devices so that patches can be deployed onto the device before joining the network.

NACA 112 may employ auditor 104 to perform an assessment of a device in question, and provide intelligence to NACA 112. In one embodiment, auditor 104 may be an auditor network appliance, device, or the like. NACA 112 is not constrained to receiving intelligence from an auditor, however. NACA 112 may receive intelligence about the network, device in question, or the like, from virtually any source, including an anitvirus application, firewall, spyware detector, and even an agent. In one embodiment, NACA 112 may receive such intelligence from outside intelligence 110. NACA 112 may employ policies provided by an administrator, such as security administrator 102 or network administrator 108, and to provide reports to those administrators regarding the network, device in question 116, or the like. Based, in part, on the received intelligence, and the policies, NACA 112 provides remedies to device in question 116, directs enforcement point 118 on how to enforce the policy, or the like.

Figure 2:
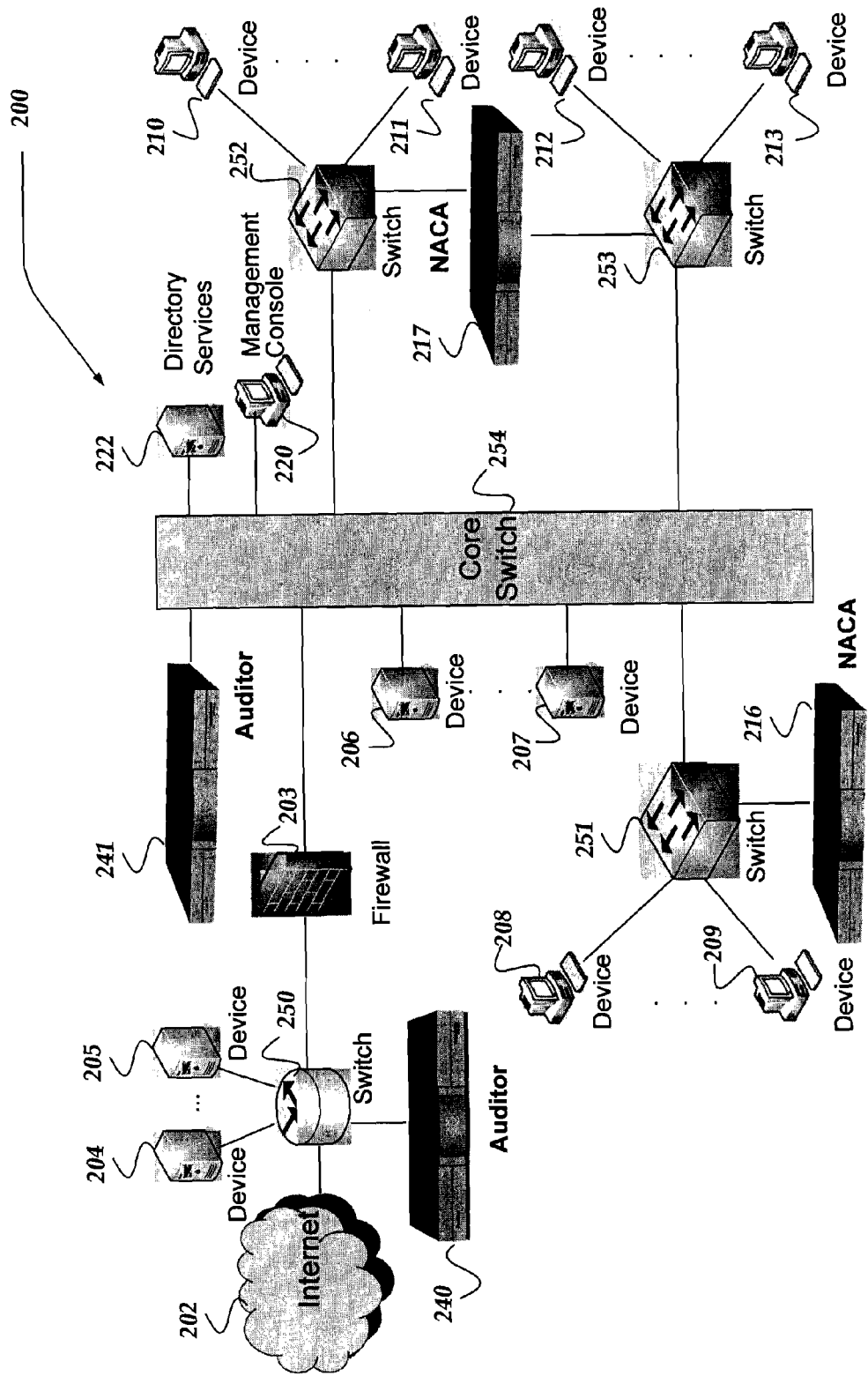
FIG. 2 illustrates one embodiment of an overview of a possible deployment architecture employing at least one NACA.

FIG. 2 illustrates one embodiment of an overview of a possible deployment architecture employing at least one NACA. As shown, system 200 includes devices 204-213, switches 250-253, core switch 254, auditors 240-241, NACAs 216-217, firewall 203, Internet 202, directory services 222, and management console 220.

As illustrated, switch 250 is in communication with Internet 202, devices 204-250, firewall 203, and auditor 240. Switch 251 is in communication with NACA 216, devices 208-209 and core switch 254. Switch 252 is in communication with NACA 217, devices 210-211 and core switch 254. Switch 253 is in communication with NACA 217, devices 212-213 and core switch 254. Core switch is in communication with devices 206-207, firewall 203, auditor 241, directory services 222, management console 220, and switches 252-253.

Devices 204-213 may include virtually any computing device that is configured to receive and to send information over a network. Devices 204-213 may operate substantially similar to device in question 116 of FIG. 1. For example, devices 204-213 may request access to a network through a switch.

Auditors 240-241 represent virtually any computing device that is configured to perform a security assessment (audit) of a device in question, and provide intelligence about the device in question. Auditors 240-241 may operate substantially similar to Auditor 104 of FIG. 1. In one embodiment, the suspect node/device in question may be at least one of devices 204-213.

Directory services 220 represent virtually any computing devices, such as external enterprise directories, that are configured to provide identity and permission information about a device, network and/or user over a network. Additionally, directory services 220 may operate substantially similar to directory services 114 of FIG. 1.

Management console 220 represents virtually any computing device that is configured to provide a single point of control of several NACAs, including NACAs 216-217. In one embodiment (not shown), an administrator may be in communication with management console 220.

Switches 250-253 and firewall 203 may include virtually any computing device that is configured to control the flow of network traffic. For example, switches 250-253 (and/or core switch 254) may be implemented as a router, bridge, network switch, network appliance, or the like. Switches 250-253 and firewall 203 may operate substantially similar to enforcement point 118 of FIG. 1. For example, switches 250-253 and firewall 203 may be employed to quarantine a suspect node/device in question. Additionally, firewall 203 may include computing devices, such as routers, proxy servers, gateways, or the like that include software filters for shielding trusted networks within a locally managed security perimeter from external, untrusted networks, such as Internet 202. Moreover, core switch 254 may operate to separate, or filter, network traffic between an intranet network and an external network, such as the internet.

NACAs 216-217 may include virtually any computing device that is configured to enable a new device to gain access to a network, and may operate substantially similarly to NACA 112. As shown, NACAs 216-217 may operate on either side of core switch 254, providing support to a network segment within an intranet. In one embodiment, NACAs 216-217 may quarantine a suspect node/device in question by employing at least one of switch 250-253, core switch 254, auditor 240-241, and/or firewall 203. In one embodiment, NACAs 216-217 may quarantine a suspect node/device in question through a firewall, such as firewall 210. NACAs 216-217 may also receive intelligence about a device, and/or user that may indicate policy nonconformance from auditor 240 through firewall 203. NACAs 216-217 may also receive such intelligence from auditor 241 through core switch 254.

Figure 3:
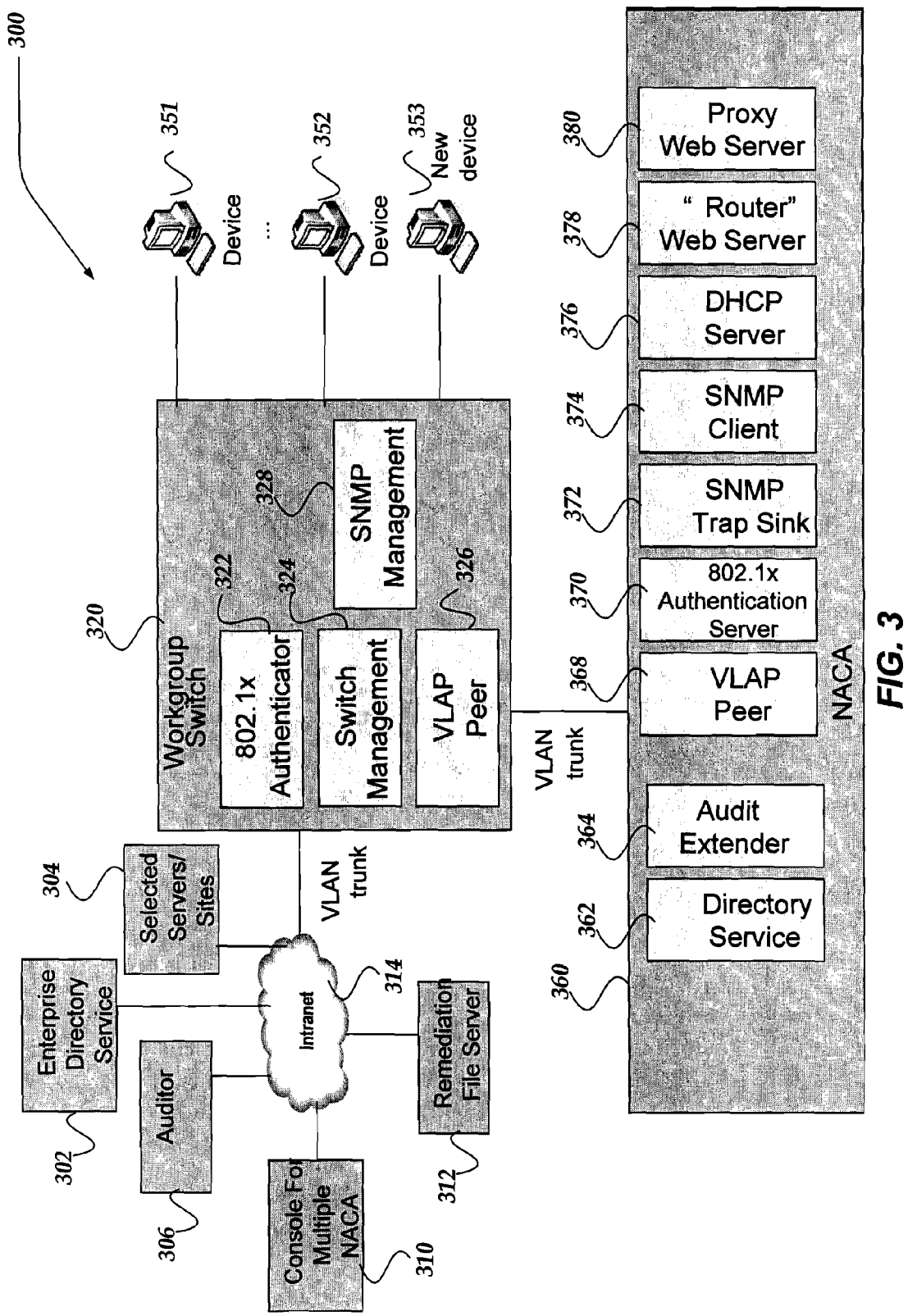
FIG. 3 illustrates one embodiment of one topology of an overview of a possible deployment architecture employing the NACA.

FIG. 3 illustrates one embodiment of one topology of an overview of a possible deployment architecture employing the NACA. As shown, the topology is directed towards avoiding problems that may arise using a conventional 802.1x implementation, including possible disruptions of a business, and manual interventions.

As shown, system 300 includes enterprise directory service 302, selected servers/sites 304, auditor 306, console for multiple NACA 310, remediation file server 312, intranet 314, workgroup switch 320, devices 351-352, new device 353, and NACA 360. Workgroup switch 320 may include 802.1x authenticator 322, VLAP client 326, switch management 324, and SMNP management 328. NACA 360 may includes Simple Network Management Protocol (SNMP) client 374, SNMP trap sink 372, 802.1x authentication server 370, VLAP server 368, proxy web server 380, "router" web server 378, directory service 362, DHCP 376, and audit extender 364.

As shown in the figure, console for multiple NACA 310, auditor 306, enterprise directory service 302, selected servers/sites 304, and remediation file server 312 are in communication with workgroup switch 320 through intranet 314. Intranet 314 enables communication between console for multiple NACA 310, auditor 306, enterprise directory service 302, selected servers/sites 304, and remediation file server 312 and workgroup switch 320. Workgroup switch 320 may be further in communication with a NACA 360. In one embodiment (not shown), console for multiple NACA 310, auditor 306, enterprise directory service 302, selected servers/sites 304, and remediation file server 312 may be in communication with NACA 360 through a communication mechanism, such as a secure channel, a Simple Object Access Protocol (SOAP) connection, a Secure Socket Layer (SSL) connection, or the like. Although not shown, console for multiple NACA 310 may also be in communication with other switches and/or other NACAs substantially similar to the components illustrated in FIG. 2. In one embodiment, as shown, new device 353 is in communication with workgroup switch 320. Devices 351-352 may also be in communication with workgroup switch 320.

Console for multiple NACA 310 may be include virtually any computing device enabled to control at least one NACA, such as NACA 310, and/or other NACAs. In one embodiment, console for multiple NACA 310 may operate substantially similar to management console 220 of FIG. 2.

Auditor 302 represents virtually any computing device that is configured to perform a security assessment (audit) of a device in question, and provide intelligence about the device in question. In one embodiment, auditor 302 performs actions substantially similar to auditor 104 of FIG. 1 and may provide intelligence about a device, and/or user that may indicate policy nonconformance.

Enterprise directory service 302 represent virtually any computing device, such as an external enterprise directory, that is configured to provide identity and permission information about a device, network and/or user over a network. In one embodiment, enterprise directory service 302 performs actions substantially similar to directory services 114 of FIG. 1 and may provide authorization information about a device and/or a user of the device.

Selected servers/servers 304 and remediation files server 312 represent virtually any computing device that is configured to provide remediation information over a network. Selected servers/servers 304 and remediation files server 312 may provide remediation information to a quarantined device substantially similar to resources 106 of FIG. 1.

Workgroup switch 320 includes may include virtually any computing device that is configured to control the flow of network traffic. In one embodiment, workgroup switch 320 performs actions substantially similar to enforcement point 118. The components illustrated within workgroup switch 320 may be employed in quarantining a device, auditing the device, granting the device access to some resources, routing network traffic from the device to a NACA, such as NACA 360, or the like.

Devices 351-353 may include virtually any computing device that is configured to receive and to send information over a network. Devices 351-353 may operate substantially similar to device in question 116 of FIG. 1. Devices 351-352 may be previously audited and authorized devices and may have been granted access to the network. New device 353 may represent a device that has requested access to a network through a workgroup switch 320.

NACA 360 is not limited to the components illustrated within, and more or less components may be implemented within NACA 360, without departing from the scope of spirit of the invention. Moreover, its components may be employed in conjunction with workgroup switch 320 to quarantine a device, audit the device, provide remediation guidance to the device, grant the device access to some resources, or the like. In one embodiment, NACA 360 may be implemented employing a configuration such as is described in more detail below in conjunction with FIG. 27.

Figure 20:
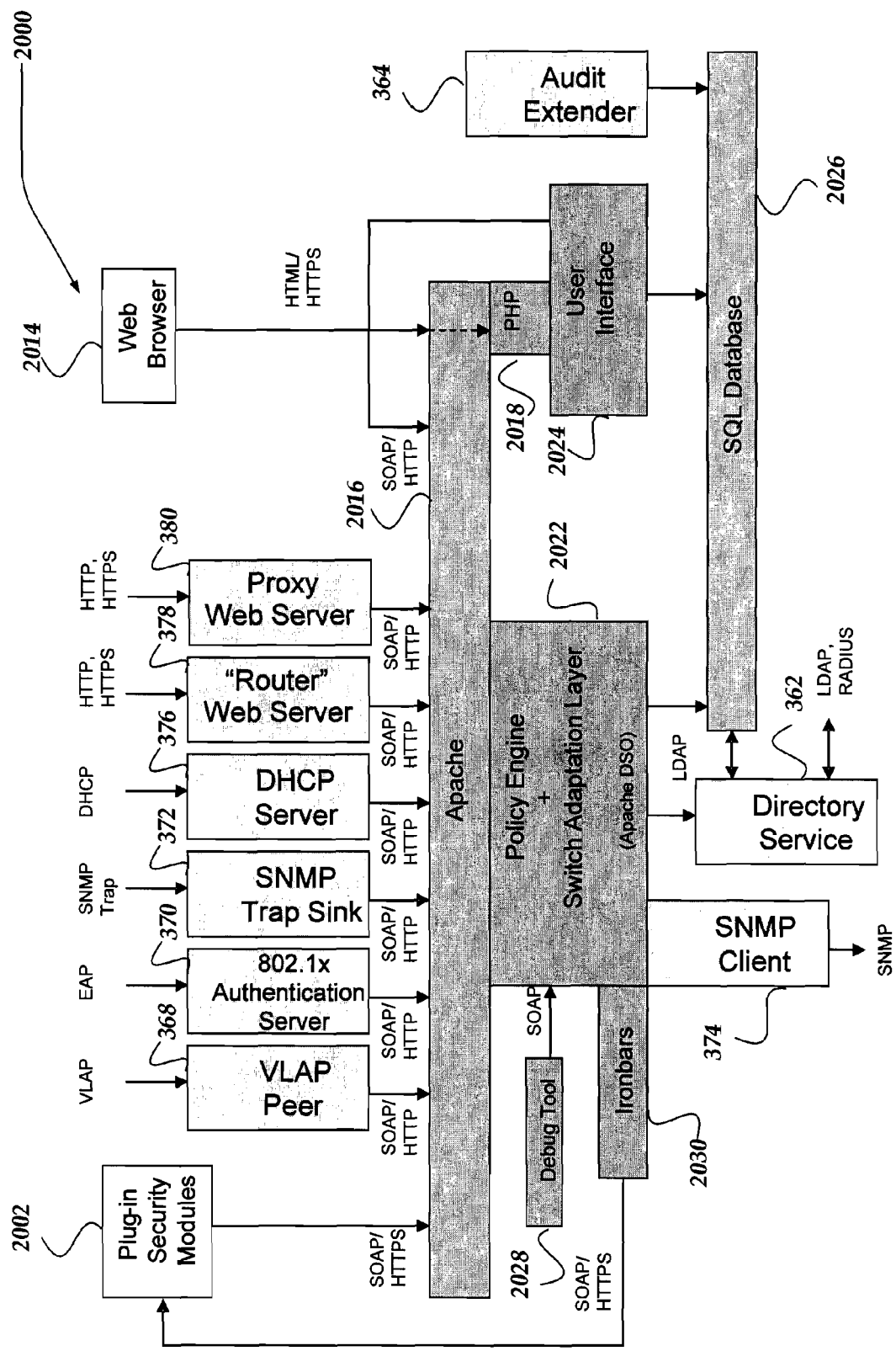
FIG. 20 illustrates one embodiment of an internal architecture.

FIG. 20 illustrates one embodiment of an internal architecture for the present invention, wherein a variety of components may be employed. However, while example components are shown, such as Apache 2016, SOAP/HTTP, SQL database 2026, Remote Authentication Dial-In User Service (RADIUS), Ironbars 2030, or the like, the invention is not so limited, and other components that operate substantially similar may be employed instead or in addition to those shown. As shown, system 2000 also includes SNMP trap sink 372, 802.1x authentication server 370, VLAP server 368, proxy web server 380, "router" web Server 378, DHCP 376, Apache 2016, directory service 362, SNMP client 374, policy engine and switch adaptation layer (SAL) 2022, plug-in security modules 2002, debug tool 2028, user interface 2024, PHP 2018, and web browser 2014.

As shown, SNMP trap sink 372, 802.1x authentication server 370, VLAP server 368, proxy web server 380, and "router" web server 378, and plug-in security modules 2002 are in communication with an Apache 2016 via SOAP/HTTP, or the like. Web browser 2014 may be in communication with Apache 2016 via HTML/HTTPS. PHP 2018 may also be in communication with Apache 2016 through an API interface. Directory service 362, SNMP client 374, Apache 2016, debug tool 2028, Ironbars 2030, and SQL database 2026 are in communication with SAL 2022. User interface 2024 may be in communication with PHP 2018 and in further communication with Apache 2016 via SOAP/HTTP. SQL database 2026 may be in communication with audit extender 364 and in further communication with directory service 362 via LDAP.

SAL 2022 may include any computing service enabled to provide a security policy for use in quarantining nodes so that they may be identified, audited, and provided an opportunity to be brought into compliance with the security policy. SAL 2022 may also enable Apache Dynamic Shared Objects (DSO), COM objects, or the like. These objects may implement the logic of SAL 2022. In one embodiment, SAL 2022 in conjunction with SNMP Trap Sink 372, 802.1x Authentication Server 370, VLAP server 368, Proxy Web Server 380, and "Router" Web Server 378, may detect a device seeking to join the network, identify a switch port that the device is attempting to connect to, determine if the device is authentic and authorized to join the network, and as appropriate quarantine the device, grant the device access to the network, or the like. An enterprise security system, such as Ironbars 2030 may be in communication with and control of SAL 2022. Debug tool 2028 may any computing device enabled to monitor and modify the operation of SAL 2022 via SOAP. Directory Service 362 and SQL database 2026 may be in communication with SAL 2022 via LDAP. SQL database 2026 may act as an internal directory service and store any previous audit results/intelligence associated with a suspect device. SQL database 2026 may also store some or all of the security policy information. Correspondingly, audit extender 364 may provide audit results/intelligence to SQL database 2026.

Web browser 2014 may be any web client software and/or device enabled to provide information to a web server such as Apache 2016. Apache 2016 may be an Apache web server but may be any other variety of web server. In one embodiment, web browser 2014 provides the user interface for administering NACA 116 of FIG. 1, providing policies, reporting, remediation guidance, or the like.

Plug-in Security Modules 2002 may also be in communication with Apache 2016 via SOAP/HTTP and may be enabled to direct the security measures associated with SNMP trap sink 372, 802.1x authentication server 370, VLAP server 368, proxy web server 380, and "router" web Server 378, SAL 2022 or the like. PHP 2018 includes any software and/or device enabled to provide the operating logic for Apache 2016. However, any enterprise software may be in communication with Apache 2016, and may provide the logic for the user interface embodying the invention. For example, PHP 2018 may direct user interface 2024 to provide information to, and retrieve information from SQL Database 2026.

Figure 21:
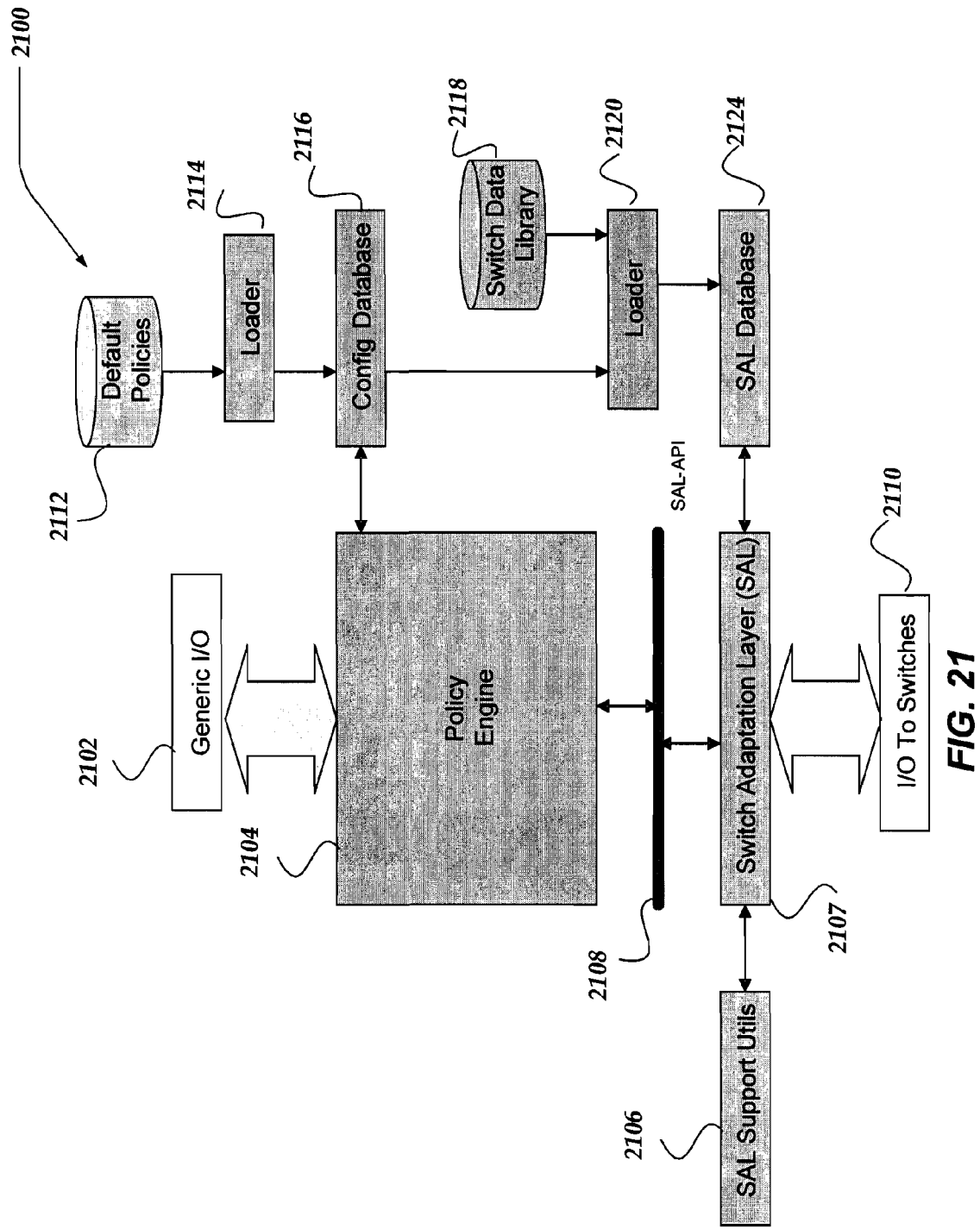
FIG. 21 illustrates one embodiment of an architecture employing a switch adaptation layer (SAL)

FIG. 21 illustrates one embodiment of an architecture employing a switch adaptation layer (SAL). As shown, system 21000 includes generic IO 2102, policy engine 2104, SAL-API 2108, switch adaptation layer (SAL) 2107, SAL support utilities 2106, I/O to switches 2110, default policies 2112, loader 2114, configuration database 2116, loader 2120, switch data library 2118, and SAL database 2124.

As shown, policy engine 2104 is in communication with generic I/O 2102, such as web browser 2014 of FIG. 20, or the like, configuration database 2116, and SAL-API 2108. Default policies 2112 is in communication with loader 2114. Loader 2114 is in communication with configuration database 2116. Configuration database 2116 is in communication with loader 2120. Loader 2120 is in further communication with switch data library 2118 and SAL database 2124. SAL 2107 is in communication with I/O to switches 2110, SAL-API 2108, SAL support utilities 2106 and SAL database 2124.

In one embodiment, generic I/O 2102, policy engine 2104, SAL-API 2108, switch adaptation layer (SAL) 2107, SAL support utilities 2106, and I/O to switches 2110 may be embodied by SAL 2022 of FIG. 20. Policy engine 2104 may provide its Application Programming Interface (API), user interface or the like via generic I/O 2102. In one embodiment, generic I/O 2102 may provide a user interface for administering NACA 116 of FIG. 1, or the like. Default policies 2112 may operate as a database for storing security policies. In one embodiment, default policies 2112 may operate substantially similar to SQL database 2026 of FIG. 20. Default policies 2112 provide the security policies to loader 2114, which in turn provides information to configuration database 2116. In one embodiment, configuration database 2116 may operate substantially similar to SQL Database 2026 of FIG. 20. Configuration database 2116 may provide security policies and configuration information to policy engine 2104. Configuration database 2116 may also provide information to loader 2120. Switch data library 2118 may also provide information about a switch to loader 2120. In one embodiment, the information may be configuration information, security information, dynamically loaded libraries, objects, or the like, of a switch substantially similar to enforcement point 118 of FIG. 1. SAL database 2124 may receive the information from loader 2120, and provide the information to SAL 2107. SAL support utilities 2106 may also enable various configuration and control of SAL 2017. Policy engine 2104 may control SAL 2107 via SAL-API 2108. Correspondingly, SAL 2107 may provide information to policy engine 2104 via SAL-API 2108. In one embodiment, policy engine 2104 may enable SAL 2107 to detect a device seeking to join the network, identify a switch port that the device is attempting to connect to, determine if the device is authentic and authorized to join the network, and as appropriate quarantine the device, grant the device access to the network, or the like. SAL 2107 may provide its API, user interface or the like, via I/O to switches 2110.

Figure 24:
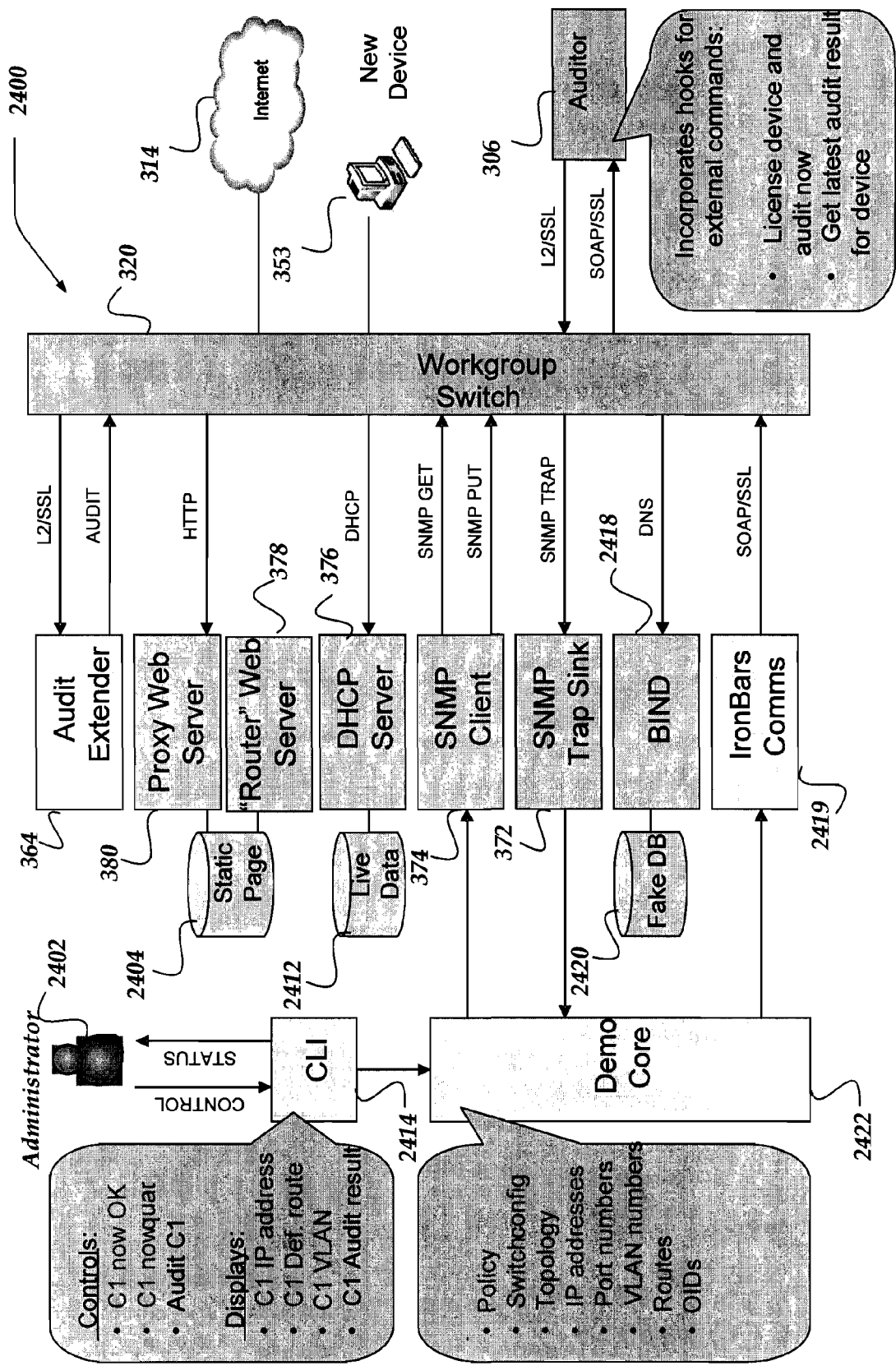
FIG. 24 illustrates one embodiment of an overview architecture for use with a NACA.

FIG. 24 illustrates one embodiment of an overview architecture for use with a NACA. The topology and components of this architecture is at least substantially similar to the system illustrated in FIG. 3. As shown, system 2400 includes the components of FIG. 3, and administrator 2402, static pages 2404, live data 2412, Control Logic Interface (CLI) 2414, demo core 2422, fake DB 2420, Ironbars Comms 2419, and Berkeley Internet Name Domain DNS server (BIND) 2418.

As shown, SNMP trap sink 372, proxy web server 380, and "router" web server 378, Ironbars comm 2419, BIND 2418, auditor 306 and new device 353 are in communication with workgroup switch 320. Although not shown, VLAP server 368, 802.1x authentication server 370, and directory service 362 may also be in communication with workgroup switch 320. Workgroup switch 320 may be in communication with an internet, such as Intranet 314. CLI is in communication with administrator 2402 and demo core 2422. Demo core is in communication with SNMP client 374, SNMP trap sink 372, and Ironbars comms 2419. Static page 2404 is in communication with proxy web server 380 and "router" web server 378. Live data 2412 is in communication with DHCP server 376. Fake DB is in communication with BIND 2418.

As shown, new device 353 may include any computing device seeking to join a network by linking to workgroup switch 320. BIND 2418 may provide DNS information to Workgroup Switch 320. However, virtually any other DNS servers may be utilized. In one embodiment, fake DB 2420 may provide temporary domain names, IP numbers, DNS information, or the like to the workgroup switch 360. New device 353, and/or other device seeking to join the network may be assigned temporary domain names, IP numbers, DNS information, or the like. In another embodiment, fake DB 2420 may provide such information associated with an intranet, the Internet, an enterprise network, or the like. IronBars Comms 2419 may be virtually any computing device that is enabled to provide security measures for workgroup Switch 360. In one embodiment, IronBars comms 2419 may operate substantially similar to Ironbars 2030. As shown, CLI 2414 may be in device that is enabled to direct demo core 2422 to perform operations as described in conjunction with FIGS. 4-18, and FIGS. 22-23. In one embodiment, demo core 2422 enables policies, switch configuration information, IP addresses, port numbers, VLAN numbers, routes, OIDs, or the like. In one embodiment, the information may be hard coded. In another embodiment, such information may be dynamic and modifiable. CLI 2414 and demo core 2422 may operate substantially similar to SAL 2022 of FIG. 20, and may detect a device seeking to join the network, identify a switch port that the device is attempting to connect to, determine if the device is authenticate and authorized to join the network, quarantine the device, grant the device access to the network, or the like. Administrator 2402 may be any user and/or device that is enabled to provide CLI 2414 with policies, remediation instructions, quarantine instructions, or the like. In turn, CLI 2414 may provide security reports, reports about the current usage of VLANS associated with workgroup switch 320, the default routes enabled by DHCP server 376, audit results/intelligence, or the like to administrator 2404.

Figure 25:
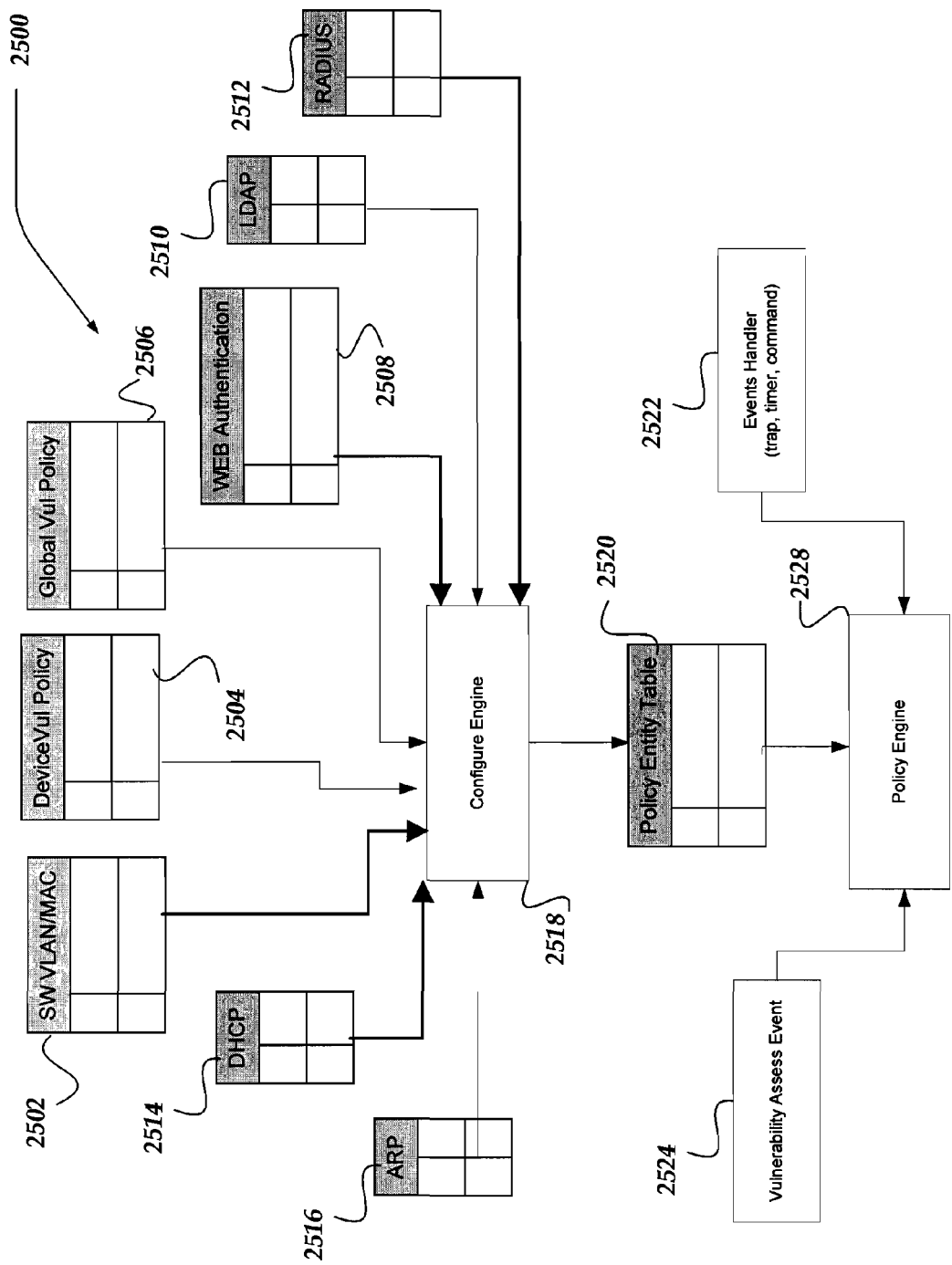
FIGS. 25-26 illustrate embodiments of an overview architecture for managing a policy database.
Figure 26:
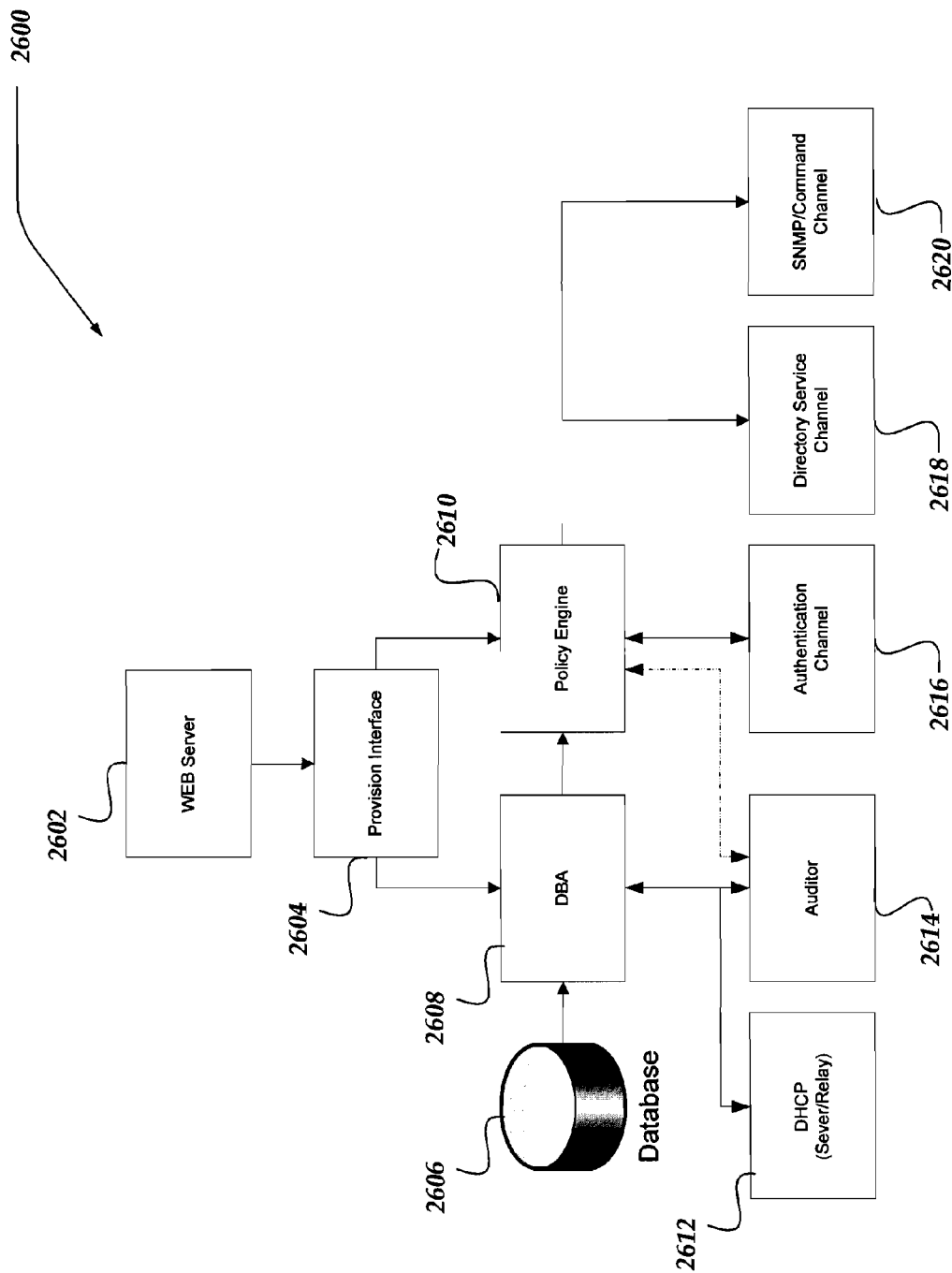

FIGS. 25-26 illustrate embodiments of an overview architecture for managing a policy database for use with the present invention. As shown, system 2500 includes SW VLAN/MAC table 2502, device vulnerability policy table 2504, global vulnerability policy table 2506, DHCP table 2514, Address Resolution Protocol (ARP) table 2516, WEB authentication table 2508, LDAP table 2510, RADIUS table 2512, policy entity table 2520, configuration engine 2518, vulnerability assess event 2524, policy engine 2528, and events handler 2522.

As shown, SW VLAN/MAC table 2502, device vulnerability policy table 2504, global vulnerability policy table 2506, DHCP table 2514, ARP table 2516, WEB authentication table 2508, LDAP table 2510, RADIUS table 2512, and policy engine table 2520 may be accessible by and in communication with configuration engine 2518. Policy entity table 2520 may be accessible by and in communication with policy engine 2528. Additionally, policy engine 2528 is in communication with vulnerability assess event 2524 and events handler 2522.

As shown, a policy database entry may be formed using a listed database, table on the switch, external servers, and internal processes are employed to make two binds, an IP- MAC and a user-IP bind. However, the invention is not so limited, and more or less binds, and well as other binds may also be provided. In one instances, user identity is not required, since an actuator might not be employed to manage a user device.

The policy database includes three areas: vulnerability scan prescription, authentication provision, and a quarantine policy. As shown, vulnerability assess event 2524 enables the vulnerability scan prescription. Events handler 2522 enables authentication provisions, such as detections of traps, timing events, or the like, and the enablement of the control of authentication provisions. Policy engine 2528 enables the quarantine policy, and may operate substantially similar to policy engine 2104, and directs how to interpret vulnerability and authentication results, and a corresponding quarantine action. In one embodiment, the quarantine policy may be enforced using any one or combination of IP, MAC, port address, or the like. Policy engine 2528 may also enable other policies, including authentication policies, auditing schedules, or the like. Policy Engine 2528 receives policy information from policy entity table 2520, which in turn provides the policy information to Configure Engine 2518.

Configure engine 2518 may receive information from various configuration sources which may enable the configuration of the authentication policies, auditing schedule, quarantine policies or the like. Configuration Engine 2518 may also operate substantially similar to Policy Engine 2104 of FIG. 21, SAL 2022 of FIG. 20, or the like. Configuration engine 2518 may receive configuration information from various database tables: ARP table 2516, DHCP table 2514, SW VLAN/MAC table 2502 which contains VLAN and MAC address information, device vulnerability policy table 2504 which contains device vulnerability policies, global vulnerability policy table 2506 which contains global vulnerabilities policies, WEB authentication table 2508, LDAP table 2510, and RADIUS table 2512.

FIG. 26 illustrates that a database may be served by a database administrator (DBA) that warrants synchronization of data, provides an interface to internal modules that may be independent of a data change, or the like. The database may be distributed, in one embodiment. Where DHCP and authentication is distributed, the policy engine may employ a directory service channel to obtain information.

Thus, as shown, system 2600 of FIG. 26 includes web server 2602, provision interface 2604, database administrator (DBA) 2608, database 2606, policy engine 2610, DHCP (server/relay) 2612, auditor 2614, authentication channel 2616, directory service channel 2618, and SNMP/command channel 2620.

As shown, provision interface is in communication with web server 2602, DBA 2608 and policy engine 2610. DBA 2608 is in further communication with database 2606, policy engine 2610, DHCP (server/relay) 2612, and auditor 2614. Policy engine 2610 is also in communication with auditor 2614, authentication channel 2616, directory service channel 2618 and SNMP/command channel 2620.

As shown, database 2606 may be served by a database administrator (DBA) 2608 that warrants the synchronization of the data, provides an interface to internal modules that are independent of a database change, or the like. In one embodiment, database 2606 may contain tables substantially similar to those illustrated in FIG. 25. The database may be distributed, in one embodiment. Web server 2602 may operate substantially similar to proxy web server 380, "router" web server 378 of FIG. 3, Apache 2016 of FIG. 20, or the like. Web server 2602 may provide administrator commands, policies, or the like to provision interface 2604, which may configure the information and route the information to DBA 2608 and policy engine 2610. Policy engine 2610 may operate substantially similar to policy engine 2104 of FIG. 21, SAL 2022 of FIG. 20, or the like. DHCP is enabled by DHCP (server/relay) 2612. Auditor 2614 operates substantially similar to auditor 104 of FIG. 1. Authentication channel 2616 operates substantially similar to VLAP server 368, and 802.1x authentication server 370 of FIG. 3, and may enable the authentication of a new device seeking to join the network. Where DHCP and authentication is distributed, Policy engine 2610 may employ directory service channel 2618 to obtain information, including authentication information about a user and/or a device. Policy engine 2610 may also use SNMP/command channel 2620 to monitor and control a switch on which a new device may be seeking to gain access to a network. In one embodiment (not shown), the switch may be workgroup switch 320 of FIG. 3.

Illustrative Network Appliance

Figure 27:
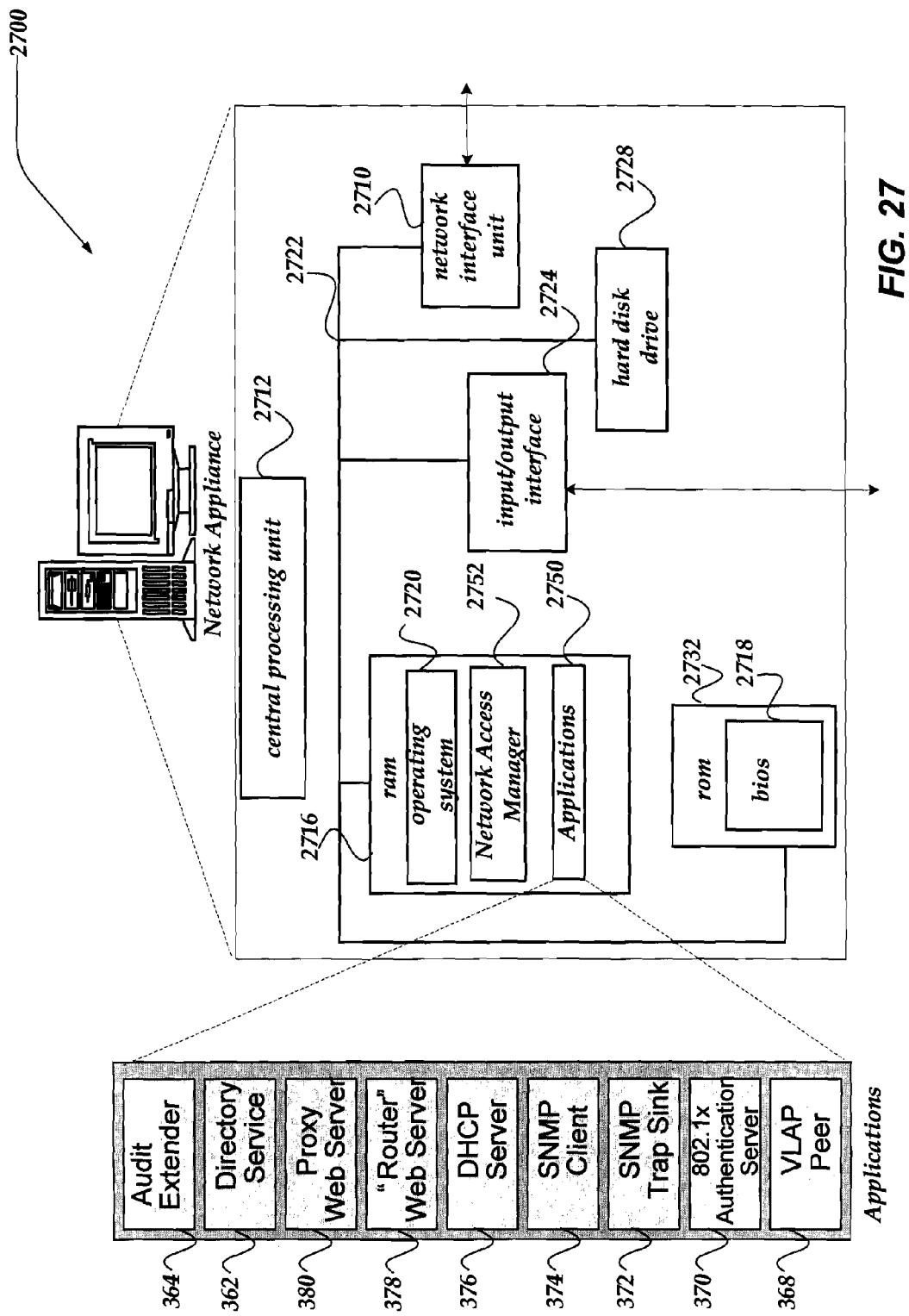
FIG. 27 illustrates one embodiment of a network appliance that may be included in a system implementing the invention.

FIG. 27 illustrates one embodiment of a network appliance that may be included in a system implementing the invention, in accordance with the present invention. Network appliance 2700 may include many more components than those shown. The components shown, however, are sufficient to disclose an illustrative embodiment for practicing the invention. In addition, although the invention illustrates use of a network appliance, the invention is not so constrained, and virtually any network computing device may be employed, including a server, or the like.

Network appliance 2700 includes processing unit 2712, and a mass memory, all in communication with each other via bus 2722. The mass memory generally includes RAM 2716, ROM 2732, and one or more permanent mass storage devices, such as hard disk drive 2728, tape drive, optical drive, and/or floppy disk drive. The mass memory stores operating system 2720 for controlling the operation of network appliance 2700. Any general-purpose operating system may be employed. Basic input/output system ("BIOS") 2718 is also provided for controlling the low-level operation of network appliance 2700. As illustrated in FIG. 27, network appliance 2700 also can communicate with the Internet, or some other communications network, via network interface unit 2710, which is constructed for use with various communication protocols including the TCP/IP protocol. Network interface unit 2710 is sometimes known as a transceiver, transceiving device, network interface card (NIC), or the like.

Network appliance 2700 may also include an SMTP handler application for transmitting and receiving email. Network appliance 2700 may also include an HTTP handler application for receiving and handing HTTP requests, and an HTTPS handler application for handling secure connections. The HTTPS handler application may initiate communication with an external application in a secure fashion.

Network appliance 2700 also includes input/output interface 2724 for communicating with external devices, such as a mouse, keyboard, scanner, or other input devices not shown in FIG. 27. Likewise, network appliance 2700 may further include additional mass storage facilities such as hard disk drive 2728. Hard disk drive 2728 is utilized by network appliance 2700 to store, among other things, application programs, databases, or the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more Applications 2750 are loaded into mass memory and run on operating system 2720. Examples of application programs include email programs, schedulers, calendars, web services, transcoders, database programs, word processing programs, spreadsheet programs, and so forth. Application programs 2750 may further include those components described below in conjunction with FIG. 3, including SNMP client 374, SNMP trap sink 372, 802.1x authentication server 370, VLAP server 368, proxy web server 380, a router, such as "router" web server 378, directory service 362, and audit extender 364 that is configured to enable an audit across multiple network segments, through a firewall or the like. However, the invention is not limited to these applications, and others may be implemented, without departing from the scope of spirit of the invention. Mass storage may further include network access manager 2752. In one embodiment, network access manager 2752 enables the components of applications 2759 to quarantine a suspected device so that it may be identified, audited, and provided an opportunity to be brought into compliance with a security policy. In one embodiment, network access manager 2752 may operate substantially similar to configuration engine 2518 of FIG. 25, policy engine 2104 of FIG. 21, SAL 2022 of FIG. 20, or the like. Network access manager 2752 may be configured to perform at least those actions described in conjunction with FIGS. 4-19, and FIGS. 22-23.

Generalized Operation

The operation of certain aspects of the invention will now be described with respect to FIGS. 4-19 and FIGS. 22-23. FIGS. 4-18 illustrates embodiments of a process for enabling a new device to seek access to a network. FIG. 19 one embodiment that may be used to summarize the process embodied by FIGS. 4-18. Additionally, FIGS. 4-19 illustrates substantially the same system, topology, and components as described in FIG. 3.

Figure 4:
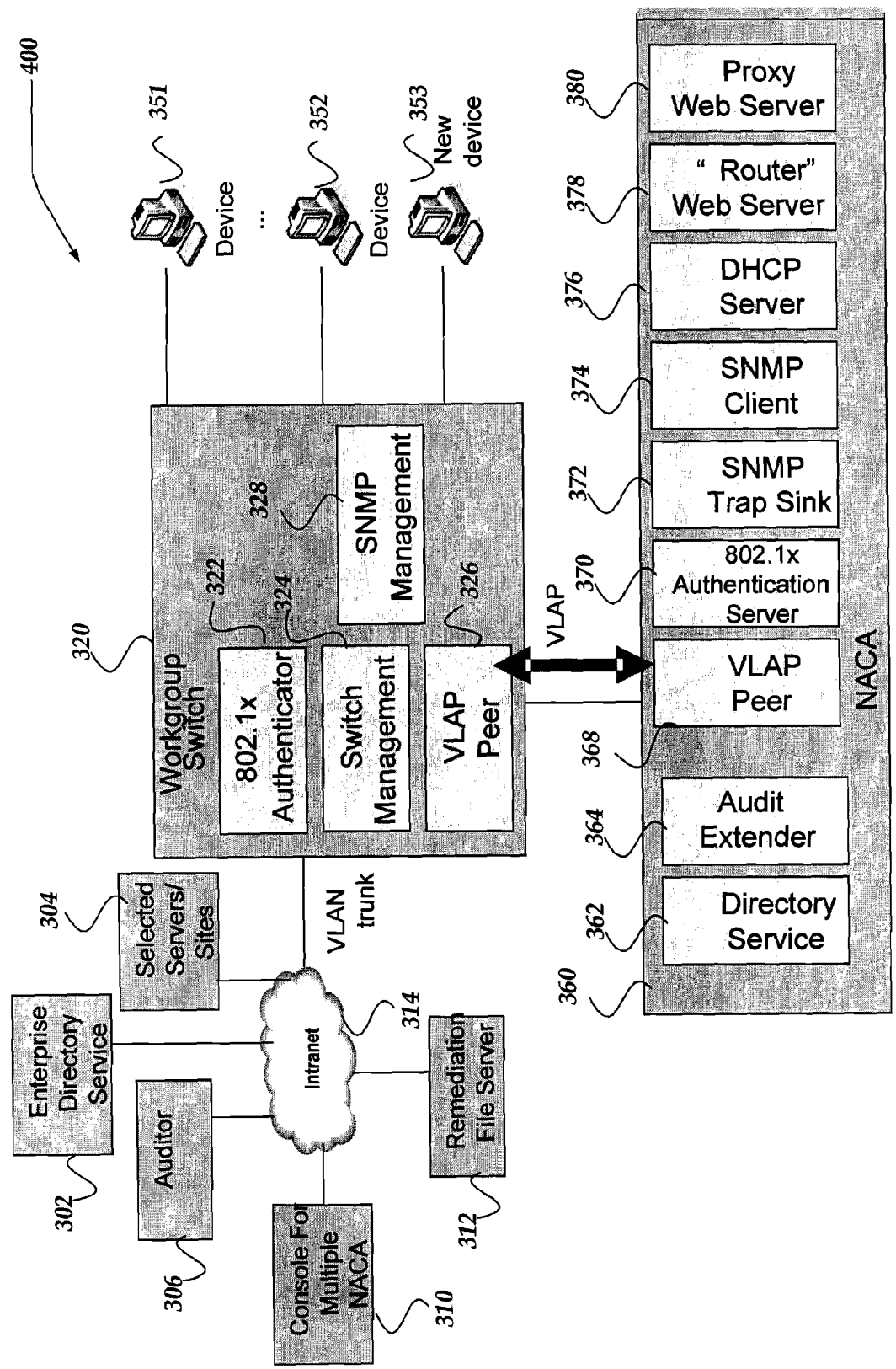
FIGS. 4-18 illustrates embodiments of a process for enabling a new device to seek access to a network.

Processing begins at FIG. 4, where NACA 360 detects new device 353's attempt to access or otherwise join the network. Such attempt to access or join the network may be associated with a request to access a resource within the network. Typically, the attempt may include an attempt to access a resource within a network such as an enterprise's intranet, or the like. FIG. 4 illustrates one embodiment of a possible configuration using a Virtual Local Area Network (VLAN) membership policy server. In one embodiment, NACA 360 may employ a VLAP server 326 and VLAP client 368 to detect that new device 353 has requested to join the network based on some VLAP.

Figure 5:
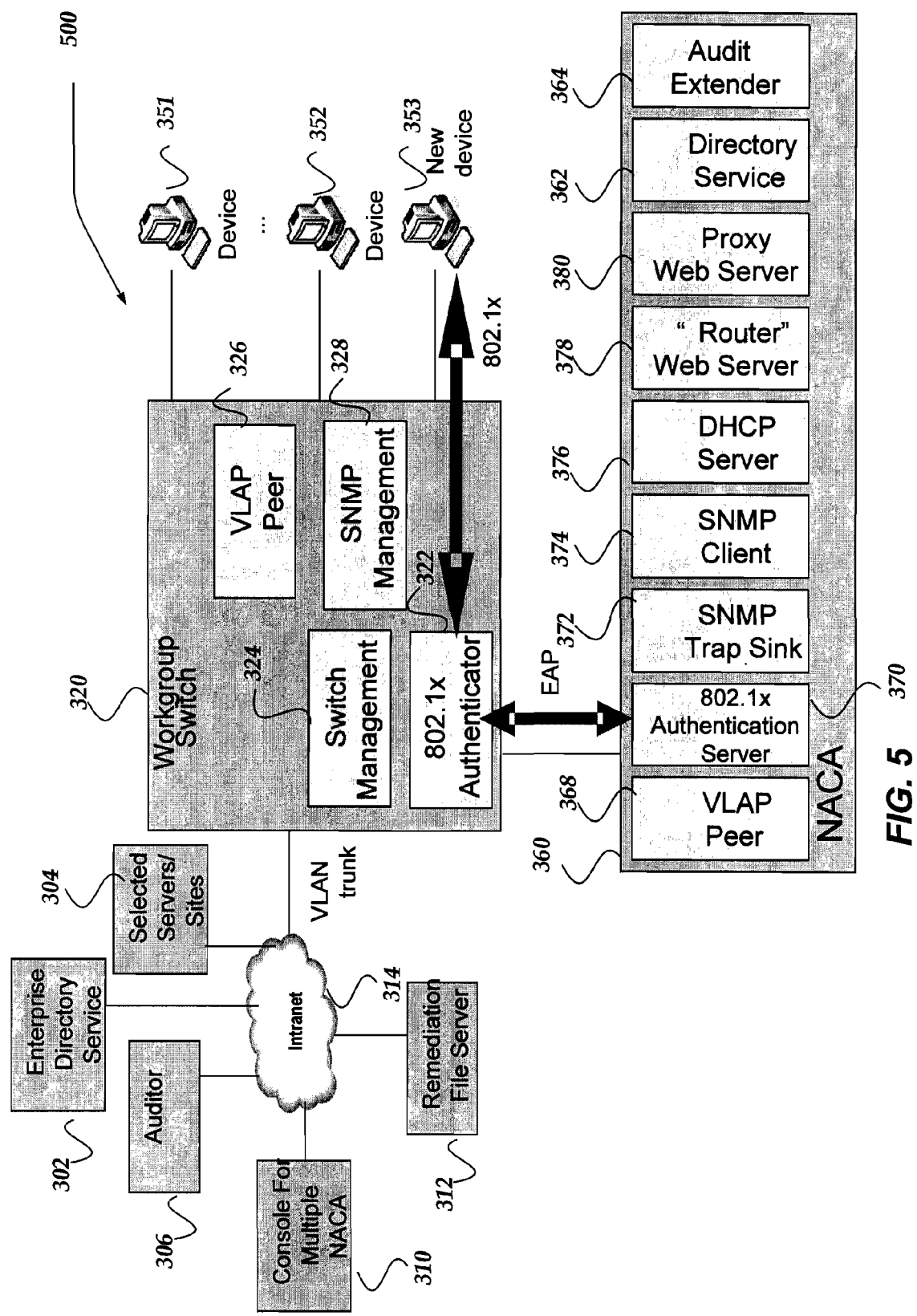

In an alternate embodiment, FIG. 5 illustrates NACA 360 detecting new device 353's attempt to join the network. In one embodiment, workgroup switch 320 is set to employ 802.1x authenticator 322, with NACA 360 as the authenticator. In one embodiment, the 802.1x protocol may be a wireless network access protocol. For example, if new device 353 has successfully been authenticated using an 802.1x protocol, NACA 360 may authorize new device 352 to access or otherwise join the network. However, the invention is not constrained to using 802.1x authentication, and other authentication mechanisms may be employed, without departing from the scope or spirit of the invention.

Figure 6:
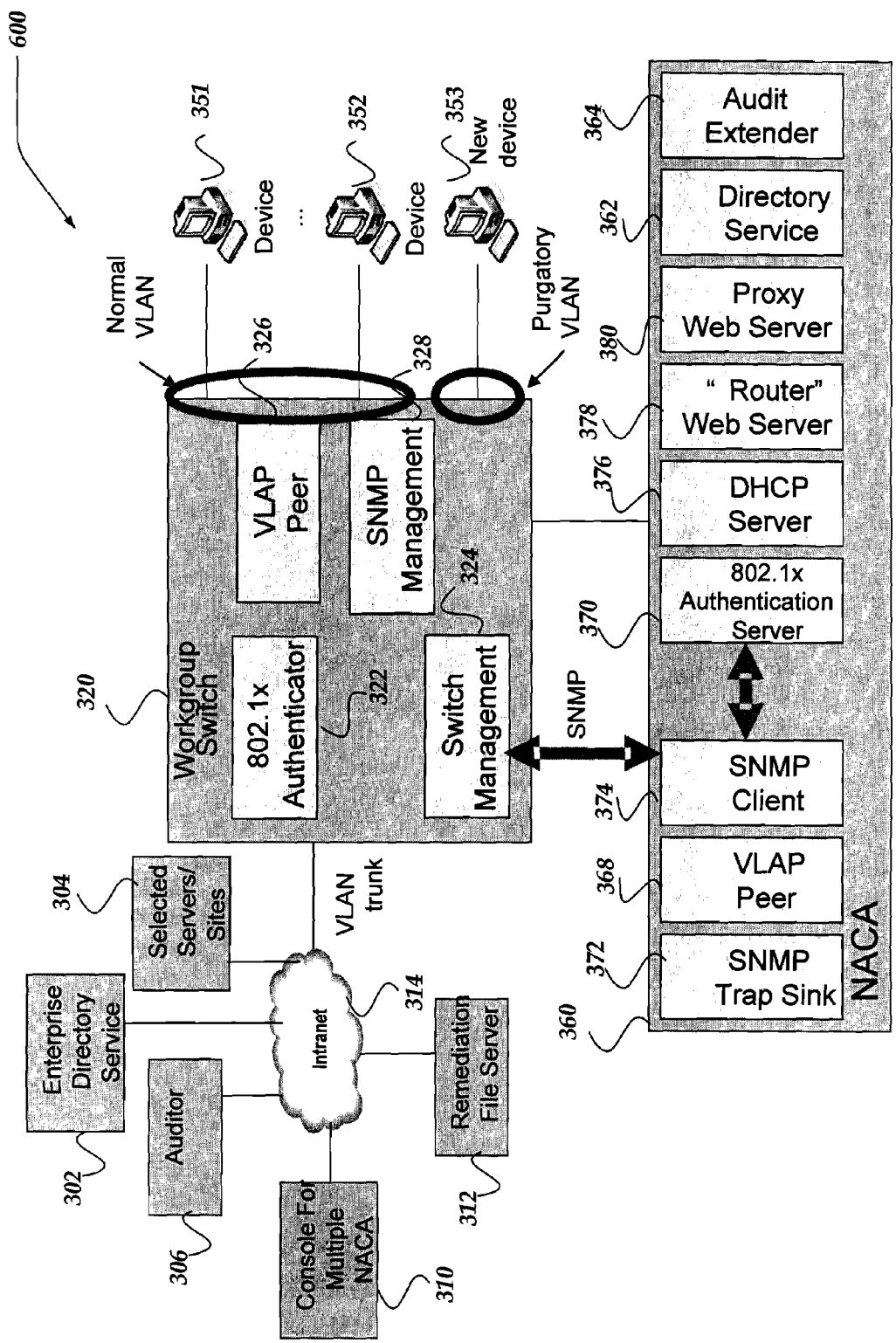

The process then moves to FIG. 6, where NACA 360 employs SNMP client 374, 802.1x authentication server 370, and switch management 324 to read a bridging tale on the switch, and determines a switch port number for a MAC address associated with new device 353. If the MAC address is valid, NACA 360 may enable new device 353's access to the network. In another embodiment, if the MAC address is invalid, NACA 360 may quarantine new device 353, or the like.

Figure 7:
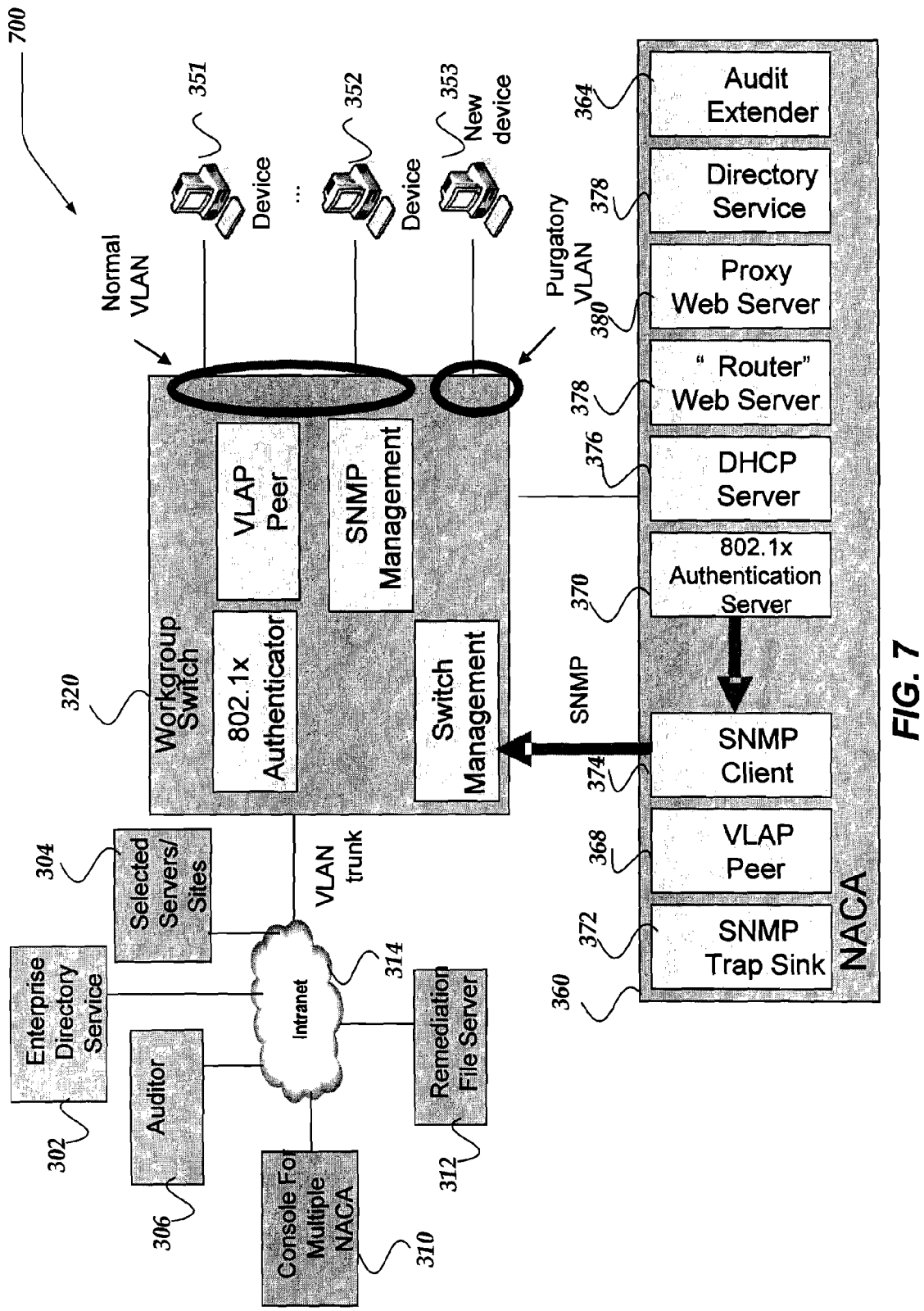

The process continues to FIG. 7, where an authentication mechanism, such as 802.1x authentication server 370, triggers a change in the VLAN assignment for the port, and the switch is reconfigured to enable management by NACA 360. In one embodiment, the authentication mechanism is configured to generally accept virtually all requests. NACA 360 may then quarantine new device 353 by placing new device 353 on a purgatory VLAN. As illustrated, the purgatory VLAN is logically separated from a normal VLAN. In one embodiment, purgatory VLAN may enable access to fewer resources than normal VLAN. For example, purgatory VLAN may enable access to selected servers/sites 304 and/or remediation file server 312.

Figure 8:
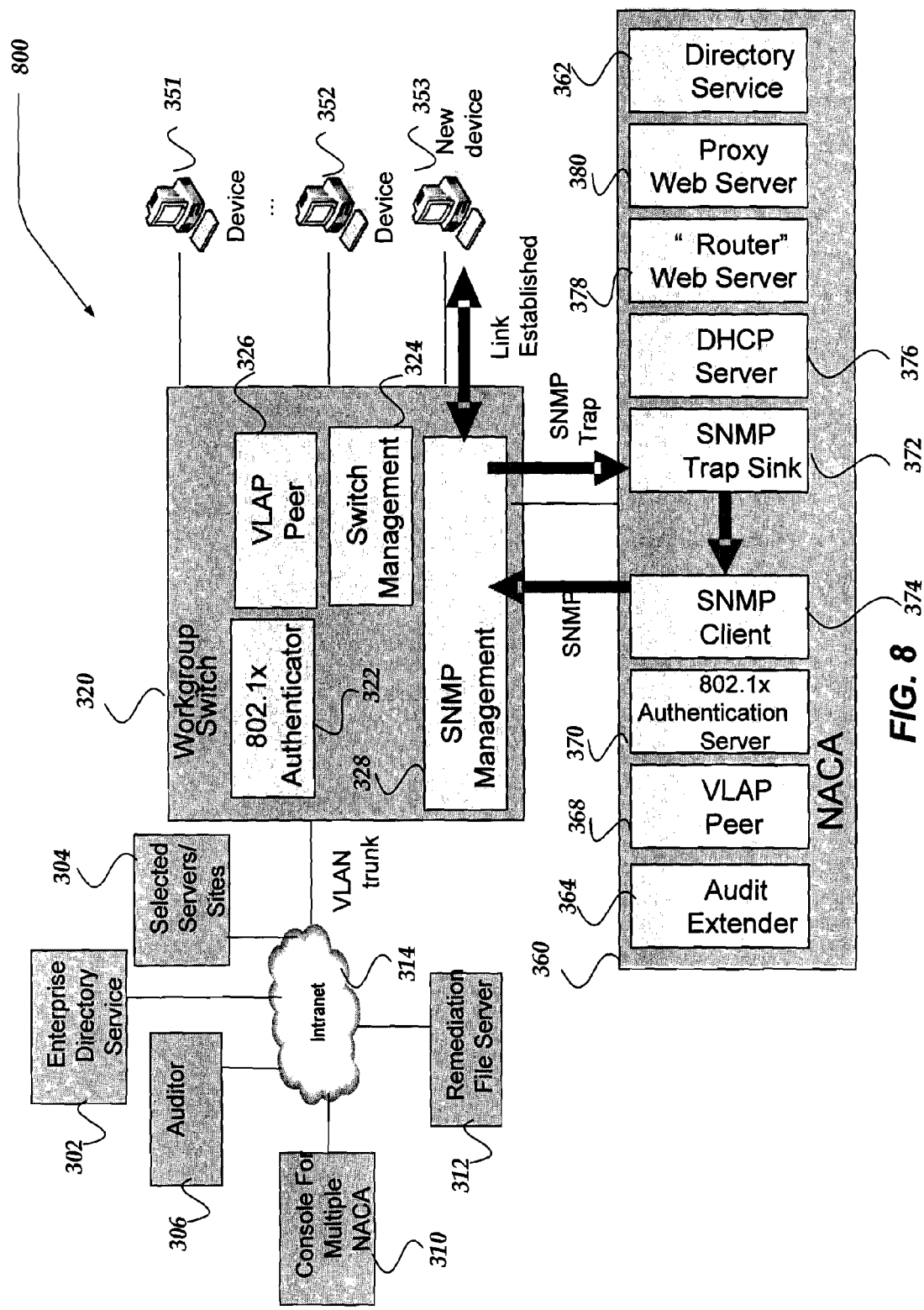

The process then flows to FIG. 8, where an alternative embodiment is illustrated that does not employ an 802.1x protocol. In this embodiment, SNMP traps are employed to detect new device 353's established link. For example, NACA 360 may employ SNMP client 374, SNMP trap sink 372, and SNMP management 328 to detect new device 353's established link. New device 353 may again be placed in purgatory.

Figure 9:
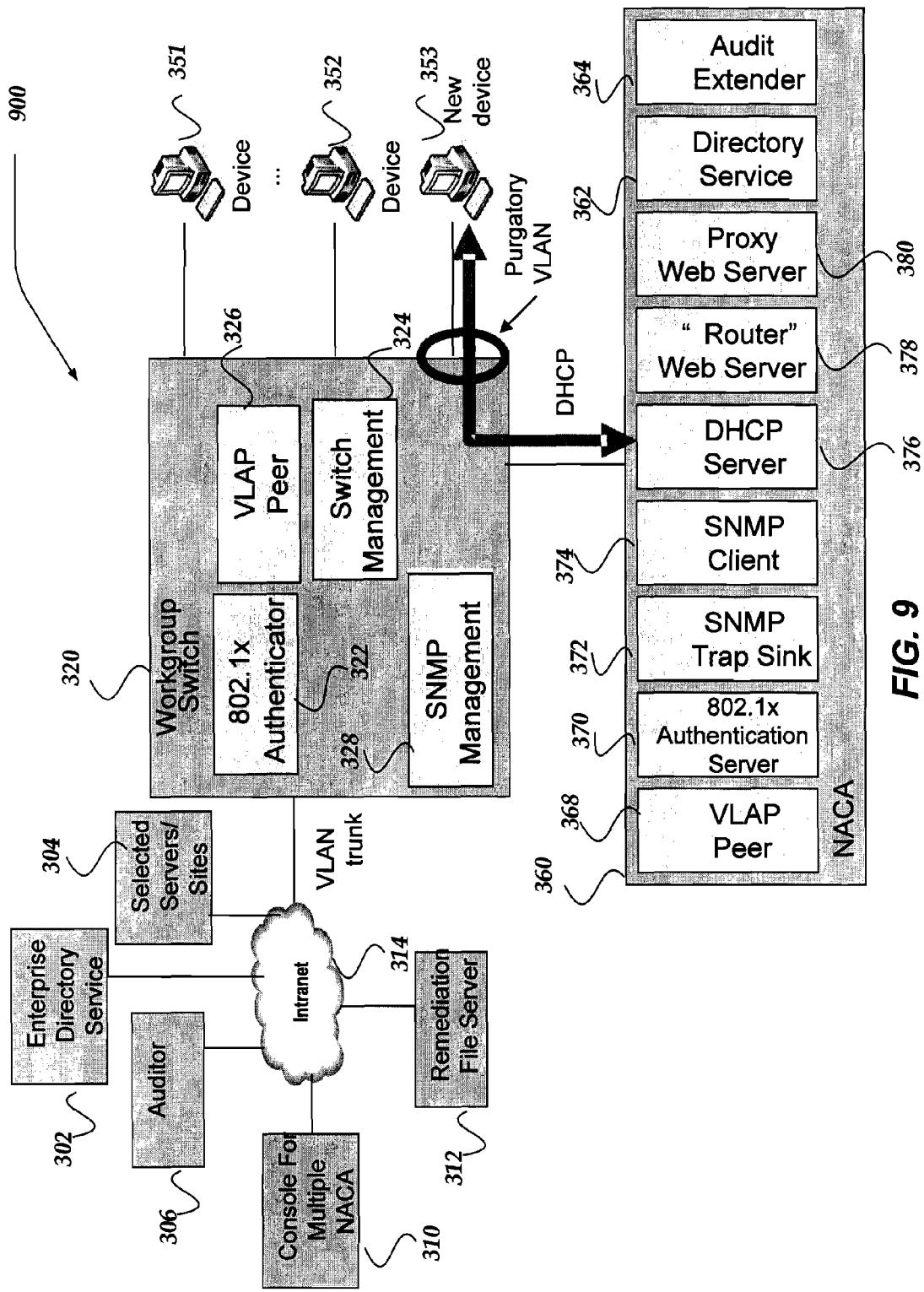

The process continues to FIG. 9, from either FIG. 7, and/or FIG. 8, to where new device 252 is configured with a default route, by NACA 360. As shown, NACA 360, operating as a DHCP server, sets the default route to itself. In one embodiment, NACA 360 employs DHCP server 376 to set the default route to itself.

Figure 10:
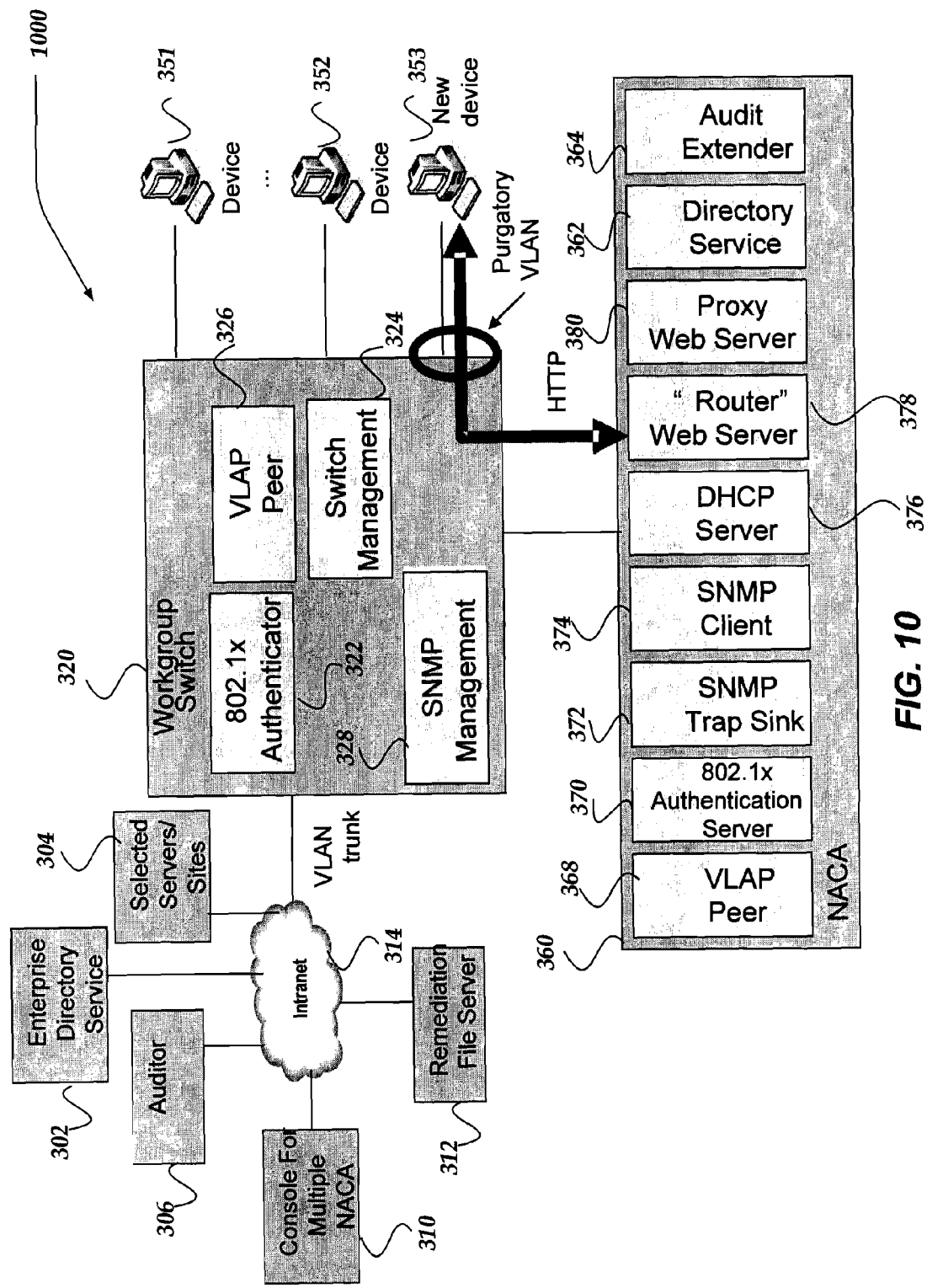

As the process flows to FIG. 10, web traffic may then be steered towards NACA 360. In one embodiment, web traffic may be Hyper Text Transfer Protocol (HTTP) network traffic. Thus, any web traffic goes through the default route. In one embodiment, the default route is through "router" web server 378 that serves all addresses for new device 353. Non-web traffic may be configured to go through NACA 360. In one embodiment, the non-web traffic goes nowhere.

Figure 11:
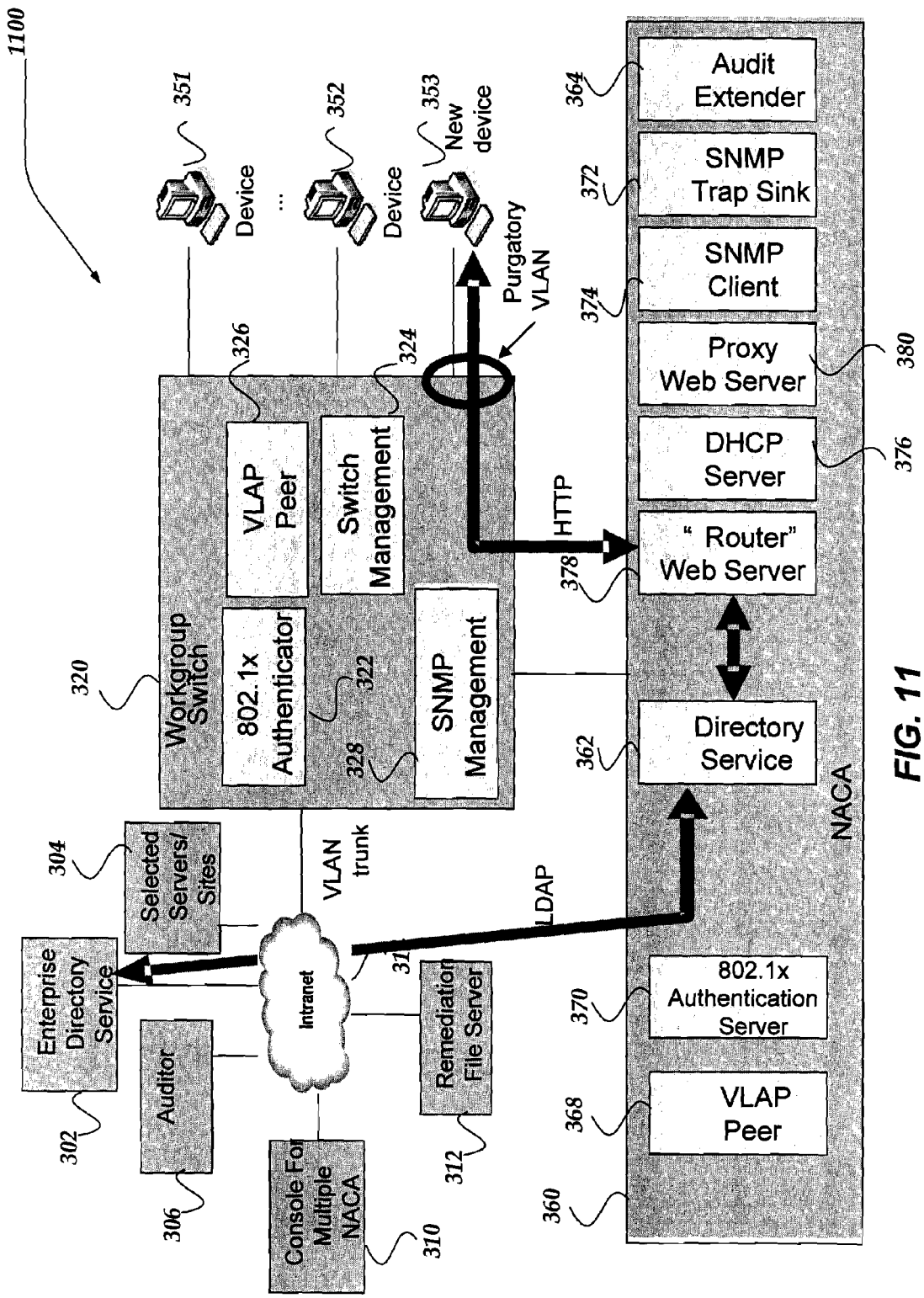

At FIG. 11, new device 353 and/or a user associated with new device 353 is registered. In one embodiment, a registration server checks user credentials and/or device credentials. In one embodiment, "router" web server 378 may act as the registration server, receiving registration information from new device 353 via an HTTP channel, and verifying the validity of the credentials. Interfaces to an external directory service to determine the validity of the credentials may be via Lightweight Directory Access Protocol (LDAP), or the like. For example, enterprise directory service 302 may provide the validity of the credentials to directory service 362 via LDAP. An internal directory service may also be employed to include any previous audit results/intelligence associated with new device 353. Directory service 262 may in turn provide the information to "router" web server 378 so that "router" web server 378 may verify the validity of the credentials.

Figure 12:
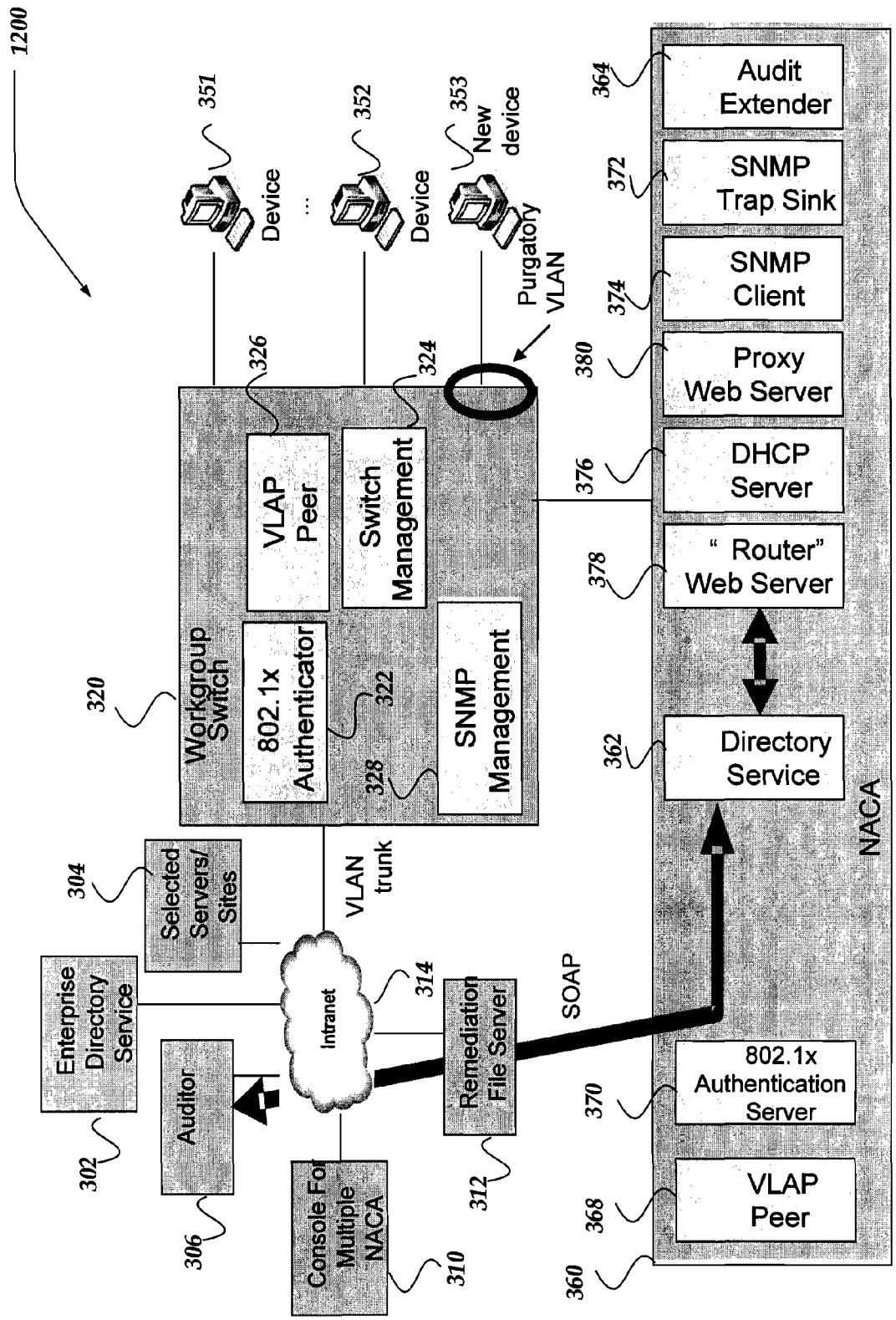

At FIG. 12, a request may be made to audit new device 353. In one embodiment, auditor may provide intelligence to directory service 362 via SOAP about new device 353, and/or the user of new device 353 that may indicate policy nonconformance. The intelligence may also be provided to "router"

web server 378, which may in turn provide the intelligence to a device, a user, an administrator, or the like.

Figure 13:
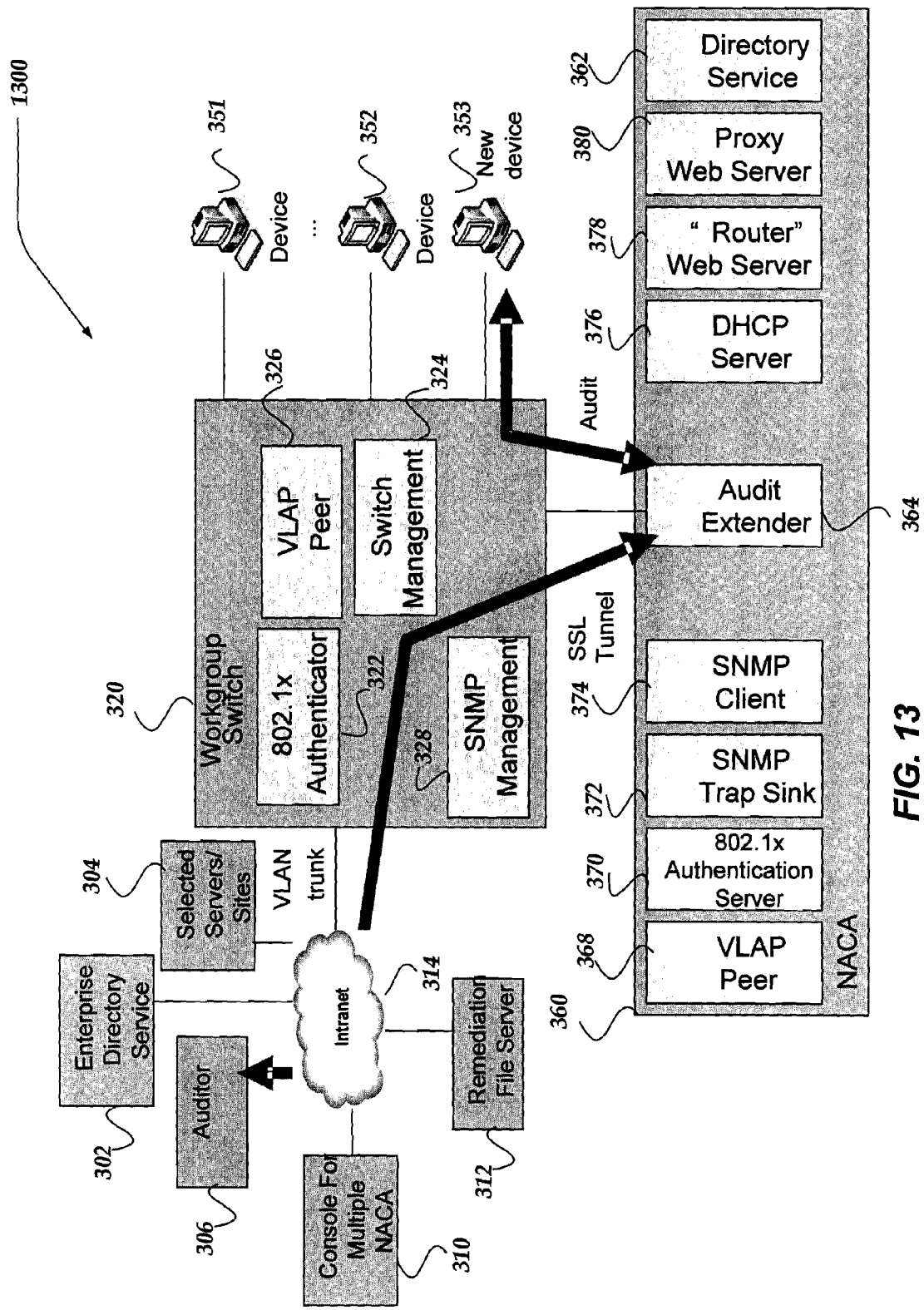

Processing continues to FIG. 13, where an audit mechanism, such as auditor 306, is employed to perform the requested audit. In one embodiment, the audit mechanism may be a sub-component of the NACA. For example, audit extender 364 may act alone, or in conjunction with auditor 306, as the auditor mechanism. Auditor 306 and/or audit extender 364 may provide intelligence about new device 353, and/or the user of new device 353 that may indicate policy nonconformance. In one embodiment, auditor 306 and audit extender 364 are in communication via a secure channel, such as an SSL/TLS channel, or the like. Additionally, auditor 306 and/or audit extender 364 may audit new device 353, through an audit channel, a secure channel such as an SSL/TLS channel, or the like. For example, the audit channel may be the DHCP default route described in FIG. 9.

Figure 14:
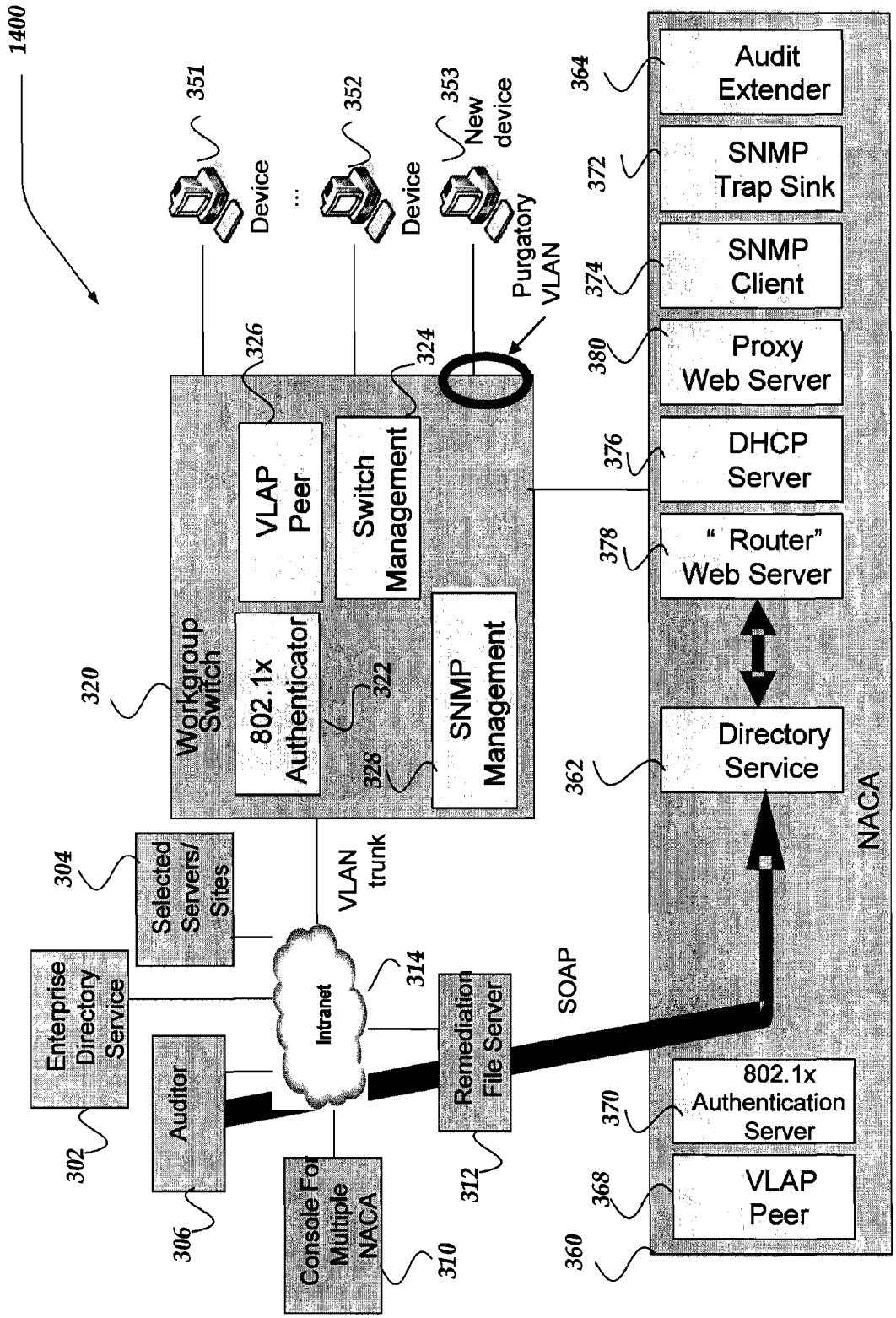

At FIG. 14, illustrates one embodiment of Auditor 306 providing the audit results/intelligence to NACA 360 via SOAP. The invention, however, is not constrained to the use of SOAP, and another mechanism may also be used. The intelligence may also be provided to directory service 362 via SOAP, or another mechanism. In turn, directory service 362 may provide the intelligence to "router" web Server 378.

Figure 15:
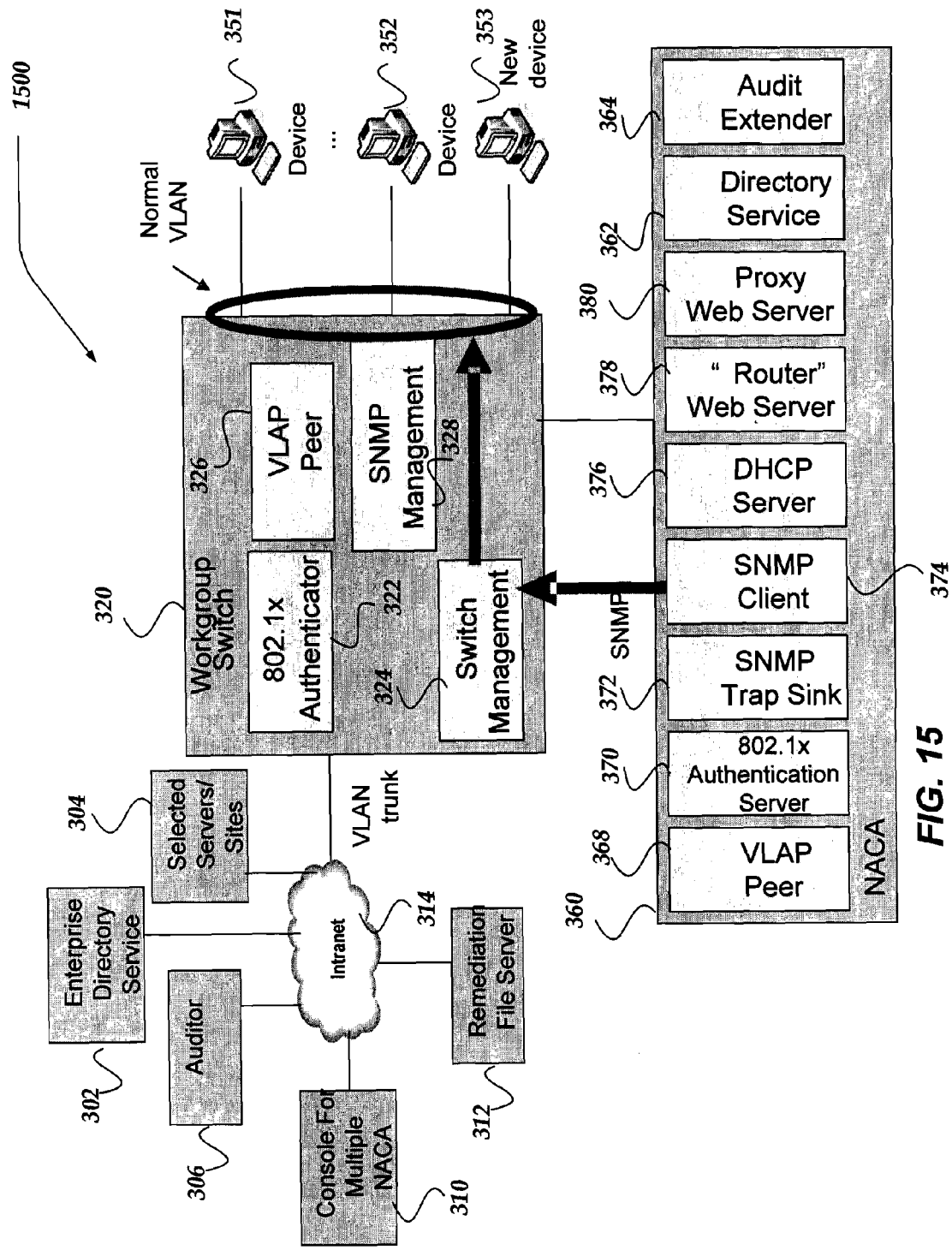
Figure 16:
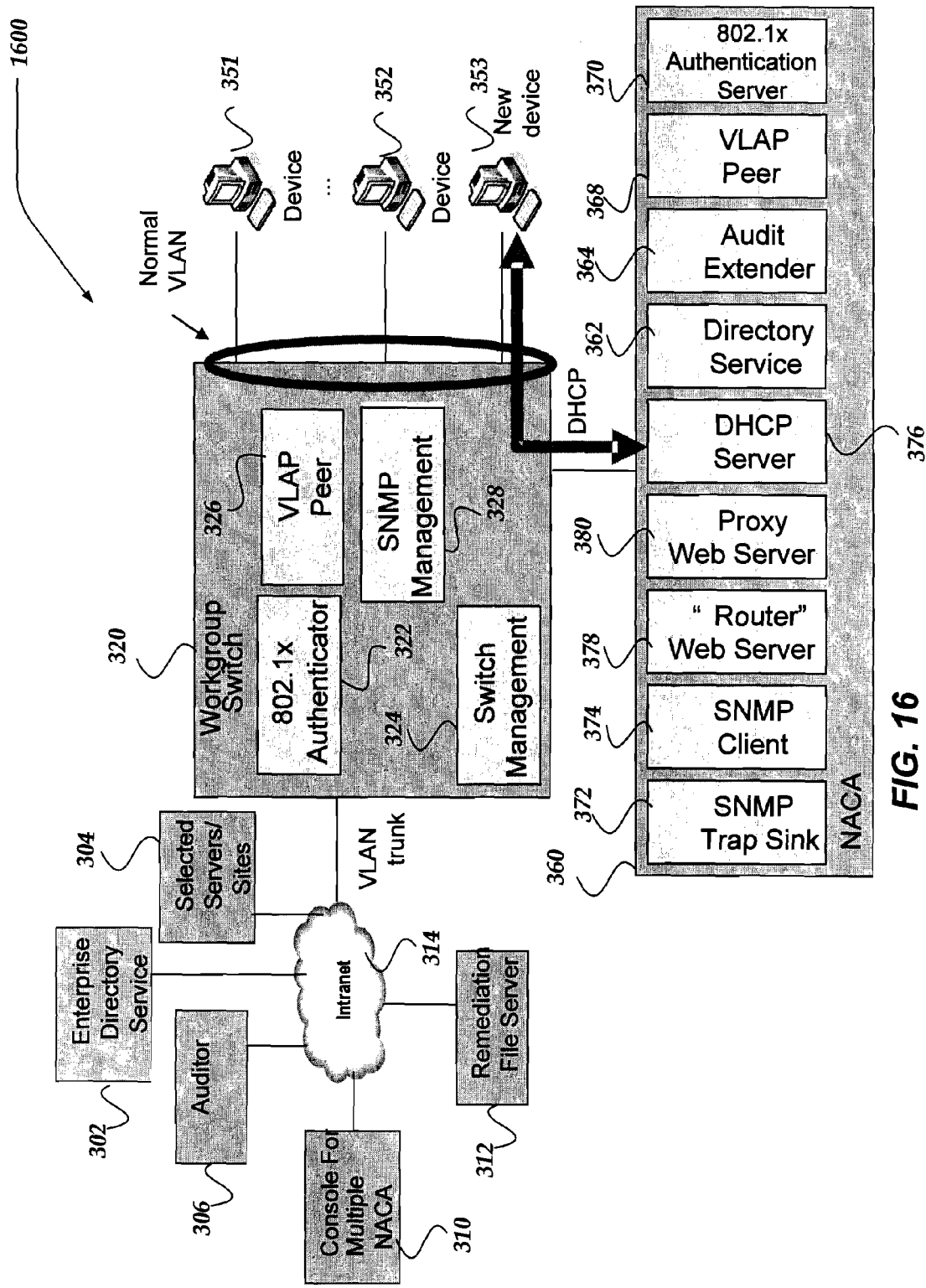
Figure 17:
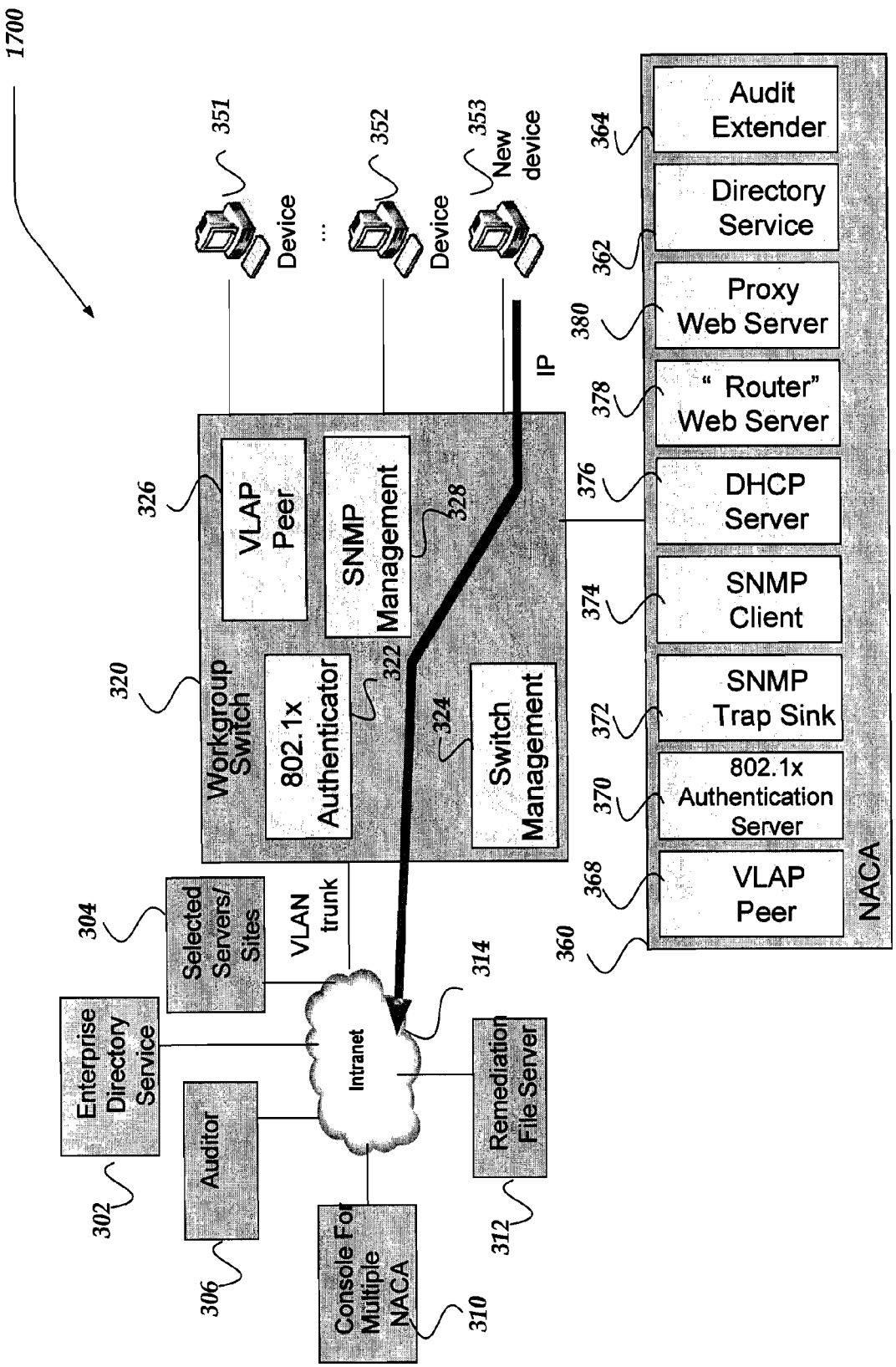

At FIG. 15, if the audit results/intelligence is determined to be satisfactory, new device 353 is accepted, and the port is re-assigned into a normal VLAN. In one embodiment, SNMP client 374 and switch management 324 re-assign the port into a normal VLAN. Processing continues to FIG. 16, where new device 353 then gets new DHCP information from DHCP Server 376 and a proper default route. At FIG. 17, new device 353 then is provided network access.

Figure 18:
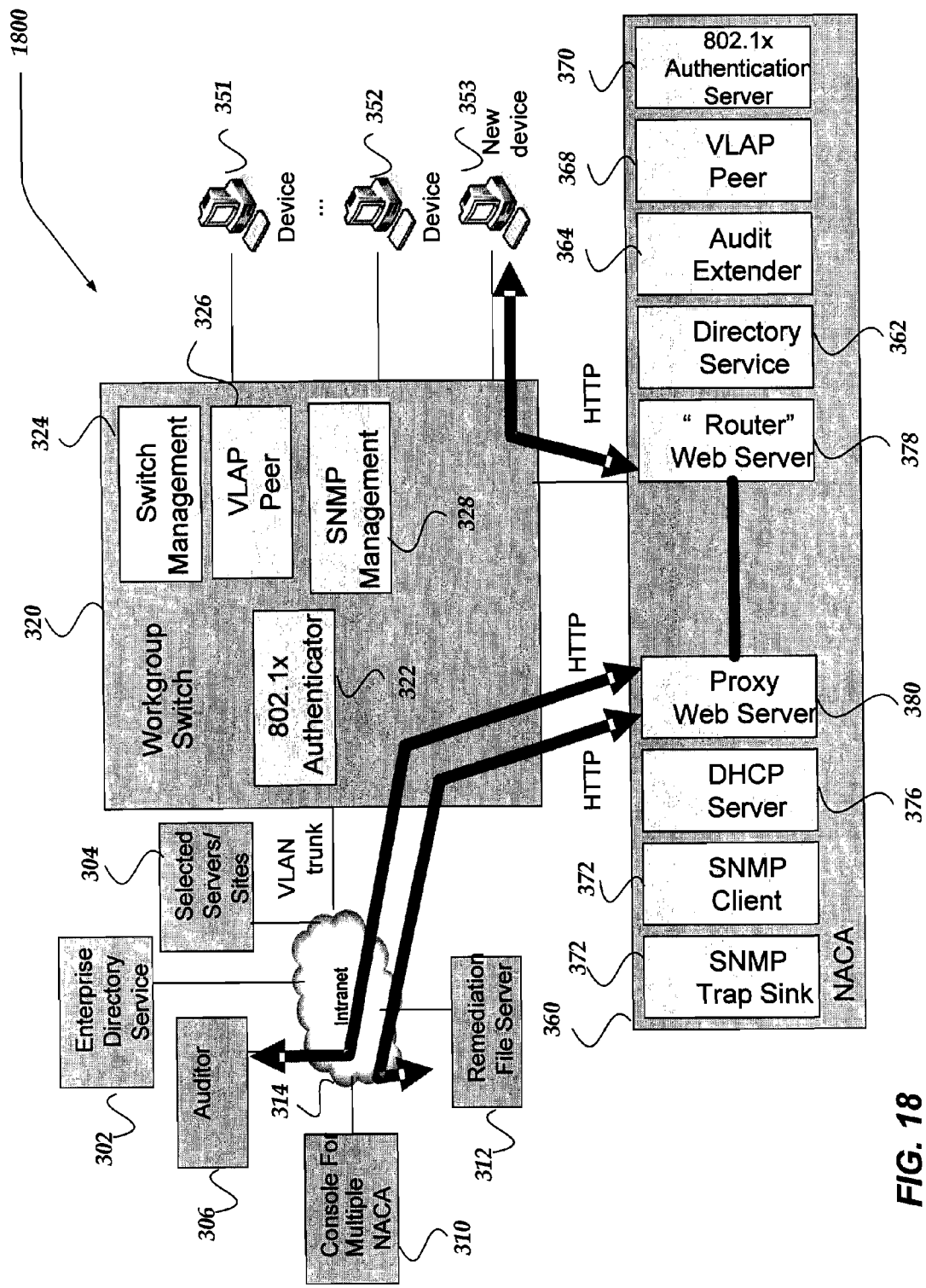
Figure 19:
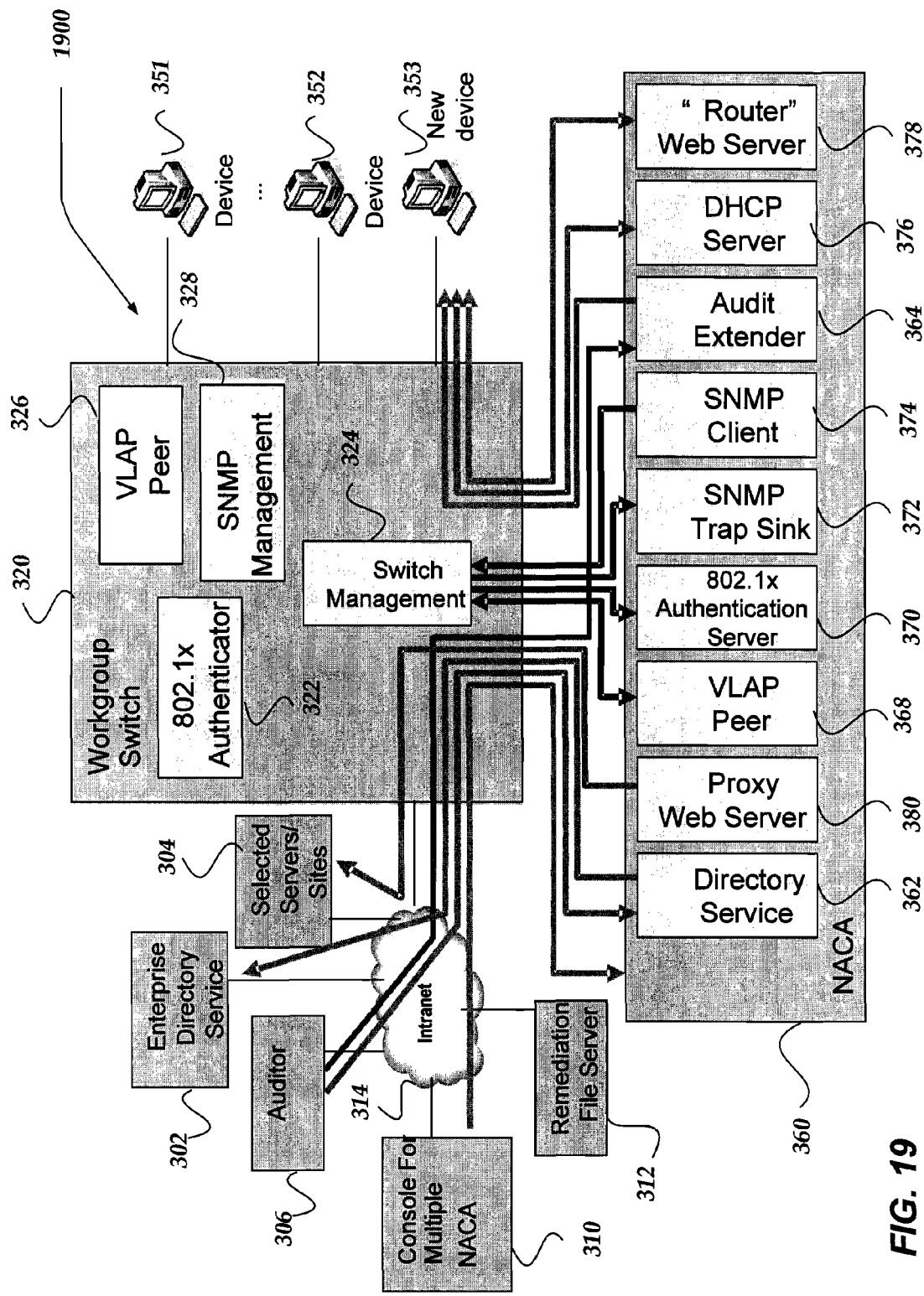
FIG. 19 one embodiment that may be used to summarize the process embodied by FIGS. 4-18.

However, at FIG. 18, if it is determined that the audit results/intelligence is unsatisfactory, for any of a variety of reasons, new device 353 is determined to be a vulnerable device, and remediation may be provided. "Router" web server 378 may act as restricted proxy server, in one embodiment, to allow access to remediation instructions, downloads or the like. Proxy web server 380 may also provide remediation guidance. Proxy web server 380 and "Router" web server 378 may direct web traffic from new device 353 to remediation file server 312 and auditor 306. Remediation file server 312 may provide remediation guidance to new device 252 based on the audit results/intelligence provided by auditor 306.

FIG. 19 summarizes the process embodied by FIGS. 4-18. FIG. 19, thus illustrates one embodiment of a solution to providing network access enforcement, in accordance with one embodiment of the invention.

Figure 22:
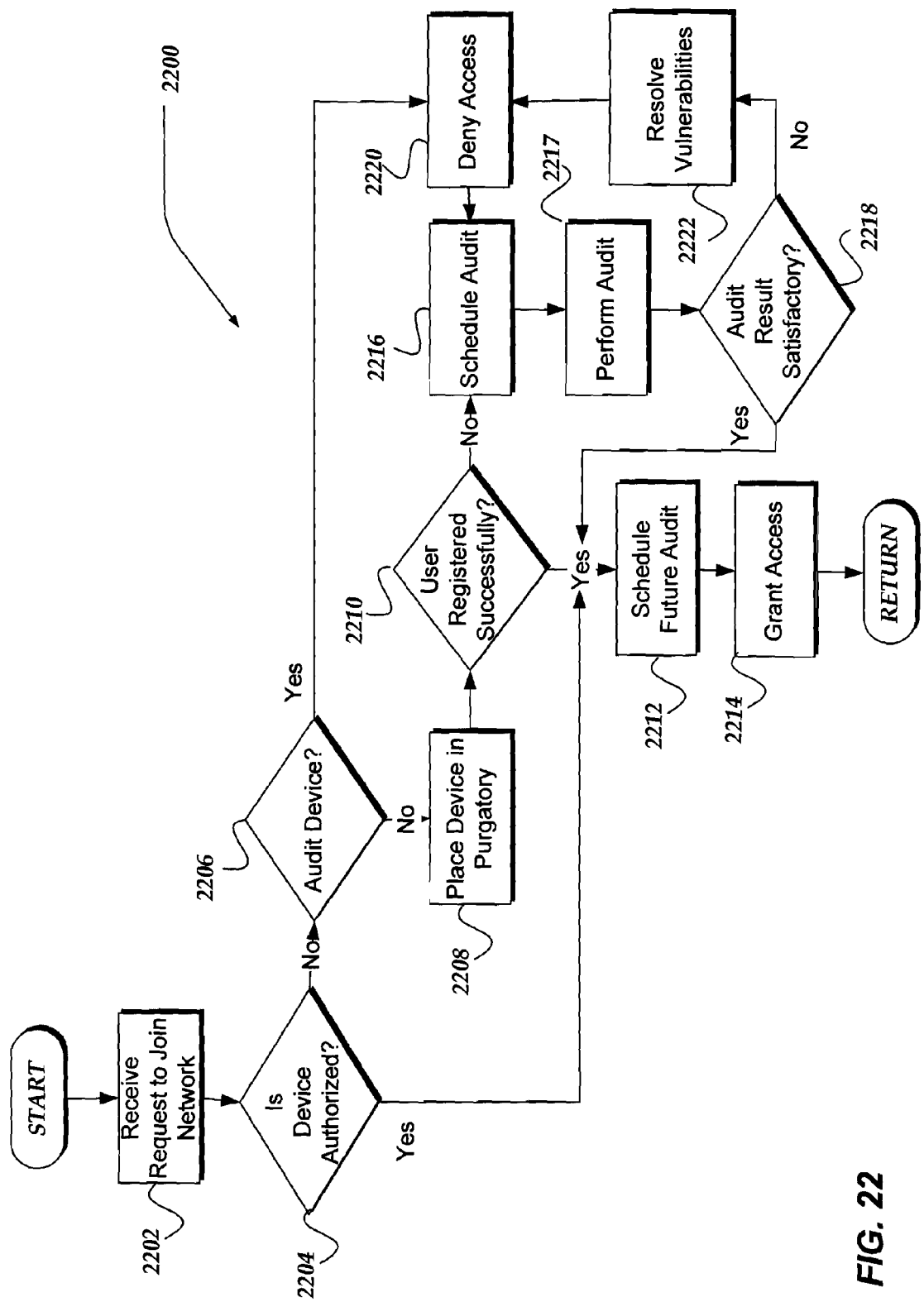
FIG. 22 illustrates a logical flow diagram generally showing one embodiment of a process for managing access control.

FIG. 22 illustrates a logical flow diagram generally showing one embodiment of a process for managing access control. The logical flow diagram may be employed in conjunction with FIGS. 4-18 described above. Process 2200 of FIG. 22 may be implemented, for example, within NACA 112 of FIG. 1, NACA 360 of FIG. 3, or the like.

Process 2200 begins, after a start block, at block 2202, where a device attempts to access or otherwise join a network. In one embodiment, the device may request to join a network in order to gain access to a resource, such as a server, database, or the like. In one embodiment, the NACA may detect that the device is requesting to join the network and may manage access control at a network switch port level. For example, the NACA may identify the switch port associated with the device.

Processing then continues to decision block 2204, where it is determined if the device is authorized to join the network. In one embodiment, the NACA may quarantine a device/ suspect node that is not authorized to connect to the network. In another embodiment, the NACA may quarantine the device that is not authentic and/or authorized to connect to the network. The NACA may determine whether the device is authorized or authentic by at least employing SNMP to read a bridging tale on an enforcement point, determining if a MAC address associated with the device is authorize, performing 802.1x authentication on the device, or the like.

If the determination is that the device is authorized, then the device is granted access to the network and the process flows to block 2212. In one embodiment, the device may be granted access to the some resources on the network. However, if the determination is that the device is not authorized to join the network, then processing continues to decision block 2206.

At decision block 2206, it is determined if an audit is to be performed. The NACA may determine that the device is to be audited based on a user associated with the device not being authorized, a device not having been audited, or not having been audited within a given time period, an audit result/ intelligence does not conform to a policy, or virtually any other intelligence about a device, and/or user that may indicate policy nonconformance based on a result or the like. In one embodiment, the NACA may receive such intelligence from Auditor 104 of FIG. 1, Outside Intelligence 110, or the like. The NACA may also be configured to interface to external enterprise directories, such as Directory Services 114, to determine authorization credentials, or the like.

At decision block 2206, if it is determined that the device is to be audited, then processing continues to block 2220 where the device is denied access to the network. In one embodiment, the device may be denied access to the some resources, while provided restricted access to another resource. Processing then continues to block 2216 where an audit is scheduled. In one embodiment, scheduling of the audit may result in placing the device into an audit queue, or the like, where the device may wait until it is audited. When it is audited, processing continues to block 2217. In one embodiment, the audit is performed by Auditor 104 of FIG. 1, or Auditor 306 of FIG. 3 and/or Audit Extender 364.

However, if at decision block 2206, the audit is not to be performed on the device, then processing continues to block 2208, where the device may be placed into purgatory where the device may be quarantined. In one embodiment, the NACA may place the device in purgatory by providing a policy that defines which sites/servers or the like, the device may access, and/or how. For example, in one embodiment, placement into quarantine may result in some or all of the device's network traffic being filtered through the NACA, or other device. In one embodiment, the network traffic may be further blocked, redirected, or the like, based on being within quarantined. The NACA may operate with virtually any of a variety of switches, routers, gateways, or the like, to securely quarantine the device. In one embodiment, the NACA employs an enterprise switch to place the device in purgatory. In another embodiment, the NACA may quarantine the device by placing the device on a purgatory VLAN, and sending to the device explanatory information relating to the quarantining the device. The NACA may place the device on the purgatory VLAN by employing at least one of an SNMP trap, VLAP, or an 802.1x protocol to detect a request to join the network by the device, and assigning the device DHCP information which restricts access to the network, or the like. In yet another embodiment, the NACA may place the device in purgatory by providing a VPN-like access control to every internal port. The NACA may also place a device in purgatory by redirecting the device to a friendly web site, a proxy web site, or the like. The friendly web site, the proxy web site, or the like may enable a user, an administrator, a device, or the like, to register, schedule an audit, find audit results/intelligence, and receive remediation information. In one embodiment, network traffic from the device may be routed through the NACA to be examined, filtered, and/or redirected, as appropriate.

Processing next continues to decision block 2210, where a determination is made whether the user and/or device registered successfully. In one embodiment, a registration server checks user credentials and/or device credentials. For example, "Router" Web Server 378 of FIG. 3 may act as the registration server, receiving registration information from the device via an HTTP channel, and verifying the validity of the credentials, and thus the success of the registration. If the user and/or device register successfully, then processing continues to block 2212. Otherwise, processing continues to block 2216.

If at decision block 2210, the user and/or device did not register successfully, then processing continues to block 2216 where the NACA schedules an audit. In one embodiment, the device may be placed into a wait queue to be audited. In another embodiment, the device may be audited almost at once, in which case, processing proceeds to block 2217.

At block 2217, an audit is performed on the device based on a policy. In one embodiment, the audit is performed by Auditor 104 of FIG. 1, or Auditor 306 of FIG. 3 and/or Audit Extender 364. To perform the audit, the NACA may produce an intelligence based on at least one of whether at least one of antivirus detectors, firewalls, or spyware detectors, are installed on the device, running, properly configured, and kept up to date, whether a patch management product is operational and has successfully performed patching actions upon the device, and whether a positive second intelligence about the network is received from an auditing component and/or an outside intelligence component, such as Outside Intelligence 110, or the like. However, the NACA need not receive such intelligence from an auditing component. The NACA may receive intelligence about the network, device in question, or the like, from virtually any source, including an auditor appliance, an anitvirus application, firewall, spyware detector, and even an agent. The NACA may employ policies provided by an administrator, such as Security Administrator 102, and/or Network Administrator 108 shown in FIG. 1, and provide reports regarding the network, device in question, or the like. Processing next continues to decision block 2218.

At decision block 2218, it is determined if a result of the audit is satisfactory. In one embodiment, the result of the audit is unsatisfactory if a vulnerability is determined to exist. For example, vulnerabilities may exist if such applications as antivirus, firewalls, spyware detectors, or the like, are not installed, running, properly configured, or kept up to date. If the result of the audit is satisfactory, processing continues to block 2212.

However, if, at decision block 2218, the result of the audit is unsatisfactory, processing continues to block 2222, where an attempt may be made to resolve the unsatisfactory audit result. In one embodiment, the NACA may guide the user associated with the device, an administrator associated with the device, or the device itself to resolve the vulnerabilities, or other unsatisfactory audit result. In one embodiment, resolving the unsatisfactory audit result may include granting the network device restricted access to quarantined devices, deploying a remediation guidance, such as patches and downloads, to the network device, enabling the user associated with the device, the administrator associated with the device, or the device itself to find a result of a previous audit, and enabling scheduling of another audit. Processing then continues to block 2220 where the device is denied access to the network. As described above, processing then continues to block 2216 where audit is scheduled. Processing then proceeds to block 2217, where the scheduled audit is performed.

At block 2212, a future audit may be scheduled for the device. Processing then continues to block 2214, where the device is granted access to the network. In one embodiment, the NACA may grant the device access to the network by placing the device on a normal VLAN. In another embodiment, network traffic from the device might no longer be routed through the NACA. Upon completion of block 2214, process 2200 may return to a calling process to perform other actions.

Figure 23:
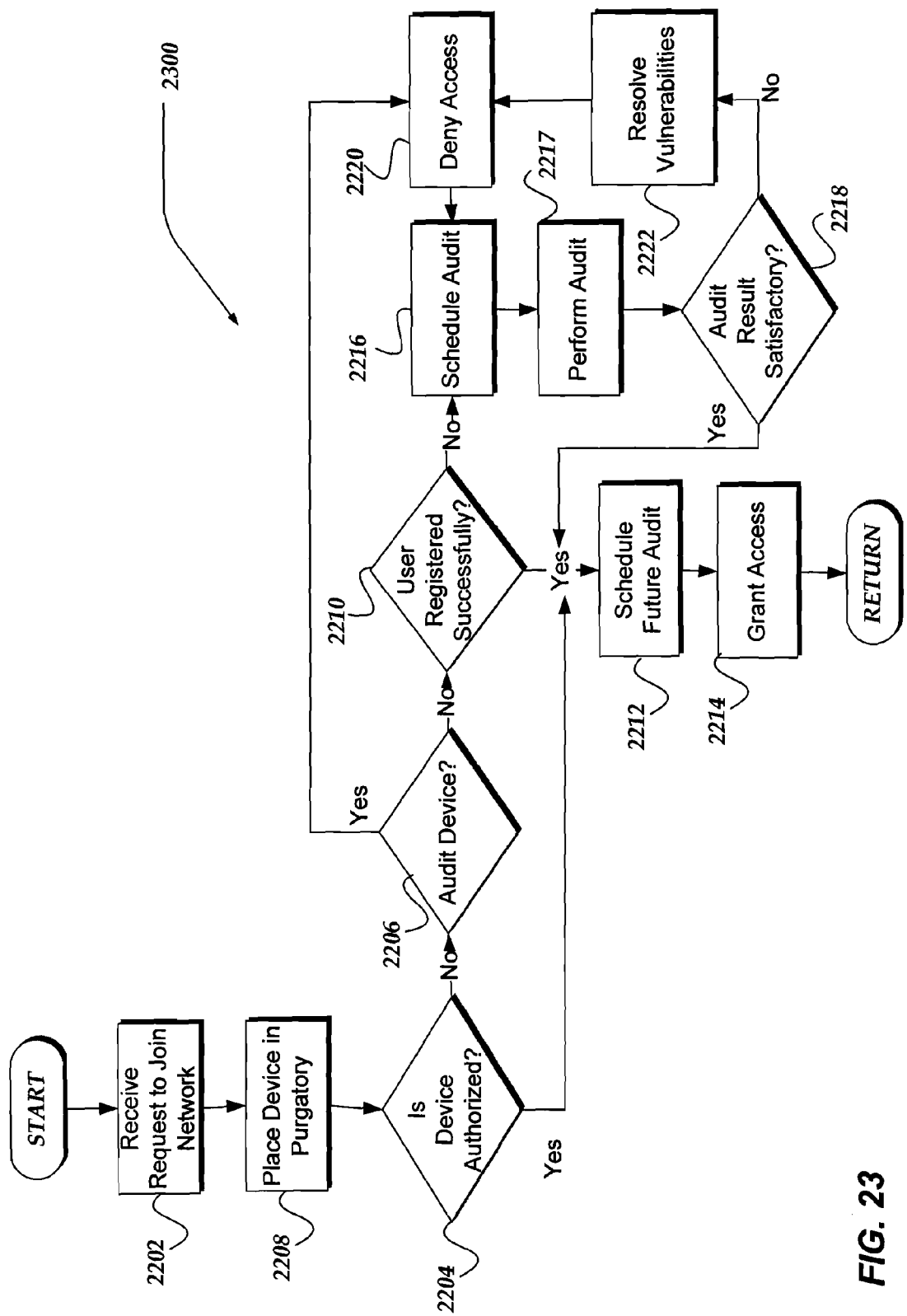
FIG. 23 illustrates a logical flow diagram generally showing an alternate embodiment of a process for managing access control.

FIG. 23 illustrates another logical flow diagram generally showing one embodiment of a process for managing access, and provides an alternate embodiment for the use of the NACA in conjunction with FIGS. 5-18, as shown above. FIG. 23 is substantially similar to FIG. 22, except that block 2208, where a device is placed in purgatory, occurs after block 2202, where a request to join a network is received from a device, and before decision block 2204, where a determination is made whether the device is authorized to join or otherwise access the network. The other blocks remain substantially the same as in FIG. 22.

ILLUSTRATIVE ALTERNATIVE EMBODIMENTS

Figure 28:
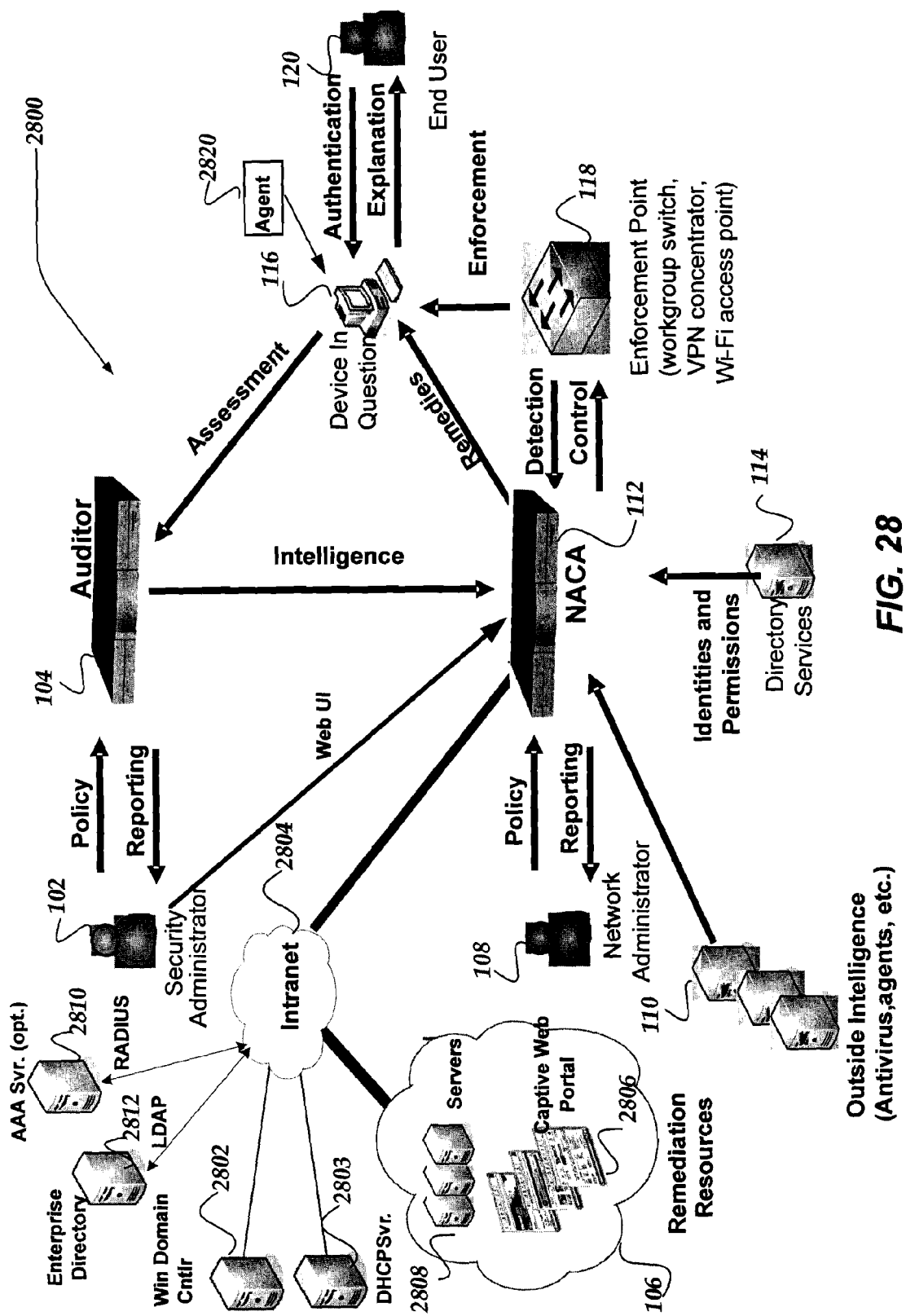
FIG. 28 illustrates one alternative embodiment of an overview information flow employing a NACA.

FIG. 28 illustrates one alternative embodiment of an overview information flow employing a network access control appliance (NACA). System 2800 of FIG. 28 includes components substantially similar to those in system 100 of FIG. 1. For example, system 2800 includes intranet 2904, Authentication, Authorization, and Accounting (AAA) server 2810, Windows domain controller 2802, and DHCP server 2803. Resources 106 include internal/external servers 2808 and captive web portal 2806.

While system 2800 includes components similar to system 100, system 2800 includes other components and a different configuration of components to enable agent processing, ARP poisoning/spoofing, remote remediation by an administrator, and the like. In this alternate embodiment, intranet 2804 is in communication with NACA 112. Resources 106 (including internal/external serves 2808 and captive web portal 2806) are in communication with intranet 2804 instead of NACA 112. Windows domain controller 2802, DHCP server 2803, AAA server 2810, and enterprise directory 2812 are also in communication with intranet 2804. Alternatively, AAA server 2810 and DHCP server 2803 may be in direct communication with NACA 112. AAA server 2810 may also be in communication directly with directory services 114. As shown, security administrator 102 may also be in communication with NACA 112, over, for example, a web based user interface protocol, such as HTTP, or the like.

Intranet 2804 is a network enabled to couple a plurality of devices, including NACA 112 Windows domain controller 2802, DHCP server 2803, AAA server 2810, and enterprise directory 2812.

As described above with respect to FIG. 1, security administrator 102 and network administrator 108 may be a network device or a user in control of the network device. In one embodiment, security administrator 102 may be enabled by NACA 112 to gain access to a device (e.g. device in question 116) that has been placed into quarantine. In one embodiment, during the placement of a device into quarantine, a device that is not in quarantine may be prohibited from communicating with a device that is in quarantine unless explicitly allowed by NACA 112, as described herein. Similarly, the device in quarantine is prohibited from communicating with a device not in quarantined.

In one embodiment, NACA 112 may explicitly allow communication between security administrator 102 and the device in question 116 to allow, among other things, security administrator 102 to perform remote remediation measures on device in question 116.

In one embodiment, security administrator 102 and network administrator 108 may be enabled to access and/or control auditor 104 and/or NACA 112, through a web interface or the like. In one embodiment, security administrator 102 and/or network administrator 108 may be enabled to access and/or guide device in question 116 to bring device in question 116 into compliance with a security policy, or the like, so that device in question 116 may be provided access to intranet 2804 and/or resources 106. In one embodiment, security administrator 102 and/or network administrator 108 may provide remediation instructions to device in question 116.

In one embodiment, security administrator 102 and/or network administrator 108 may be enabled to access device in question 116 in order to bring the device in to compliance with a security policy, or the like. For example security administrator 102 and/or network administrator 108 may guide an end-user through self-remediation, configure policy rules, and/or additionally receive remediation instructions that would be presented to the end-user.

AAA server 2810 may include any computing device enabled to provide authentication, authorization, and accounting of a user requesting access to a system in accordance with the present invention. In one embodiment, AAA server 2810 may provide a RADIUS protocol to enable NACA 112 to perform authentication, authorization, and accounting of the device. In one embodiment, AAA server 2810 may retrieve information about the user from directory services 114. In another alternate embodiment, AAA server 2810 may be included instead, within NACA 112.

Windows domain controller 2802 includes any device configured to control access to a networked resource by using Windows' network protocols, an API, or the like. NACA 112 may utilize Windows domain controller 2802 to provide Windows domain authentication sniffing, filtered access, aggregation of vulnerability audits, or the like. In one embodiment, NACA 112 may intercept a Windows authentication request and may activate an immediate vulnerability audit of the device requesting access.

DHCP server 2803 includes any device configured to control access to a networked resource by using the Dynamic Host Configuration Protocol (DHCP) described in more detail in RFC 2131. In one embodiment, NACA 112 may intercept a DHCP request. NACA 112 may select a production VLAN based on a policy and the DHCP request. NACA 112 may also relay the request to one of a plurality of DHCP servers, which may reside in the production VLAN. In one embodiment, DHCP server 2803 may reside in the production VLAN. In one embodiment, NACA 112 may also utilize DHCP server 2803 to quarantine a device to direct the device to remediation resources, such as resources 106. For example, NACA 112 may cause DHCP server 2803 to direct network traffic from device in question 116 to NACA 112 during quarantine.

NACA 112 may enable authorization and vulnerability assessment of a plurality of types of devices, including, but not limited to, an IP telephone. In one embodiment, enforcement point 118 may be a HUB, IP Telephone, unmanaged switch, smart WI-FI access point, basic WI-FI access point, smart VPN concentrator, basic VPN concentrator, or the like.

In one embodiment, enforcement point 118 may enable NACA 112 to enforce access control list (ACL) quarantine of device in question 116.

In one embodiment, resources 106 may include internal/external servers 2808 configured to provide remediation information over a network. At least some of internal/external servers 2808 may be accessible within a security perimeter, such as behind a firewall, or the like. At least some of internal/external servers 2808 may be accessible outside of the security perimeter.

Captive web portal 2806 includes any web information that is provided by NACA 112 in response to redirected web traffic from a quarantined network. In one embodiment, web traffic from a quarantined network that is directed to a production network may be redirected to captive web portal 2806 by NACA 112, or the like. In one embodiment, captive web portal 2806 may present an authentication and/or authorization mechanism and/or information, such as remediation information, based on policy. In one embodiment, the captive web portal 2806 may be substantially similar to the pages produced by "router" web server 378 of FIG. 3 (not shown).

The captive web portal 2806 may provide an HTTP/HTTPS based authentication mechanism that accepts usernames and passwords, or the like. In one embodiment, guest internet access is provided through the captive web portal. In one embodiment, captive web portal 2806 informs an end-user, such as end user 120, why device in question 116 is quarantined, how the end user may get guest access (e.g. restricted access), or the like. Captive web portal 2806 may help the end-user to remove a device from a quarantine. For example, captive web portal 2806 may point the end-user to remediation resources. In another embodiment, captive web portal 2806 may provide a contact for service support to the end-user, enable the end-user to login through a web form, enable the end-user to download an agent, such as agent 2820, or the like. In one embodiment, captive web portal 2806 may provide custom remediation instructions and/or other information based on a policy that applies to a device, a type of the device, a type of the user of the device, or the like. For example, based on the type of policy that applies to a device, captive web portal 2806 may provide a particular level of details, support contacts, custom remediation instructions, a web login for authentication, and/or enable the agent to be downloaded. In another embodiment, captive web portal 2806 may provide an audit report of current vulnerabilities of device in question 116.

In one embodiment, resources 106 may include a dynamic fallback mechanism. The dynamic fallback mechanism may be enabled by process 3400 of FIG. 33. In one embodiment, the dynamic fallback mechanism may utilize captive web portal 2806.

In one embodiment, NACA 112 may receive from device in question 116 and/or enforcement point 118 a device identity, device health, user identity, and/or location of device in question 116, and a time of day of a network access.

In one embodiment, NACA 112 may quarantine a device (e.g. device in question 116) and redirect traffic to/from the device to NACA 112 without being directly in the packet path by performing ACL and/or ARP poisoning and/or spoofing. The redirected traffic may enable NACA 112 to provide a captive web portal, such captive web portal 2806, or the like.

In one embodiment, Access Control List (ACL) and/or Address Resolution Protocol (ARP) poisoning and/or spoofing may be enabled by enforcement point 118, which may supports the ability to selectively allow or deny packets from a device to network. In some embodiments, enforcement point 118 may include an ACL for restricting access to a network.

Enforcement point 118, device in question 116 and/or NACA 112 enables ARP processing for finding a host's hardware address when only its IP address is known. ARP processing is defined in RFC 826. Due to the overwhelming prevalence of IPv4 and Ethernet, ARP is primarily used to translate Ethernet MAC addresses from IP addresses.

In one embodiment, when device in question 116 plugs into enforcement point 118 and attempts to exchange packets with other devices on a network managed by enforcement point 118, the packets are disabled from flowing unhindered. In this embodiment, when device in question 116 is plugged into enforcement point 118, enforcement point 118 is configured by NACA 112 to disallow device in question 116 from exchanging packets with any device other than the 112. In one embodiment, this access restriction uses an Access Control List (ACL) rule operable on the on enforcement point 118. In one embodiment, the ACL may include the following rules:
1. ALLOW 'Device A' MAC to 'NACA MAC'
2. DENY 'Device A' MAC to <any>

As described above, rules 1 and 2 allows device A of a particular MAC (e.g. Ethernet address) to access NACA 112, but disallows access to other MAC addresses.

In one embodiment, NACA 112 may also perform ARP spoofing and/or poisoning to cause device in question 116 to send all traffic to NACA 112 instead of the originally intended destination device. This ARP spoofing and/or poisoning may be accomplished by sending replies to device in question 116 for any ARP queries it makes. These replies may include the NACA 112's address instead of the real address (e.g. originally intended destination device's address). Additionally, NACA 112 may periodically resend other ARP packets to overwrite any answers device in question 116 may have received from the originally intended destination device being spoofed. In one embodiment, in order for NACA 112 to receive the return traffic (e.g. traffic sent from other devices back to the device in quarantine), NACA 112 may also ARP poisons the traffic, as described above. By causing device in question 116 to send all its traffic to the NACA 112, NACA 112 may apply it's firewall rules, ACL rules, or the like, and only allow device in question 116 to communicate with predetermined resources (e.g. defined by an operator, or the like).

In one embodiment, device in question 116 may include agent 2820, enabled to provide information about device in question 116. In one embodiment, agent 2820 may provide information to NACA 112 about which network switch a device (e.g. device in question 116) is plugged into. To properly enforce a device, the NACA 112 may need to know which port on a switch a device has plugged into. In one embodiment, it is important for this information to be learned by the NACA 112 as soon as the possible after the device is plugged into the port. Using agent 2820, (e.g. running on the device) this information is relayed to the NACA 112. In one embodiment, a switch such as enforcement point 118, emits a packet (e.g. a discovery packet such as a Cisco Discovery Protocol (CDP), or the like) that includes information about the switch such as IP address, name of the port being plugged into, VLAN the port is in, or the like. Agent 2820 listens for this packet, and when it hears the packet, it sends the information, or information derived therefrom, to NACA 112. Thereby, agent 2820 transmits the information about the port it is plugged into up to the NACA 112.

In one embodiment, agent 2820 may receive information about device in question 116 from outside intelligence 110. In one embodiment, agent 2820 may send health and compliance checking information to NACA 112, based on periodic scans of device in question 116 and/or an agent scan request for health and compliance checking information from NACA 112. In one embodiment, NACA 112 may determine to quarantine and/or audit device in question 116 based a processes as described in conjunction with FIGS. 22-23 and FIGS. 32-33.

Figure 29:
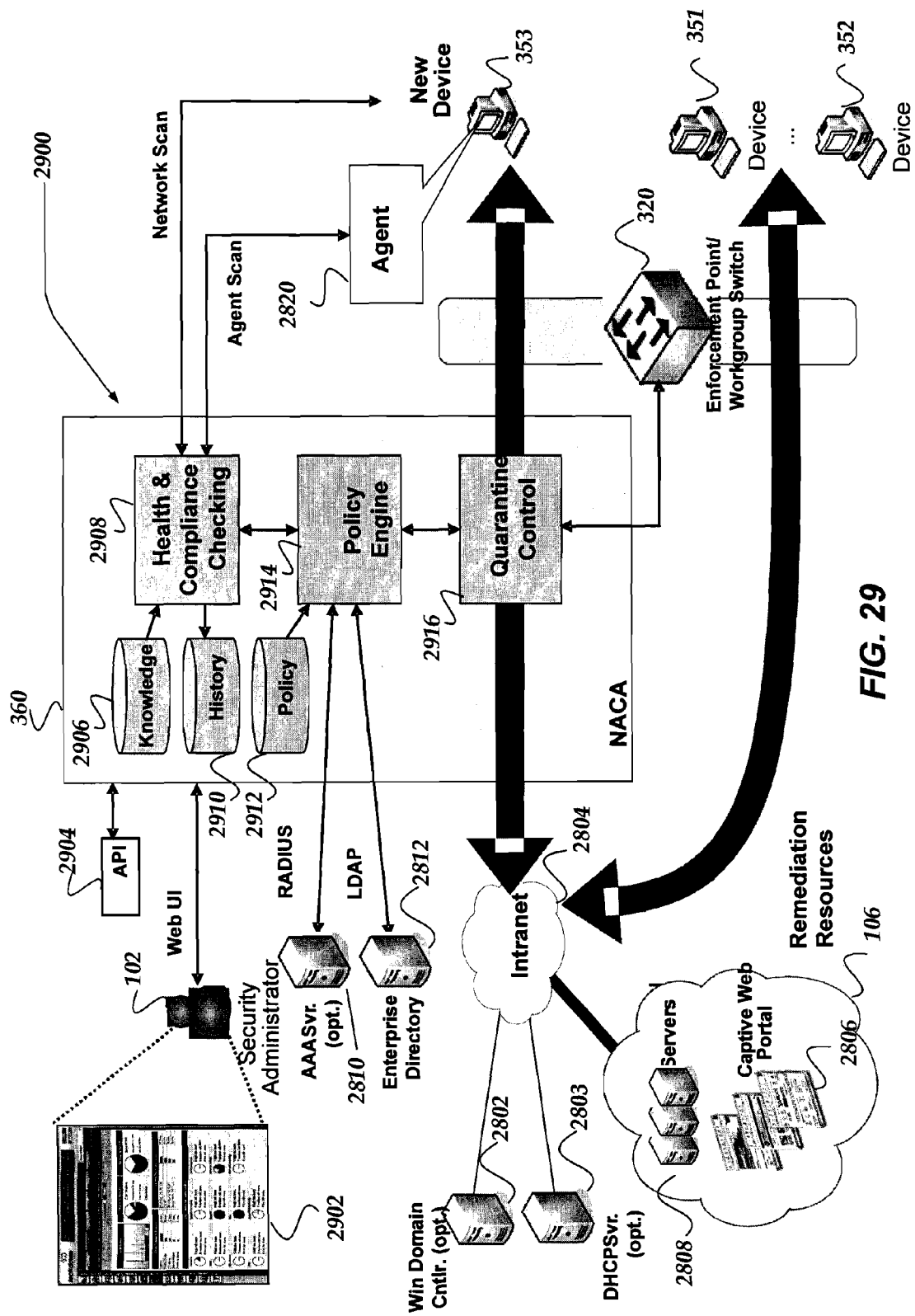
FIG. 29 illustrates one alternative embodiment of a topology of an overview of a possible deployment architecture employing the NACA.

FIG. 29 illustrates one alternative embodiment of a topology of an overview of a possible deployment architecture employing the NACA. System 2900 of FIG. 29 includes components substantially similar to those in system 100 of FIG. 1, system 300 of FIG. 3, and system 2800 of FIG. 28. In addition to the components described in FIGS. 1, 3, and 28, system 2900 also includes report 2902.

System 2900 illustrates components of the NACA 320, and/or configurations of communications between the components/devices of system 2900 that are not described in conjunction with system 100. NACA 320 operates substantially similar to NACA 112 of FIG. 28. Enforcement point 320 operates substantially similar to enforcement point 118 of FIG. 28. Although not shown, NACA 2960 includes components as described in conjunction with FIG. 3. Additionally, as shown, NACA 2960 also includes API 2904, knowledge database 2906, history database 2910, policy database 2912, health and compliance checking component 2908, policy engine 2914, and quarantine control 2916.

Knowledge database 2906 and history database 2910 may be in communication with health and compliance checking component 2908. Policy engine 2914 may be in communication with policy database 2912, health and compliance checking component 2908, quarantine control 2916, AAA server 2810, and enterprise directory 2810. As shown, policy engine 294 may communicate with AAA server 2810 over a RADIUS protocol, or the like. In one embodiment, AAA server may be an optional component. As shown, policy engine 294 may communicate with enterprise directory 2812 over an LDAP protocol, or the like, to retrieve user identification information.

As shown, security administrator 102 may access report 2902. Report 2902 may aggregate health, compliance, policy, and/or historical information about quarantined devices, a network, or the like. As shown, security administrator 102 may also provide remediation instructions, or the like, directly to NACA 2960, over a web user interface, or the like. In an alternate embodiment, access to a web site for remediation information may be filtered by HTTP, SSL, and/or Server Message Block (SMB) filtering. In one embodiment, the web site may be one of remediation resources 106, including one of servers 2808 and/or captive web portal 2806.

Knowledge database 2906, history database 2910, and policy database 2912 includes any database enabled to store information. These databases may operate substantially similar to SQL database 2026 of FIG. 20. In one embodiment, knowledge database 2906 includes information about network conditions, current vulnerability assessments, antivirus definitions, or the like, and/or aggregates of such information. In one embodiment, history database 2910 includes information about historical network conditions, vulnerability assessments, quarantines, or the like, and/or aggregates of such information. In one embodiment, policy database 2912 includes information to determine whether to quarantine a device, and how to bring a device into compliance, including configurations of acceptable device identity, health, user identity, location, and/or time of day.

Health and compliance checking component 2908 includes any software and/or hardware component enabled to audit a device and to determine if there are vulnerabilities that might further prevent the device from connecting to the network. In one embodiment, health and compliance checking component 2908 may operate substantially similar to audit extender 364 of FIG. 3. Health and compliance checking component 2908 may receive information about the health and policy compliance of new device 353 directly from new device 353, through a network scan of new device 353, or from agent 2820 operating within new device 353, or the like.

Health and compliance checking component 2908 may determine vulnerabilities assessment based at least in part on a history of intelligences of other devices that have been quarantined and/or authorized. In one embodiment, the history may be received from knowledge database 2906 and/or history database 2910. In one embodiment, health and compliance checking component 2908 may send its vulnerability assessment to policy engine 2914.

Policy engine 2914 operates substantially similar to policy engine 2022 of FIG. 20 and policy engine 2104 of FIG. 21. Generally, policy engine 2914 may be any component enabled to determine whether to quarantine a device based on associated vulnerabilities and/or a policy. A policy includes a variety of conditions, including group membership, location, machine type, operating system type, operating system patch level, antivirus software versions installed on a device, network request type (e.g. location of network device for which access is requested), user type, or network port being accessed. A policy may be a Boolean test of the variety of conditions, or the like. In one embodiment, policy engine 2914 may determine a policy that applies to the device based on evaluating the Boolean test. In one embodiment, the policy may be received from policy database 2912. In one embodiment, policy engine 2914 determines whether to quarantine new device 353 based on a process substantially similar to process 2200 of FIG. 22, process 2300 of FIG. 23, and/or process 3300 of FIG. 32. In one embodiment, policy engine 2914 may send information indicating whether to quarantine the device in question to quarantine control 2916.

In one embodiment, quarantine control 2916 operates substantially similar to Switch Adaptation Layer (SAL) 2202 of FIG. 20, and SAL 2107 of FIG. 21. Based on the received indication, quarantine control 2916 is enabled to place new device 353 in purgatory, or the like, through control of a switch, access point or the like. For example, quarantine control 2916 may enable enforcement point 320 to direct traffic from a device (e.g. One of devices 351-353), to NACA 2960 and/or to intranet 2804 so that the device may be brought into compliance with a policy, such as a security policy defined in policy database 2912, or the like.

Figure 30:
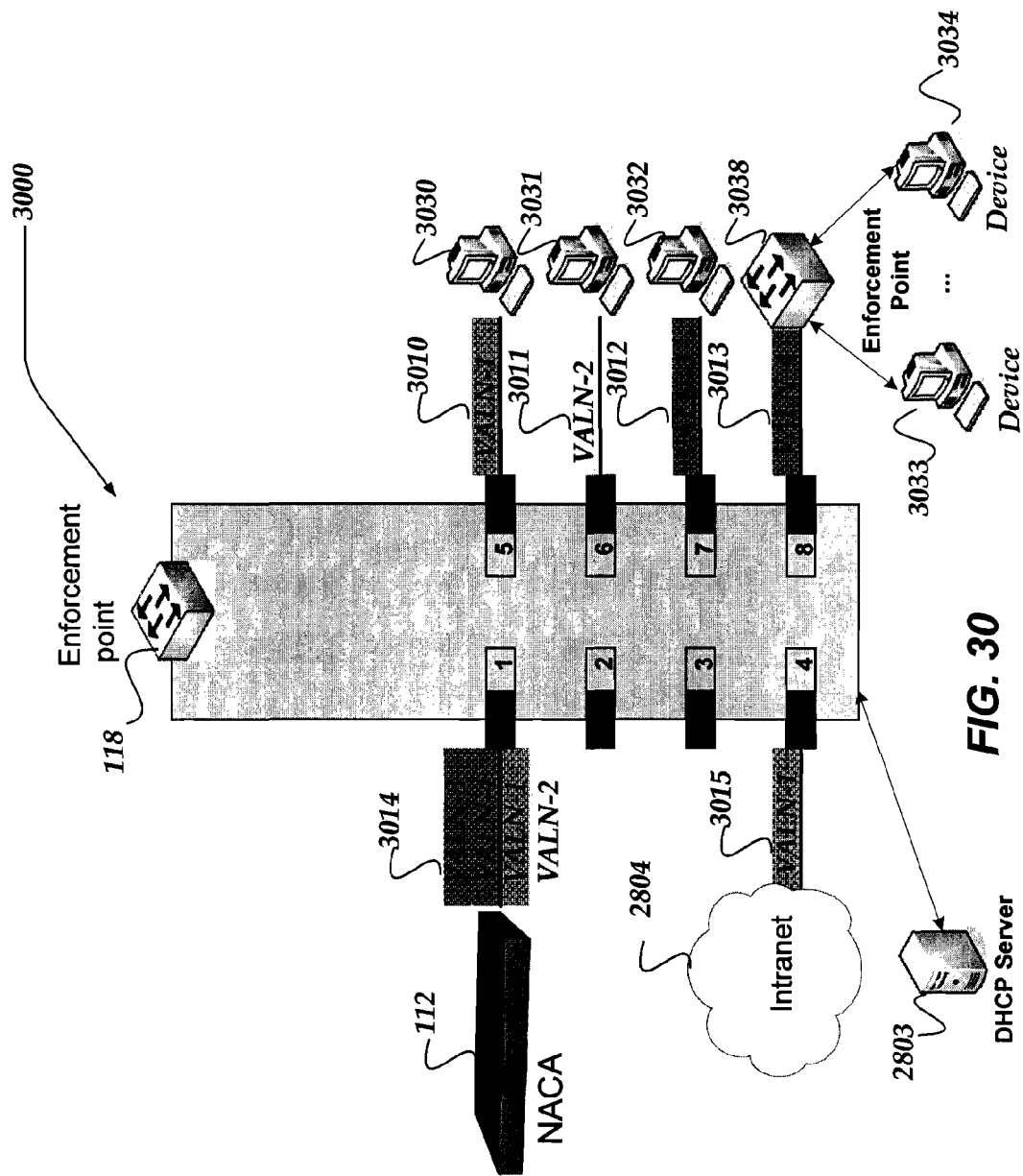
FIG. 30 shows one embodiment of a system utilizing multiple VLANs for enforcing existing and/or new access and segregation policies.

FIG. 30 shows one embodiment of a system utilizing multiple VLANs for enforcing existing and/or new access and segregation policies. System 3000 includes components substantially similar to system 100 of FIG. 1, except that system 3000 provides connections from enforcement point 118 to multiple VLANs. Enforcement point 118 may include substantially similar components as enforcement point 320 of FIG. 29. Thus, system 3000 may segregate devices into separate VLANs, including quarantined and production VLANs, to prevent the separated devices from affecting each other.

System 3000 includes enforcement point 118, enforcement point 3038, NACA 112, ports 3010-3015, intranet 2804, DHCP server 2803, and devices 3030-3034. Enforcement point 3038 may include virtually any computing device that is configured to control the flow of network traffic and enable an access point capable of VLAN-MAC binding. Such binding include a Wi-Fi access point, switch, hub, VPN concentrator, or the like.

As shown, enforcement point 118 is in communication with enforcement point 3038, NACA 112, intranet 2804, DHCP server 2803, and devices 3030-3032. Enforcement point 3038 is in communication with devices 3033-3034.

As shown, port 3010 may be associated with a production VLAN (i.e. VLAN-1). Ports 3011-3013 may be associated with quartined VLANs (i.e. VLAN-2 to VLAN-4) which may provide more limited resources than the VLAN-1.

In one embodiment, multiple devices may be coupled to the same port on enforcement point 118. For example, enforcement point 118 may bind a device MAC address to multiple VLAN numbers, thus supporting multiple devices on the same switch port. In one embodiment, a port (e.g. ports 3030-3013) may be associated with multiple VLANs. In one embodiment, enforcement point 118 may be configured to tag an uplink traffic from one of devices 3030-3033 with a different VLAN number, thereby enabling the devices to access the associated VLANs (e.g. a production or quarantined VLAN).

As shown, enforcement point 3038 communicates with enforcement point 118 through port 3013, which may be associated with multiple VLANs. Enforcement point 3038 may also be configured to bind MAC addresses of devices 3033-3034 to a port on enforcement point 3038 that is associated with one of the multiple VLANs, thereby enabling the devices to access the associated VLANs. Enforcement point 3038 may bind each one of devices 3033-3034 to a different VLAN number. In one embodiment, NACA 112 communicates a VLAN number assignment to enforcement point 118 and/or enforcement point 3038 using a RADIUS protocol. In another embodiment, an Address Resolution Protocol (ARP) announcement may coerce quarantined devices to communication with NACA 112.

In another embodiment, a filter rule may prevent quarantined devices from communicating with any other port on enforcement point 118 except a port associated with NACA 112. In one embodiment, the filter rule may be executed on enforcement point 118 and/or NACA 112.

In one embodiment, DHCP server 2803 may be associated with at least one of the multiple VLANs. In one embodiment, each of the multiple VLANs may be associated with a different DHCP server (not shown). The DHCP servers, including, DHCP server 2803 may route network traffic within the associated VLAN to NACA 112 for quarantine and remediation analysis.

In one embodiment, the multiple quarantined VLANs associated with ports 3011-3013 may prohibit devices that have been quarantined from communicating with each other, while other accessible quarantine resources are configured on the NACA 112.

In one embodiment, when a device is put on a quarantine network (e.g. onto a VLAN) it is placed there along with any other quarantined devices. This quarantine network may be statically configured with the resources that are available to other devices in the quarantine VLAN.

In one embodiment, NACA 112 places a first device into quarantine by placing the switch port associated with the first device into a special VLAN. In this embodiment, other network resources are not accessible in this VLAN except for access to the NACA 112. Instead, traffic between the first device and the special VLAN goes through NACA 112, and thus NACA 112 is enabled to manage which resources the first device may access.

In one embodiment, when a second device is placed into quarantine, it is placed in that the same VLAN as the first quarantined device. NACA 112 may still block the traffic from that device to any production networks (e.g. VLAN associated with port 3010), but NACA 112 does not stop the second device from communicating with the first device.

In an alternate embodiment, the first and second quarantined devices may be blocked from communicating with each other. Using the multiple quarantined VLANs associated with ports 3011-3013, NACA 112 may place each quarantined device into a unique VLAN, and thus prevent devices from talking with one another. The devices cannot talk to each other because NACA 112, does not forward traffic between quarantine VLANS.

In this embodiment, a configured list of VLANs (e.g. VLAN Ids) may be used for quarantine. This list may include as many VLANS as are available on the switch. These VLAN IDs may be logically placed in a pool, and when a new device is placed into quarantine, a VLAN ID may be taken from the pool and used for that device. The next device to be quarantined may be associated with the next VLAN ID in the pool, or the like. Once the pool is exhausted, devices may be added to one of the quarantine VLANs used by one of the other quarantined devices.

Illustrative Alternate Network Appliance

Figure 31:
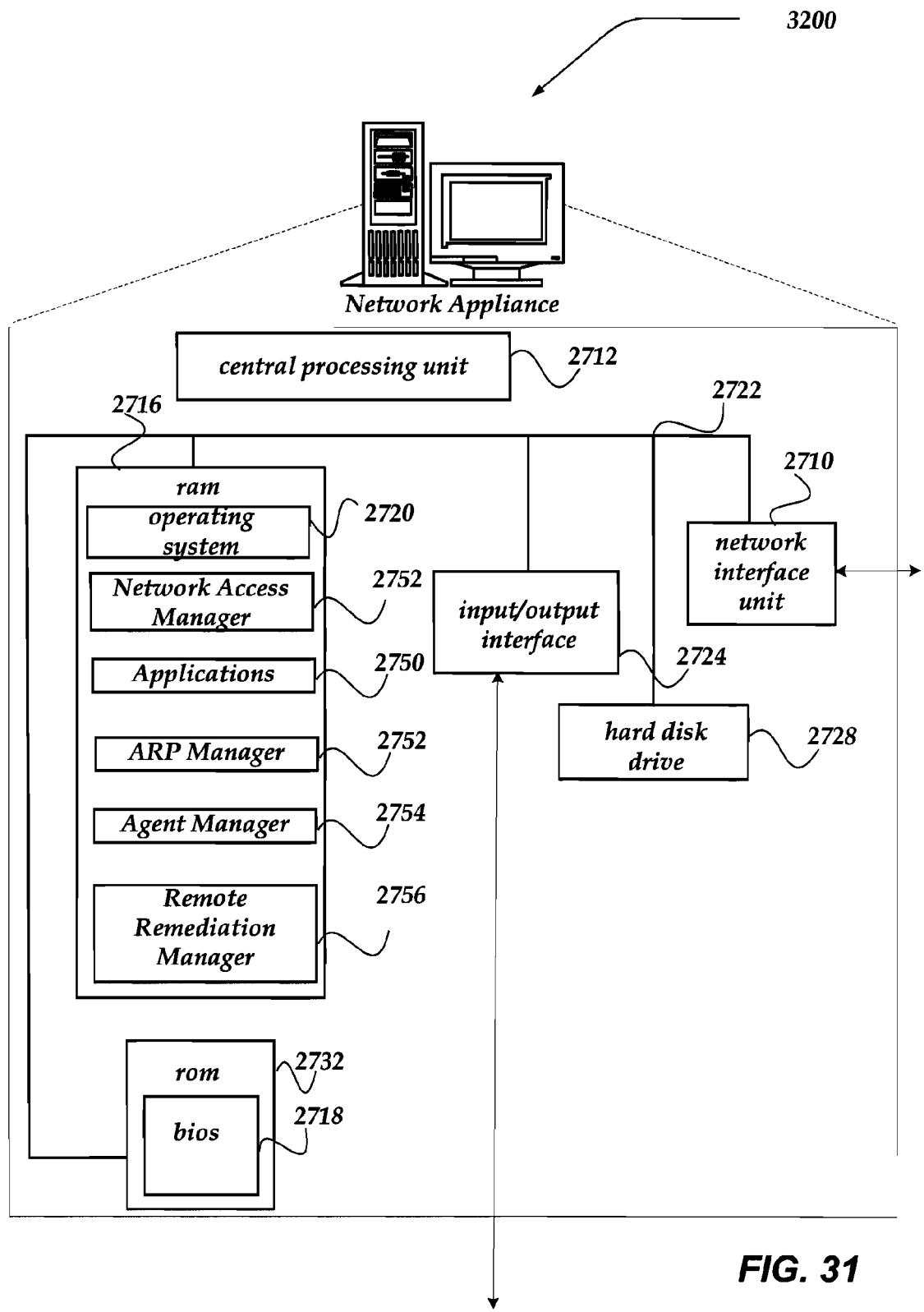
FIG. 31 illustrates one variation of FIG. 27 and is one embodiment of a network appliance that may be included in a system implementing the invention.

FIG. 31 illustrates one variation of FIG. 27 and is one embodiment of a network appliance that may be included in a system implementing the invention, in accordance with the present invention. Network appliance 3200 may include, in addition to the components of network appliance 2700 of FIG. 27, ARP manger 2752, agent manager 2754, and remote remediation manager 2756.

Figure 34:
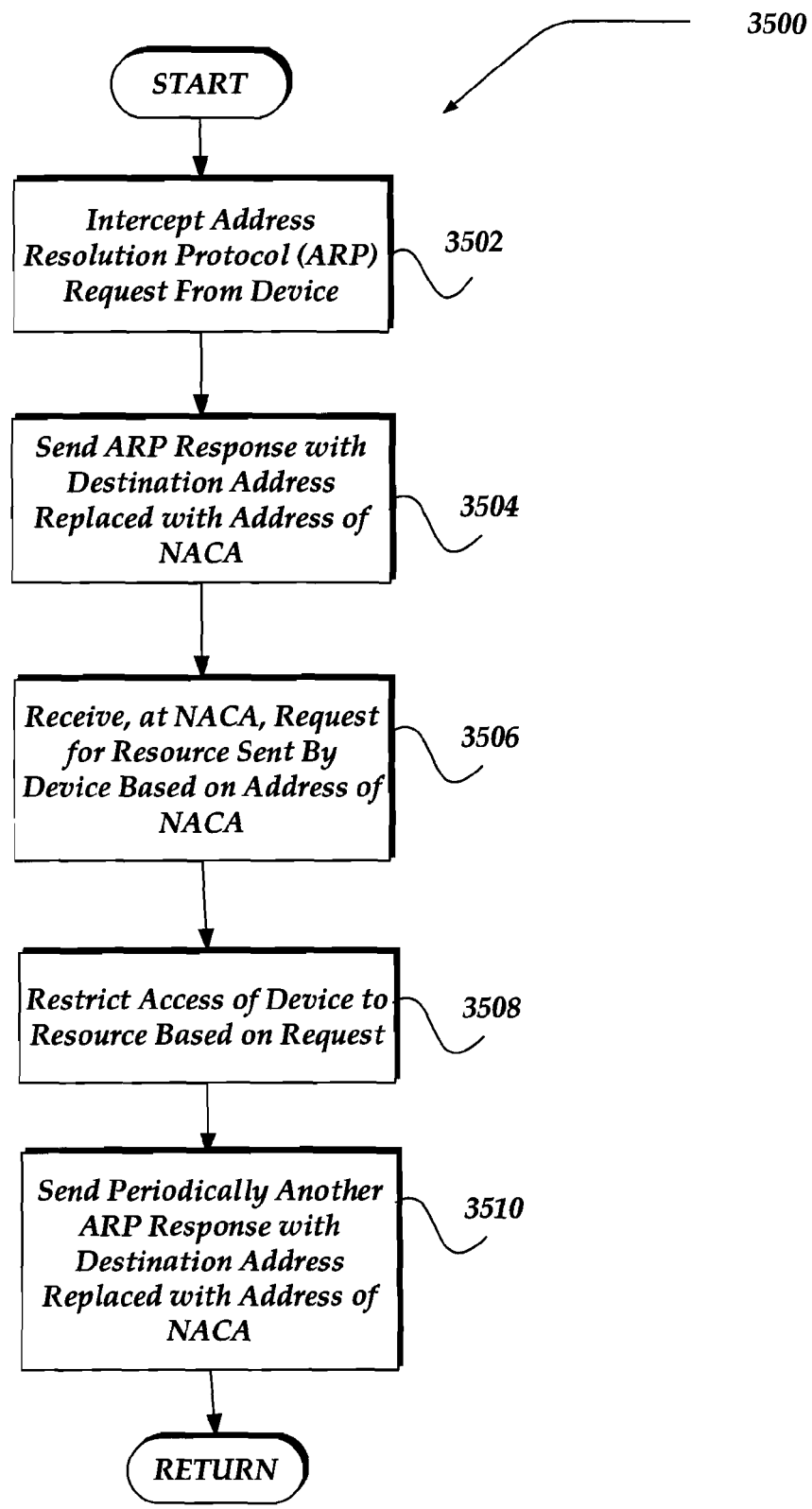
FIG. 34 shows one embodiment of a logical flow diagram for ARP spoofing to enable security enforcement, in accordance with the present invention.

ARP manager 2752 may be configured to perform the operations described in conjunction with process 3500 of FIG. 34. ARP manager 2752 may detect ARP packets received at network interface unit 2710, and perform security operations based on the received packets. For example, ARP manager 2752 may spoof ARP responses based on received ARP requests from a device seeking to join a network over network interface unit 2710.

Figure 32:
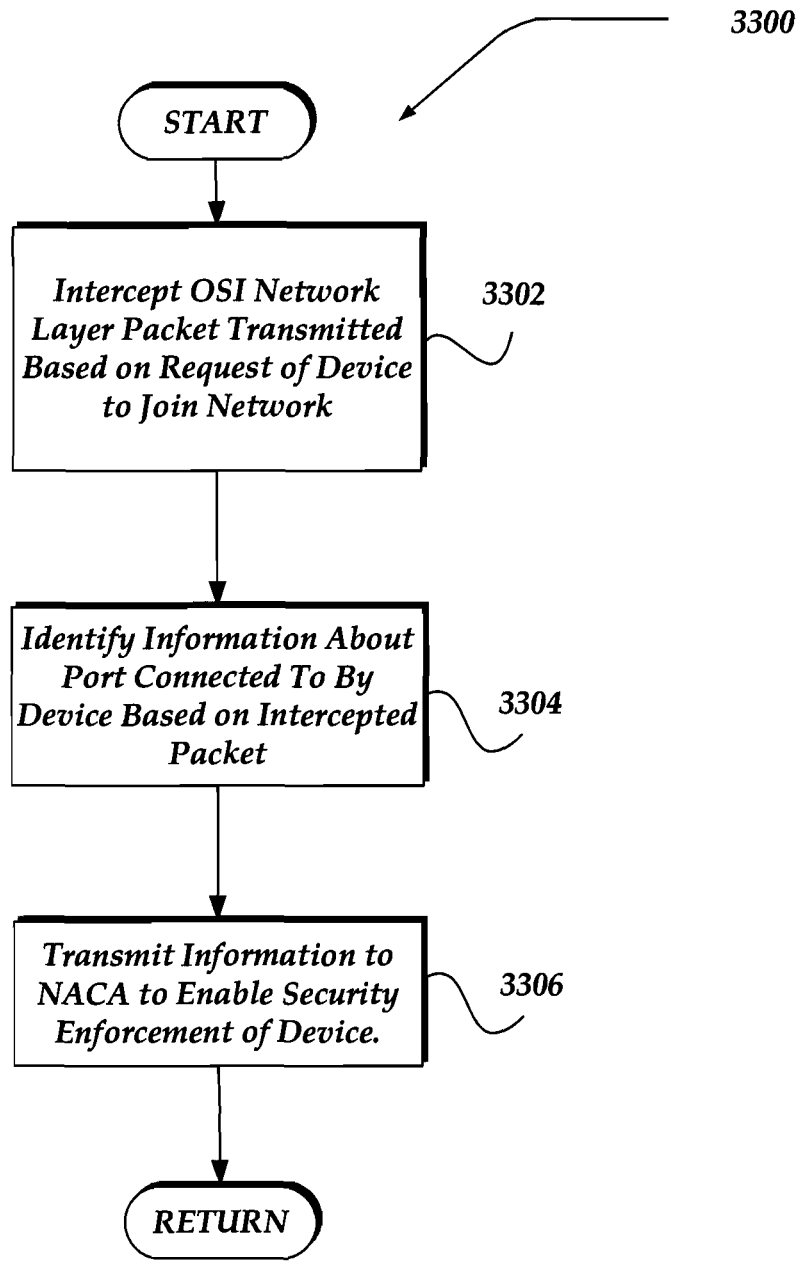
FIG. 32 shows one embodiment of a logical flow diagram for enabling a security enforcement by an agent.

Agent manager 2754 may be configured to perform the operations described in conjunction with process 3300 of FIG. 32. Agent manager 2754 may enable another device to send (e.g. forward) remediation instructions over network interface unit 2710 to the device seeking to join the network. Agent manager 2754 may alert the other device that remediation actions are required for the device seeking to join the network by sending an alert message, or the like, over network interface unit 2710.

Figure 33:
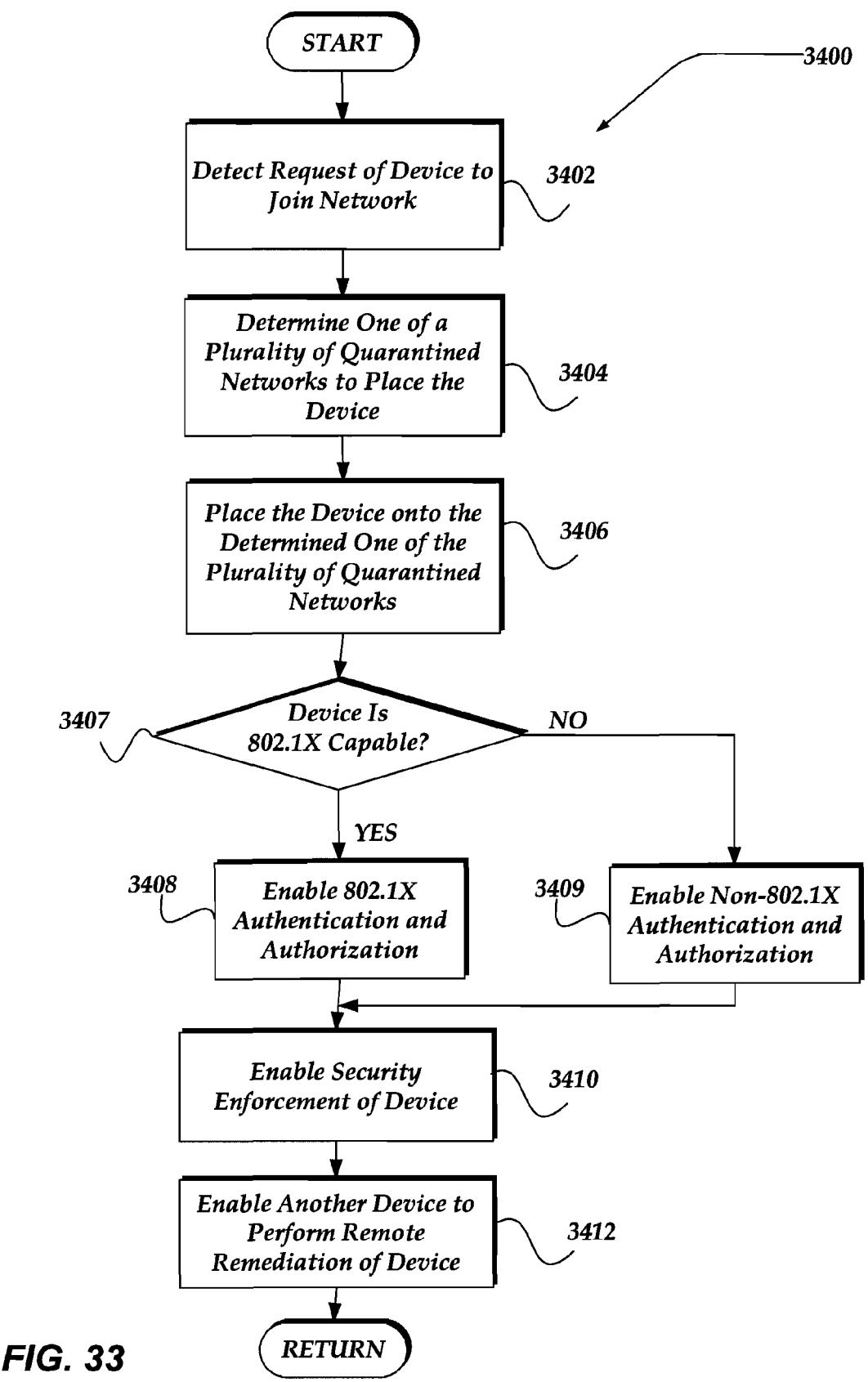
FIG. 33 shows one embodiment of a logical flow diagram for remote remediation.

Remote remediation manager 2756 may be configured to perform the operations described in conjunction with process 3400 of FIG. 33. Remote remediation manager 2756 may intercept a request from a device to join a network as described in FIGS. 22-23. Based on the intercepted request, remote remediation manager 2756 may place the device onto one of a plurality of quarantined networks (e.g. VLANs).

Additionally, applications 2750 may also include other components (not shown), such as knowledge database 2906 of FIG. 29, history database 2910, policy database 2912, health and compliance checking component 2908, policy engine 2914, and quarantine control 2916. In one embodiment, applications 2750 may provide API 2904 to control the operations of these components, to other applications and/or network devices. In one embodiment, API 2904 may be provided through an HTTPS access. In one embodiment, policy engine 2914 and/or quarantine control 2916 may control network interaction through network interface unit 2710. For example, policy engine 2914 and/or quarantine control 2916 may utilize network interface unit 2710 to relay a DHCP request to a DHCP server, relay a Windows domain authentication request to a domain controller, relay a DNS lookup request to a DNS resolver, relay and/or filter a web request to an intranet, relay a web request to a captive web portal for remediation instructions, relay and/or filter an SMB file share access request to an intranet, provide SNMP or telnet access to a switch, and/or provide interaction with a RADIUS server.

ALTERNATIVE EMBODIMENTS

Generalized Operation

In an alternate embodiment, FIG. 22 may be modified, as described below, to illustrate another logical flow diagram for managing access control using at least extended device credentials.

For example, in the alternate embodiment, at block 2204, it is determined whether the device should be remediated based on an identity of the user. In one embodiment, the user may be authenticated via a Windows Domain login and the NACA observes the login, via a web login, and/or an 802.1x login or the like. As used herein "observes" refers to the NACA sniffing network traffic between a client and a Windows Domain authentication server to determine whether authentication packets are being transmitted. In one embodiment, block 2204 may perform substantially to process 3100 of FIG. 31, as described below. For example, in one embodiment, if IEEE 802.1x is not enabled, then an dynamic fallback mechanism, such as a captive web portal may be provided. In one embodiment, the dynamic fallback mechanism may provide custom remediation instructions based on a policy that applies to the device, a type of the device, a type of the user of the device, or the like. If the user is identified as being unauthorized, it is determined that the device should be remediated and processing continues to block 2206. Otherwise, processing then continues to block 2212.

In the alternate embodiment, at block 2206, the extended device credentials may be used to determine if an audit is to be performed. The extended device credentials may include a device health (i.e. device vulnerabilities), a device location and/or time of day, or the like. A device location may be a physical and/or logical location. A physical device location may be determined by associating the device's IP address with a physical address, location, region, country, or the like. If, for example, it is determined that the device is located outside of a corporate LAN, outside of a region, country, or the like, then the device may be more susceptible to vulnerabilities and thus may require an audit. In one embodiment, if the device is requesting to join the network during non-business hours, for example, the device may be a suspect device and may require audits. If an audit is to be performed, processing then continues to block 2220. Otherwise, processing continues to block 2208.

At block 2210, the extended device credentials may be used to determine whether the device registered successfully. For example, if a user is registering from a remote location and/or during an improper time of day, then registration may be denied. Processing the continues as in process 2200.

At block 2212, it may be determined if a result of a background audit (e.g. a scheduled future audit) performed on the device indicates further remediation. In one embodiment, the background audit may include more or other vulnerabilities assessment not performed at block 2217. In one embodiment, the background audit may be performed periodically, based on a timing event, or the like. If it is determined that the result of the background audit indicates further remediation, then processing loops back to block 2217. Otherwise, processing continues to block 2214.

In an alternate embodiment, FIG. 23 may also be modified, similar to FIG. 22, described above. For example, blocks 2206 and blocks 2210 of process 2300 may be modified substantially similar to the modifications described above.

FIG. 32 shows one embodiment of a logical flow diagram for enabling a security enforcement by an agent. Process 3300 of FIG. 32 may be implemented, for example, within NACA 112 of FIGS. 1, 28 and 29, NACA 360 of FIG. 3, agent 2820 of FIG. 28, or the like.

Processing begins at block 3302, where an agent intercepts a network packet transmitted by an enforcement point in response to a request from a device to join the network. In one embodiment, data within the network packet may be received at Open Systems Interconnection (OSI) network layer. In one embodiment, the information about the port includes a discovery protocol packet. In one embodiment, the network packet is a discovery protocol packet (e.g. a Cisco Discovery Protocol (CDP) packet), or the like. In one embodiment, the device plugs onto a port on a network switch (e.g. an enforcement point), and the network switch emits a discovery protocol packet. In one embodiment, the agent receives the discovery protocol packet. In one embodiment, the agent may be software and/or a mechanism, or the like, residing on the device, or external to device and in communication with the device, as described in conjunction with agent 2820 of FIG. 28.

Processing next flows to block 3304 where the agent identifies, based on the network packet, information identifying a port on the enforcement point at which the request is received. This information may be a field or the like within the packet. The agent may parse the packet into header and payload information to retrieve this information.

Processing next flows to block 3306 where the agent transmits the information identifying the port to a network access control appliance (NACA) to enable security enforcement operations to be performed on the device. In one embodiment, the NACA may receive the information through a message, or the like. In response to the received information, NACA may perform the operations described in process 2200 of FIG. 22, process 2300 of FIG. 23, process 3100 of FIG. 31, or the like. Processing next returns to a calling process for further processing.

In one embodiment (not shown), the agent may make a connection to the NACA (e.g. over TCP) in order to transmit information to the NACA. In one embodiment, this step is done before block 3302, and in another embodiment, this step is performed after block 3302.

FIG. 33 shows one embodiment of a logical flow diagram for remote remediation. Process 3400 of FIG. 33 may be implemented, for example, within NACA 112 of FIGS. 1, 28 and 29, NACA 360 of FIG. 3, security administrator 102 of FIGS. 1, 28, and 29, enforcement point 118 of FIGS. 1, 28, and 30, or the like.

Processing begins at block 3402, where a request to join the network by the device is detected. Block 3402 corresponds to block 2202 of FIG. 2200.

Processing next flows to block 3404 where in response to the request, one of a plurality of quarantined networks is determined for placing the device, wherein devices on different quarantined networks are disabled from accessing each other. In one embodiment, an enforcement point, such as enforcement point 118 of FIG. 30 may enable multiple VLANs. In one embodiment, the determination may be made by detecting the available VLANs (e.g. not already managing another device) onto which to place the device seeking access to the network. In another embodiment, the determination may be made randomly, on a schedule, a list of available VLANs to be used for quarantine, or the like.

Processing next flows to block 3406 where the device is placed onto the determined one of the plurality of quarantined networks. In one embodiment, a NACA may place the device one of the VLANs by employing at least one of an SNMP trap, VLAN Assignment Protocol (VLAP), or an 802.1x protocol, or the like, as described above. In one embodiment (not shown), block 3406 may be performed in conjunction with block 3407-3409 in order to place the device onto the determined one of the plurality of VLANs. In another embodiment (as shown), the blocks 3407-3409 may be performed after the device is placed and/or assigned onto the determined one of the plurality of quarantined networks. Thus, the device is segregated from other devices on another one of the plurality of quarantined networks.

Processing next flows to decision block 3407, where a determination is made whether the device is 802.1X capable. In one embodiment, the client may automatically send an 802.1X authentication request, such as an EAP-response message, to a switch, thereby indicating that it is 802.1X capable. In another embodiment, the switch may send an 802.1X initiation request, such as an EAP-request identity message, or the like, to the client. If the client is 802.1X capable, it may respond with an 802.1X authentication request. In one embodiment, upon receipt of an 802.1X authentication request message from the client, the determination is made that the client is 802.1X capable. For example, the NACA may act as an authentication server to determine that the client is 802.1X capable upon receipt of the 802.1X authentication request. In another embodiment, the NACA, acting as an authentication proxy may make this determination upon detecting an 802.1X traffic request being forwarded between the switch and an authentication server.

In one embodiment, the NACA may provide a web page, or other interface, to the client device. In one embodiment, the interface may enable a user of the client device to initiate a non-802.1X authentication mechanism. Initiation of the non-802.1X authentication mechanism may then indicate that the client device in incapable of 802.1X authentication.

However, the invention is not limited to a client device's failure to respond and/or provide an 802.1X authentication message, or to further initiate a non-802.1X authentication mechanism. For example, a variety of other predefined failure conditions may also be employed to determine if the client device is 802.1X authentication capable, including, but not limited to the client device providing an incorrect authentication credential, a failed or out of date supplicant, an inoperable switch, or the like.

In any event, if, at decision block 3407, the determination is made that the client device is 802.1X capable, processing then continues to block 3408 where the switch and the authentication server are enabled to employ 802.1X authentication and 802.1X authorization is performed on the device. In one embodiment, the NACA may act as the authentication server. In one embodiment, the NACA puts a switch port on the switch into an auto mode, thus enabling 802.1X authentication detection. In one embodiment, 802.1X packets may be processed on the switch port, while other packets may be dropped, or otherwise ignored by the switch. Processing then continues to block 3410. If, at decision block 3407, the determination is made that the client is not 802.1X capable, processing then continues to block 3409.

At block 3409, the NACA may be enabled to employ a non-802.1X mechanism to authenticate and/or authorize the device. In one embodiment, this may be through an interface, such as a Command Line Interface (CLI), a web page, or the like, that may be provided to the client device. In one embodiment, this non-802.1X may be a captive web portal, or the like. The interface may enable entry of such non-802.1X authentication inputs as a user name/password, a digital certificate, a token, or the like. Thus, the user of the device may be enabled to be authorized to access resources on the network through the non-802.1X mechanism. Processing next flows to block 3410.

At block 3410, security enforcement operations are enabled to be performed on the quarantined device. For example, NACA may perform the operations described in process 2200 of FIG. 22, process 2300 of FIG. 23, process 3100 of FIG. 31, or the like, to secure the device and bring the device into compliance with a security policy. For example, a NACA may, based on the intercepted request of the device to join the network, forward remediation messages from a security administrator such as security administrator 102 of FIGS. 1, 28, and 29 to the device. In one embodiment, an agent, or the like may receive the remediation messages and perform operations on the device, such as installing anti-virus software, or the like, to remediate the device.

Processing next flows to block 3412 where another device outside the quarantined network (e.g. one of a plurality of quarantined networks) is enabled to direct a remediation measure to be performed on the device to bring the device into compliance with a security policy. Processing next returns to a calling process for further processing.

In an alternate embodiment (not shown), a different first authentication and/or authorization mechanism may be determined to be enabled at block 3407. For example, CLI, and/or web-page authentication and/or authorization may be determined. At block, 3408, the first mechanism may be used to authenticate and/or authorize the device. If the device fails the first measure, at block 3407, then processing flows to block 3409, where a second mechanism may be used to authenticate and/or authorize the device, such as a web-based mechanism. Processing then continues to block 3410 as described above.

FIG. 34 shows one embodiment of a logical flow diagram for ARP spoofing to enable security enforcement. Process 3500 of FIG. 34 may be implemented, for example, within NACA 112 of FIGS. 1, 28 and 29, NACA 360 of FIG. 3, enforcement point 118 of FIGS. 1, 28, and/or enforcement point 320 of FIG. 29, or the like.

Processing begins at block 3502, where Address Resolution Protocol (ARP) request including a requested destination address is intercepted from a device.

Processing next flows to block 3504, where in response to the ARP request, an ARP response is sent to the device, wherein the ARP response includes the destination address as an address of a Network Access Control Appliance (NACA), or another device enabled to secure access to a network. In one embodiment, the destination address is replaced with the address of the NACA (or other device). Thereby, the ARP response is spoofed with the address of the NACA (or other device). Thus, the device will send data to the NACA that was intended for the originally requested destination address.

Processing next flows to block 3506, where the NACA (or other device) receives a request for a resource within the network, wherein the request is destined to NACA based on the address of the NACA received within the ARP response.

Processing next flows to block 3508, where access to the resource is restricted. In one embodiment, the access is restricted if the device is not authorized to access the resource. In one embodiment, the process of restricting access may be similar to the operations of block 2204 of FIG. 22. In one embodiment, restricting access the comprises at least one of restricting access based on an authorization in an Access Control List (ACL), or providing a mechanism for authentication or authorization to the device.

Processing next flows to block 3510, where periodically another ARP request is sent to the device, wherein the other ARP response includes a destination address of the other ARP request as (e.g. replaced with) the NACA (or other device), thereby spoofing the destination address used by the device. Processing next continues to a calling process for further processing.

It will be understood that each blocks of the flowchart illustration may be performed in an alternate order, or some blocks may be omitted without departing from the spirit and scope of the present invention. Further, blocks from FIGS. 33-35 may be combined, or the like, without departing from the spirit and scope of the present invention.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method, comprising:
   intercepting a network packet transmitted to a device by an enforcement point in a network, wherein the network packet is transmitted in response to a request from the device to join the network;
   determining information identifying a port on the enforcement point at which the request is received, wherein the information identifying the port is determined by evaluating the contents of the intercepted network packet;
   establishing a network connection to a network access control appliance (NACA) in the network; and
   transmitting the information identifying the port to the NACA to enable security enforcement operations to be performed on the device via the NACA, wherein the security enforcement operations include:
      selecting a first quarantined network from a plurality of quarantined networks if the first quarantined network is not managing another device, wherein devices on different quarantined networks are inhibited from accessing each other; and causing the device to be quarantined by placing the device on the first quarantined network such that communications over the network by the device are restricted and traffic for the device is filtered through the NACA, wherein the NACA enforces the quarantine of the device through the enforcement point by placing the port of the enforcement point into the first quarantined network.

2. The method of claim 1, wherein transmitting the information comprises transmitting other information about credentials of the device.

3. The method of claim 1, wherein the network packet is a discovery protocol packet.

4. The method of claim 1, further comprising:
before enabling the security enforcement operations to be performed on the device, providing a first authentication measure; and
if the device fails the first authentication measure, providing a second authentication measure, including a web based authentication mechanism.

5. The method of claim 1, further comprising enabling another device outside of the plurality of quarantined networks to direct a remediation measure to be performed on the device to bring the device into compliance with a security policy.

6. The method of claim 1, wherein the network packet is intercepted by an agent on the device.

7. The method of claim 1, wherein the network packet is intercepted by an agent external to the device, wherein the agent is in communication with the device.

8. The method of claim 1, further comprising:
receiving health and compliance checking information related to the device; and
transmitting the health and compliance checking information to the NACA.

9. The method of claim 8, wherein the health and compliance checking information is received from an outside intelligence entity.

10. The method of claim 1, wherein the quarantine is enforced on the enforcement point by the NACA at an Open Systems Interconnection (OSI) protocol layer 2.

11. The method of claim 1, wherein the traffic of the quarantined device is filtered by a filter rule preventing the device from communicating with any port on the enforcement point except a port associated with the NACA.

* * * * *